(12) United States Patent
Lee et al.

(10) Patent No.: US 12,457,355 B2
(45) Date of Patent: *Oct. 28, 2025

(54) APPARATUS AND METHOD FOR ENCODING MOTION VECTOR DETERMINED USING ADAPTIVE MOTION VECTOR RESOLUTION, AND APPARATUS AND METHOD FOR DECODING MOTION VECTOR

(71) Applicant: SAMSUNG ELECTRONICS CO., LTD., Suwon-si (KR)

(72) Inventors: Jin-young Lee, Suwon-si (KR); Seung-soo Jeong, Seoul (KR); Woong-il Choi, Osan-si (KR); Anish Tamse, Seoul (KR); Yin-ji Piao, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,201

(22) Filed: Apr. 26, 2024

(65) Prior Publication Data

US 2024/0276009 A1 Aug. 15, 2024

Related U.S. Application Data

(63) Continuation of application No. 17/717,806, filed on Apr. 11, 2022, now Pat. No. 11,991,383, which is a
(Continued)

(51) Int. Cl.
*H04N 19/52* (2014.01)
*H04N 19/44* (2014.01)

(52) U.S. Cl.
CPC ............ *H04N 19/52* (2014.11); *H04N 19/44* (2014.11)

(58) Field of Classification Search
CPC ...... H04N 19/44; H04N 19/52; H04N 19/523; H04N 19/56; H04N 19/567; H04N 19/593
See application file for complete search history.

(56) References Cited

U.S. PATENT DOCUMENTS

| 5,576,772 A | 11/1996 | Kondo |
| 8,233,542 B2 | 7/2012 | Suzuki |

(Continued)

FOREIGN PATENT DOCUMENTS

| CN | 1109243 A | 9/1995 |
| CN | 1550110 A | 11/2004 |

(Continued)

OTHER PUBLICATIONS

Chen et al., "Algorithm Description of Joint Exploration Test Model 3", Document: JVET-C1001_v3, 2016, 38 pages total.

(Continued)

*Primary Examiner* — Anner Holder
(74) *Attorney, Agent, or Firm* — Sughrue Mion, PLLC

(57) ABSTRACT

A method of decoding a motion vector includes: obtaining information indicating a motion vector resolution (MVR) of a current block from a bitstream; selecting one candidate block from among at least one candidate block, based on the MVR of the current block; and obtaining a motion vector of the current block corresponding to the MVR, by using a motion vector of the determined one candidate block as a prediction motion vector of the current block.

3 Claims, 35 Drawing Sheets

Related U.S. Application Data continuation of application No. 16/622,157, filed as application No. PCT/KR2018/003800 on Mar. 30, 2018, now Pat. No. 11,303,920.

(60) Provisional application No. 62/529,566, filed on Jul. 7, 2017.

(56) References Cited

U.S. PATENT DOCUMENTS

| | | | |
|---|---|---|---|
| 9,432,680 | B2 | 8/2016 | Lee |
| 9,609,354 | B2 | 3/2017 | Oh et al. |
| 9,924,182 | B2 | 3/2018 | Park et al. |
| 10,045,048 | B2 | 8/2018 | Nam et al. |
| 10,225,565 | B2 | 3/2019 | Lee et al. |
| 10,531,113 | B2 | 1/2020 | Lee et al. |
| 10,602,179 | B2 | 3/2020 | Jeong et al. |
| 2012/0008689 | A1 | 1/2012 | Nasu et al. |
| 2012/0057632 | A1 | 3/2012 | Sato |
| 2012/0207220 | A1 | 8/2012 | Kim et al. |
| 2012/0224635 | A1 | 9/2012 | Kim et al. |
| 2012/0243614 | A1 | 9/2012 | Hong et al. |
| 2013/0070846 | A1 | 3/2013 | Lim et al. |
| 2013/0251024 | A1 | 9/2013 | Li et al. |
| 2013/0294518 | A1 | 11/2013 | Lim et al. |
| 2014/0015922 | A1 | 1/2014 | Zhang |
| 2014/0016704 | A1 | 1/2014 | Lin et al. |
| 2015/0023424 | A1 | 1/2015 | Lim et al. |
| 2015/0071356 | A1 | 3/2015 | Kim et al. |
| 2015/0110178 | A1 | 4/2015 | Kim et al. |
| 2015/0350671 | A1* | 12/2015 | Alshin .......... H04N 19/13 375/240.15 |
| 2016/0337661 | A1 | 11/2016 | Pang et al. |
| 2016/0337662 | A1 | 11/2016 | Pang et al. |
| 2016/0366435 | A1* | 12/2016 | Chien .......... H04N 19/51 |
| 2017/0339426 | A1 | 11/2017 | Lee et al. |
| 2017/0347104 | A1 | 11/2017 | Tanizawa et al. |
| 2018/0048909 | A1* | 2/2018 | Liu .......... H04N 19/105 |
| 2018/0077417 | A1 | 3/2018 | Huang |
| 2018/0139448 | A1 | 5/2018 | Lee et al. |
| 2018/0242011 | A1 | 8/2018 | Kim et al. |
| 2018/0316934 | A1 | 11/2018 | Nam et al. |
| 2019/0342576 | A1 | 11/2019 | Park et al. |
| 2019/0349600 | A1 | 11/2019 | Sasai et al. |
| 2020/0084469 | A1 | 3/2020 | Lee et al. |

FOREIGN PATENT DOCUMENTS

| | | | |
|---|---|---|---|
| CN | 103313052 A | | 9/2013 |
| CN | 104811725 A | | 7/2015 |
| CN | 105532004 A | | 4/2016 |
| CN | 106851304 A | | 6/2017 |
| EP | 1 469 682 A1 | | 10/2004 |
| EP | 2405659 A1 | | 1/2012 |
| EP | 3 059 968 A1 | | 8/2016 |
| EP | 3 203 743 A1 | | 8/2017 |
| JP | 2006-31597 A | | 2/2006 |
| JP | 2012-151818 A | | 8/2012 |
| JP | 2014-131293 A | | 7/2014 |
| JP | 2016-154395 A | | 8/2016 |
| JP | 2017533669 A | * | 11/2017 .......... H04N 19/70 |
| JP | 2009-33266 A | | 2/2019 |
| KR | 10-2011-0020211 A | | 3/2011 |
| KR | 10-2012-0080552 A | | 7/2012 |
| KR | 10-2014-0022009 A | | 2/2014 |
| KR | 1020140032930 A | | 3/2014 |
| KR | 1020150092054 A | | 8/2015 |
| KR | 1020170078672 A | | 7/2017 |
| KR | 1020170078673 A | | 7/2017 |
| WO | 2010/029850 A1 | | 3/2010 |
| WO | 2013/057782 A1 | | 4/2013 |
| WO | 2015/057038 A1 | | 4/2015 |
| WO | 2016/068674 A1 | | 5/2016 |
| WO | 2017090967 A1 | | 6/2017 |
| WO | 2017/194756 A1 | | 11/2017 |

OTHER PUBLICATIONS

Chen et al., "EE4: Enhanced Motion Vector Difference Coding", Document: JVET-E0076, 2017, 4 pages total.

Communication dated Aug. 17, 2018 issued by the International Searching Authority in counterpart Application No. PCT/KR2018/003800 (PCT/ISA/220, PCT/ISA/210, and PCT/ISA/237).

Communication dated Dec. 8, 2023, issued by the State Intellectual Property Office of People's Republic of China in counterpart Chinese Application No. 201880063025.2.

Communication dated Feb. 18, 2020 issued by the European Patent Office in application No. 18828567.0.

Communication dated Feb. 26, 2024 issued by the European Patent Office in Application No. 18861200.6.

Communication dated Feb. 4, 2021 issued by the European Patent Office in application No. 18828567.0.

Communication dated Jul. 14, 2023, issued by European Patent Office in European Patent Application No. 18828567.0.

Communication dated Jun. 19, 2020 issued by the Korean Intellectual Property Office in application No. 10-2019-7037061.

Communication dated Mar. 30, 2021 issued by the European Patent Office in application No. 18861200.6.

Communication dated Mar. 31, 2022 issued by the National Intellectual Property Administration, PRC of China in CN Application No. 201880045543.1.

Communication dated Mar. 31, 2022 issued by the State Intellectual Property Office of P.R. China in counterpart Chinese application No. 201880045543.1.

Communication dated May 22, 2023, issued by the European Patent Office in counterpart European Application No. 18 861 200.6.

Communication dated Nov. 23, 2021 issued by the Indian Patent Office in counterpart Indian Application No. 202128049713.

Communication dated Nov. 24, 2021 issued by the Indian Patent Office in counterpart Indian Application No. 202128049716.

Communication issued May 19, 2021 by the Intellectual Property Office of India in counterpart Indian Patent Application No. 202027003973.

Communication issued May 21, 2021 by the Korean Intellectual Property Office in counterpart Korean Patent Application No. 10-2020-7004582.

Communications dated Mar. 7, 2022 issued by the Korean Intellectual Property Office in KR Application No. 10-2022-7004659.

IN Communication issued Mar. 31, 2023 from the Indian Patent Office in IN Patent Application No. 202027003973.

Indian Office Action, dated Jan. 2, 2023, issued by the Intellectual Property India, Application No. 202128039652.

Indian Office Action, dated Jan. 3, 2023, issued by the Intellectual Property India, Application No. 202128039662.

International Search Report (PCT/ISA/210) and Written Opinion (PCT/ISA/237) dated Aug. 17, 2018 issued by the International Searching Authority in International Application No. PCT/KR2018/003800.

International Search Report (PCT/ISA/210) and Written Opinion (PCT/ISA/237) dated Feb. 1, 2019 issued by the International Searching Authority in International Application No. PCT/KR2018/011476.

Korean Office Action, dated Dec. 13, 2022, issued by the Korean Patent Office, Application No. 10- 2022-7040933.

Laroche et al., "Non-RCE1: On MV resolution and motion vector predictor number", Document: JCTVC-Q0067, 2014, 4 pages total.

Li et al., "RCE1.2: Adaptive MV Precision", Document: JCTVC-Q0049, 2014, 4 pages total.

Tabatabai, A., et al., "Tool Experiment 6: Intra Prediction Improvement", Joint Collaborative Team on Video Coding (JCT-VC) of ITU-T SG16 WP3 and ISO/IEC JTC1/SC29/WG11, 2010, XP030233232, pp. 1-11.

Wien, "High Efficiency Video Coding—Coding Tools and Specification", Springer, Oct. 8, 2014, pp. 179-203, doi:10.1007/978-3-662-44276-0.

Zhou et al., "RCE1: Subtest 1—Motion Vector Resolution Control", Document: JCTVC-Q0155_r1, 2014, 5 pages total.

(56) References Cited

OTHER PUBLICATIONS

Communication issued May 17, 2024 by the National Intellectual Property Administration. PRC in Chinese Patent Application No. 201880063025.2.
Communication dated Jan. 29, 2025, issued by the European Patent Office in European Application No. 18861200.6.
Communication dated Mar. 3, 2025, issued by the European Patent Office in European Application No. 18861200.6.
Communication dated Feb. 11, 2025, issued by the European Patent Office in European Application No. 18861200.6.
Communication dated Feb. 14, 2025, issued by Intellectual Property India in Indian Application No. 202027011835.
Communication dated Jul. 22, 2024, issued by the United States Patent and Trademark Office in U.S. Appl. No. 17/896,608.
Communication issued on Sep. 11, 2025 by the China National Intellectual Property Administration for Chinese Patent Application No. 202310026758.1.
Communication issued on Sep. 11, 2025 by the China National Intellectual Property Administration for Chinese Patent Application No. 202310026181.4.
Communication dated May 12, 2025 issued by the National Intellectual Property Office of P.R. China in counterpart Chinese application No. 202310026758.1.
Communication dated May 12, 2025 issued by the National Intellectual Property Office of P.R. China in counterpart Chinese application No. 202310026181.4.

* cited by examiner

FIG. 6

| CANDIDATE MOTION VECTOR RESOLUTION | CANDIDATE BLOCK |
|---|---|
| 1/8 PIXEL UNIT | LEFT BLOCK |
| 1/4 PIXEL UNIT | UPPER BLOCK |
| 1/2 PIXEL UNIT | LEFT UPPER BLOCK |
| 1 PIXEL UNIT | UPPER LEFT BLOCK |
| 2 PIXEL UNIT | LEFT LOWER BLOCK |

FIG. 7

FIG. 8
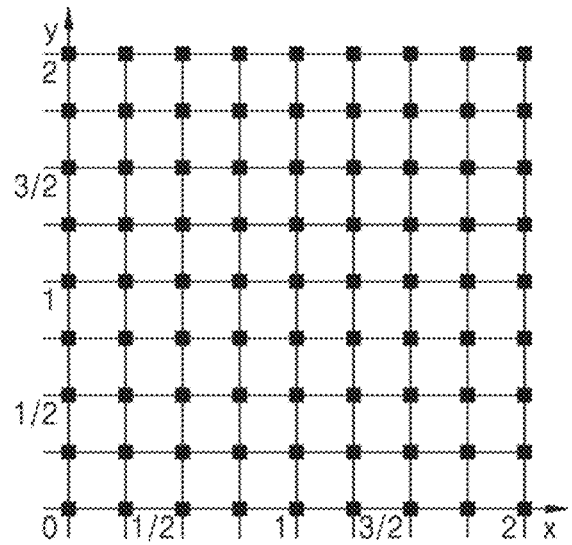
(a): 1/4-PIXEL UNIT
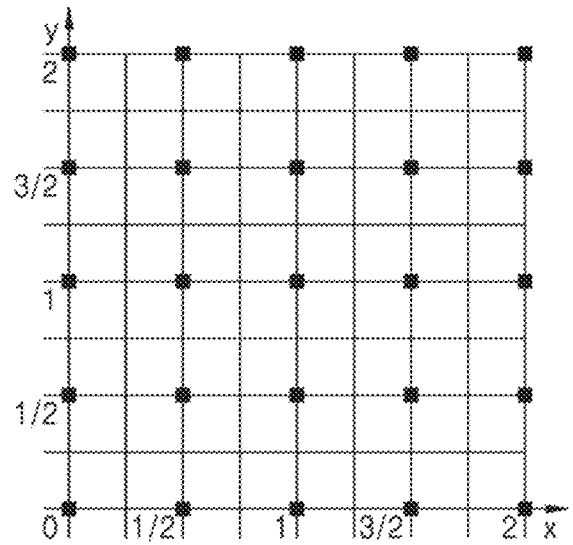
(b): 1/2-PIXEL UNIT
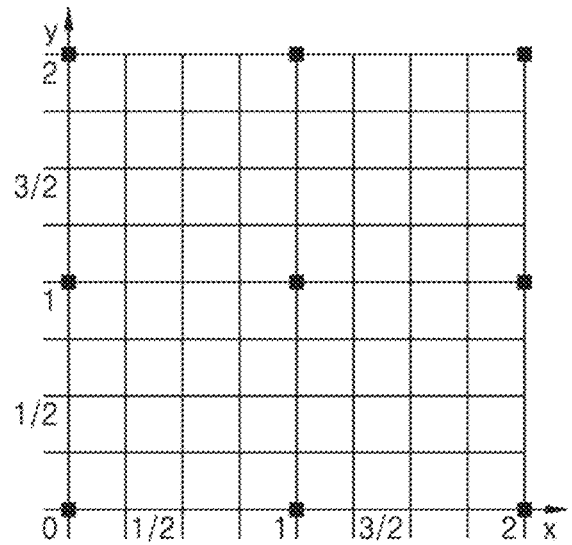
(c): 1-PIXEL UNIT
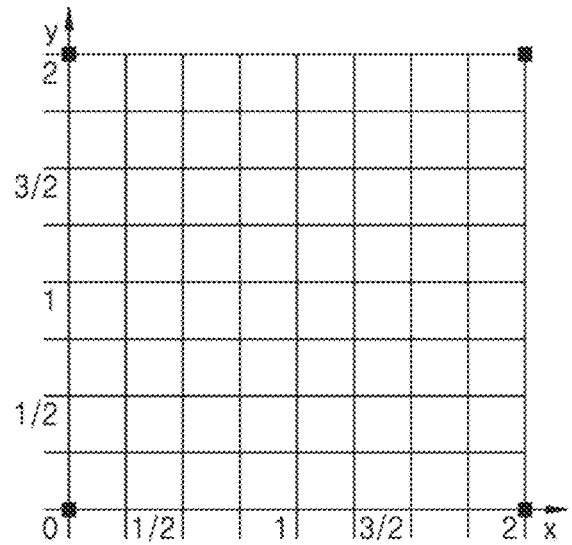
(d): 2-PIXEL UNIT

FIG. 10

| coding_unit( x0, y0, log2width, log2height ) { | Descriptor |
|---|---|
| a — if( slice_type != I && | |
| !(log2width <= LOG2_MIN_CU && log2height <= LOG2_MIN_CU) ) | |
| b —   cu_skip_flag[ x0 ][ y0 ] | ae(v) |
| c —   if( cu_skip_flag[ x0 ][ y0 ] ) { | |
|     cu_skip_umve[ x0 ][ y0 ] | ae(v) |
|     if( cu_skip_umve[ x0 ][ y0 ] ) { | |
|       cu_mode = SKIP_UMVE | |
|       mvp_idx_umve( x0, y0, identical_list0_list1_flag ) | |
|     } | |
|     else if( log2width >= 3 && log2height >= 3 ) { | |
|       cu_skip_affine[ x0 ][ y0 ] | ae(v) |
|       if( cu_skip_affine[ x0 ][ y0 ] ) { | |
|         cu_mode = SKIP_AFFINE | |
|       } | |
|       else { | |
|         mvp_idx[ x0 ][ y0 ] | ae(v) |
|         cu_mode = SKIP | |
|       } | |
|     } | |
|     else { | |
|       mvp_idx[ x0 ][ y0 ] | ae(v) |
|       cu_mode = SKIP | |
|     } | |
|   } | |
| d —   else { | |
| e —     pred_mode_flag[ x0 ][ y0 ] | ae(v) |
|     cu_mode = pred_mode_flag[ x0 ][ y0 ] | |
| f —     if( pred_mode_flag[ x0 ][ y0 ] != MODE_INTRA ) | |
| g —       pred_mvr_idx[ x0 ][ y0 ] | ae(v) |
|     } | |
|   } | |

FIG. 23

| DEPTH \ BLOCK SHAPE | 0: SQUARE | 1: NS_VER | 2: NS_HOR |
|---|---|---|---|
| DEPTH OF D | 1300 | 1310 | 1320 |
| DEPTH OF D+1 | 1302 | 1312 | 1322 |
| DEPTH OF D+2 | 1304 | 1314 | 1324 |
| ... | ... | ... | ... |

FIG. 29

| SQUARE BLOCK | |
|---|---|
| (00)b | □ |
| (10)b | ▭ |
| (11)b | ▯ |

| NON-SQUARE BLOCK | | |
|---|---|---|
| (0)b | ▭ | ▯ |
| (10)b | ▭ | ▯ |
| (11)b | ▭▭ | ▯▯ |

FIG. 31

| 2122 (ON) | 2124 (OFF) | 2112 (ON) | 2132 (OFF) | 2134 (ON) |
| 2126 (OFF) | 2128 (OFF) | | | |
| 2114 (ON) | 2116 (OFF) | | |
| 2140 (OFF) | 2152 (ON) | 2162 (OFF) |
| | | 2164 (ON) |
| | 2154 (OFF) | 2166 (ON) |

APPARATUS AND METHOD FOR ENCODING MOTION VECTOR DETERMINED USING ADAPTIVE MOTION VECTOR RESOLUTION, AND APPARATUS AND METHOD FOR DECODING MOTION VECTOR

CROSS REFERENCE TO RELATED APPLICATIONS

This is a continuation of U.S. application Ser. No. 17/717,806 filed Apr. 11, 2022, which is a continuation application of U.S. application Ser. No. 16/622,157, filed Dec. 12, 2019, which is a National Stage of International Application No. PCT/KR2018/003800, filed Mar. 30, 2018, which claims priority under 35 U.S.C. § 119 from U.S. Provisional Application No. 62/529,566, filed Jul. 7, 2017 the contents of all of which are incorporated herein by reference in their entirety.

TECHNICAL FIELD

The present disclosure relates to video encoding and decoding fields. More particularly, the present disclosure relates to a method and apparatus for encoding a motion vector of a video, and a method and apparatus for decoding a motion vector of a video.

BACKGROUND ART

In video encoding and decoding methods, in order to encode an image, one picture may be split into macroblocks and each of the macroblocks may be encoded by using inter prediction or intra prediction.

Inter prediction refers to a method of compressing an image by removing temporal redundancy between pictures, a representative example of which is motion estimation encoding. In motion estimation encoding, each block of a current picture is predicted by using at least one reference picture. A reference block that is most similar to a current block is found within a predetermined search range by using a predetermined evaluation function.

A current block is predicted based on a reference block, and a residual block obtained by subtracting from the current block a prediction block generated as a prediction result is encoded. In this case, in order to more accurately perform prediction, interpolation is performed on a search range of the reference picture, sub-pel-unit pixels smaller than integer-pel-unit pixels may be generated, and inter prediction may be performed on the generated sub-pel-unit pixels.

In a codec such as H.264 advanced video coding (AVC) and high efficiency video coding (HEVC), in order to predict a motion vector of a current block, a motion vector of previously encoded blocks adjacent to the current block or blocks included in a previously encoded picture is used as a prediction motion vector of the current block.

DESCRIPTION OF EMBODIMENTS

Solution to Problem

A method of decoding a motion vector, according to an embodiment, may include: obtaining information indicating a motion vector resolution (MVR) of a current block from a bitstream; selecting one candidate block from among at least one candidate block, based on the MVR of the current block; and obtaining a motion vector of the current block corresponding to the MVR, by using a motion vector of the determined one candidate block as a prediction motion vector of the current block.

Advantageous Effects of Disclosure

An apparatus and method of encoding a motion vector and an apparatus and method of decoding a motion vector according to an embodiment may efficiently encode and decode an image at a low bit rate by representing a residual motion vector based on a motion vector resolution that is adaptively determined.

BRIEF DESCRIPTION OF DRAWINGS

A brief explanation of each drawing is provided to more fully understand the accompanying drawings.

FIG. 6 is a diagram illustrating a mapping relationship between at least one candidate MVR and at least one candidate block.

FIG. 7 is a diagram for describing interpolation for determining a motion vector according to various MVRs.

FIG. 8 is a diagram illustrating positions of pixels that may be indicated by motion vectors according to a ¼ pixel unit MVR, a ½ pixel unit MVR, a 1 pixel unit MVR, and a 2 pixel unit MVR when an available minimum MVR is the ¼ pixel unit MVR.

FIG. 10 is a diagram illustrating syntax for describing a process of obtaining an MVR index of a current block.

FIG. 23 illustrates a process of determining a depth of a coding unit as a shape and size of the coding unit change, when the coding unit is recursively split such that a plurality of coding units are determined, according to an embodiment.

FIG. 29 illustrates other shapes of a coding unit determinable based on split shape information representable as a binary code, according to an embodiment.

FIG. 31 illustrates an example of filtering units included in a largest coding unit and filtering performing information of a filtering unit, according to an embodiment.

FIG. 33 illustrates an index according to a Z-scan order of a coding unit, according to an embodiment.

BEST MODE

Figure 1:
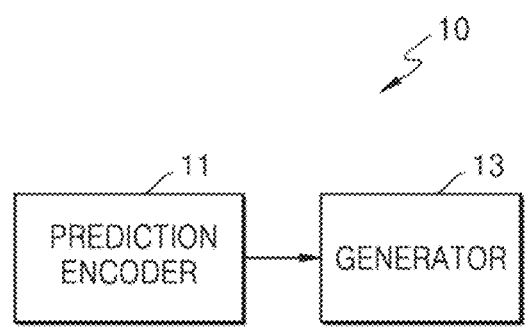
FIG. 1 is a block diagram illustrating a configuration of a motion vector encoding apparatus, according to an embodiment.

A method of decoding a motion vector according to an embodiment includes: obtaining information indicating a motion vector resolution (MVR) of a current block from a bitstream; selecting one candidate block from among at least one candidate block, based on the MVR of the current block; and obtaining a motion vector of the current block corresponding to the MVR, by using a motion vector of the determined one candidate block as a prediction motion vector of the current block.

A method of decoding a motion vector according to an embodiment includes: obtaining information indicating one candidate block for a current block from a bitstream; determining one candidate motion vector resolution (MVR) from among at least one candidate MVR as an MVR of the current block, based on the information indicating the one candidate block; and obtaining a motion vector of the current block corresponding to the MVR, by using a motion vector of the one candidate block as a prediction motion vector of the current block.

The MVR of the current block may be determined from among at least one candidate MVR.

The at least one candidate MVR and the at least one candidate block may be mapped in a one-to-one (1:1) manner.

The method may further include, based on information about at least one from among the current block, a previously decoded block, a current slice, a previously decoded slice, a current picture, and a previously decoded picture, determining a number and a type of the at least one candidate MVR.

The method may further include, based on information about at least one from among the current block, a previously decoded block, a current slice, a previously decoded slice, a current picture, and a previously decoded picture, determining a position of the at least one candidate block to be mapped to the at least one candidate MVR.

The determining of the MVR of the current block may include: obtaining an index indicating the MVR of the current block from the bitstream; and determining a candidate MVR corresponding to the obtained index from among the at least one candidate MVR as the MVR of the current block.

The method may further include, when a motion vector does not exist in the one candidate block, determining a motion block of a block other than the at least one candidate block as the prediction motion vector.

The method may further include, when candidate blocks having a same motion vector exist among the at least one candidate block mapped to at least one candidate MVR selectable for the current block, replacing some from among the candidate blocks having the same motion vector with a block other than the at least one candidate block.

The obtaining of the motion vector of the current block may include, when the MVR of the current block is higher than a minimum MVR from among at least one candidate MVR, upscaling a residual motion vector obtained from the bitstream.

The obtaining of the motion vector of the current block may include, when the MVR of the current block is higher than a minimum MVR from among at least one candidate MVR, adjusting the prediction motion vector.

The adjusting may include: downscaling the prediction motion vector, based on a difference between the MVR of the current block and the minimum MVR; when the downscaled prediction motion vector does not indicate an integer pixel unit, changing the downscaled prediction motion vector to indicate the integer pixel unit; and obtaining the adjusted prediction motion vector by upscaling the changed downscaled prediction motion vector.

An apparatus for decoding a motion vector includes: an obtainer configured to obtain information indicating a motion vector resolution (MVR) of a current block from a bitstream; and a prediction decoder configured to determine one candidate block from among at least one candidate block based on the MVR of the current block and obtain a motion vector of the current block corresponding to the MVR by using a motion vector of the determined one candidate block as a prediction motion vector of the current block.

A method of encoding a motion vector includes: determining a motion vector resolution (MVR) of a current block; determining one candidate block from among at least one candidate block, based on the determined MVR; obtaining a motion vector of the current block according to the determined MVR; and generating a bitstream including at least one from among information indicating the MVR and information indicating the one candidate block, and a residual motion vector between the motion vector of the current block and a motion vector of the one candidate block.

A bitstream stored in a storage medium includes: information indicating a motion vector resolution (MVR) of a current block or information indicating one candidate block for the current block; and information corresponding to a residual motion vector obtained by using a motion vector of the current block determined according to the MVR and a motion vector of the one candidate block, wherein the information indicating the MVR of the current block and the information indicating the one candidate block for the current block are mapped to each other.

MODE OF DISCLOSURE

As the present disclosure allows for various changes and numerous embodiments, exemplary embodiments will be illustrated in the drawings and described in detail in the written description. However, this is not intended to limit the present disclosure to particular modes of practice, and it is to be appreciated that all changes, equivalents, and replaces that do not depart from the spirit and technical scope of the present disclosure are encompassed in the present disclosure.

In the description of the present disclosure, certain detailed explanations of the related art are omitted when it is deemed that they may unnecessarily obscure the essence of the present disclosure. Also, numbers (e.g., first and second) used in the description of embodiments of the disclosure are intended to merely distinguish one component from another.

When a component is referred to as being "connected" or "accessed" to or by any other component, it should be understood that the component may be directly connected or accessed to or by the other component, but another new component may also be interposed between them, unless otherwise specifically indicated.

Regarding an element with a suffix such as 'unit' or 'module', two or more elements may be combined into one element or one element may be divided into two or more elements according to functions. In addition, each of respective components to be described below may additionally perform some or all functions among functions which other components take charge of in addition to a primary function which each component takes charge of and some functions among primary functions which the respective components take charge of may be exclusively performed by other components.

Also, the term 'image' or picture' used herein may refer to a still image of a video, or a moving image, i.e., a video itself.

Also, the term 'sample' used herein refers to data that is assigned to a sampling location of an image and is to be processed. For example, pixels in an image of a spatial domain or transform coefficients in a transform domain may be samples. A unit including one or more samples may be defined as a block.

Also, the term 'current block' used herein may refer to a block of a largest coding unit, a coding unit, a prediction unit, or a transform unit of a current image to be encoded or decoded.

Also, the term 'MVR' used herein may refer to the precision of a position of a pixel that may be indicated by a motion vector determined through inter prediction from among pixels included in a reference image (or an interpolated reference image). When an MVR has an N pixel unit (N is a rational number), it means that a motion vector may have the precision of an N pixel unit. For example, an MVR of ¼ pixel unit may mean that a motion vector may indicate a pixel position of a ¼ pixel unit (i.e., a subpixel unit) in an interpolated reference image, and an MVR of 1 unit pixel may mean that a motion vector may indicate a pixel position corresponding to a 1 pixel unit (i.e., an integer pixel unit) in an interpolated reference image.

Also, the term 'candidate MVR' used herein refers to one or more MVRs that may be selected as an MVR of a block, and the term 'candidate block' refers to one or more blocks that are mapped to a candidate MVR and may be used as a block for a prediction motion vector of a block to be inter predicted.

Also, the term 'pixel unit' used herein may be interchangeably used with the terms 'pixel precision' and 'pixel accuracy'.

An apparatus and method of encoding a motion vector and an apparatus and method of decoding a motion vector according to an embodiment will be described with reference to FIGS. 1 through 4.

A motion vector encoding apparatus 10 and a motion vector encoding method may be included in a video encoding apparatus 200 and method and method described below. Also, a motion vector decoding apparatus 30 and a motion vector decoding method may be included in a video decoding apparatus 100 and method described below.

FIG. 1 is a block diagram illustrating a configuration of the motion vector encoding apparatus 10, according to an embodiment.

Inter prediction in video encoding refers to a prediction method using a similarity between a current image and another image. A reference block similar to a current block of the current image is detected from a reference image that is decoded earlier than the current image, and a distance between the current block and the reference block is represented by using a motion vector. Also, a difference of pixel values between the current block and the reference block may be represented as residual data. Accordingly, information output via inter prediction of the current block is not image information of the current block, but may be an index, a motion vector, and residual data indicating the reference block, thereby improving encoding and decoding efficiency.

The motion vector encoding apparatus 10 according to an embodiment may encode a motion vector used for inter prediction for each block of each image of a video.

A type of a block may be a square shape or a rectangular shape, or may be an arbitrary geometrical shape. A block according to an embodiment is not limited to a data unit of a certain size, and may include a largest coding unit, a coding unit, a prediction unit, and a transform unit from among coding units according to a tree structure.

Video encoding and decoding methods based on the coding units according to the tree structure will be described below with reference to FIGS. 11 through 34.

As shown in FIG. 1, the motion vector encoding apparatus 10 according to an embodiment may include a prediction encoder 11 and a generator 13. As described above, the motion vector encoding apparatus 10 may be included in the video encoding apparatus 200 of FIG. 12, and the prediction encoder 11 may be included in an encoder 220 of the video encoding apparatus 200 and the generator 13 may be included in a bitstream generator 210 of the video encoding apparatus 200.

The motion vector encoding apparatus 10 may perform encoding on a motion vector by performing inter prediction in a block unit split from a picture.

Regarding a current block including a coding unit or a prediction unit split from the coding unit, the motion vector encoding apparatus 10 according to an embodiment may search for a prediction block most similar to the current block in a reference image through motion estimation, and may determine a motion vector indicating motion information between the current block and the prediction block.

In an embodiment, the prediction encoder 11 may select one candidate MVR from among at least one candidate MVR as an MVR of the current block, and may determine a motion vector of the current block according to the selected MVR. The prediction encoder 11 may use a motion vector of a candidate block mapped to the selected MVR of the current block from among at least one candidate block as a prediction motion vector of the current block.

In an embodiment, the prediction encoder 11 may select one candidate block for the current block from among the at least one candidate block, and may determine one candidate MVR mapped to the selected candidate block from among the at least one candidate MVR as an MVR of the current block.

In an embodiment, a one-to-one (1:1) mapping relationship or a correspondence relationship between the at least one candidate MVR and the at least one candidate block may be preset in the motion vector encoding apparatus 10. When the at least one candidate MVR and the at least one candidate block are mapped in a 1:1 manner, it may mean that when one candidate MVR from among the at least one candidate MVR is determined as an MVR of the current block, a position of one candidate block to be used as a prediction motion vector of the current block is accordingly determined, and in contrast, when one candidate block to be used as a prediction motion vector of the current block is determined from among the at least one candidate block, one candidate MVR is accordingly determined as an MVR of the current block. That is, in an embodiment of the present disclosure, it would be understood that one candidate block is allocated to each of the at least one candidate MVR.

The at least one candidate MVR may include at least one from among an MVR of ⅛ pixel unit, an MVR of ¼ pixel unit, an MVR of ½ pixel unit, an MVR of 1 pixel unit, an MVR of 2 pixel unit, an MVR of 4 pixel unit, and an MVR of 8 pixel unit. However, a candidate MVR is not limited to the above examples, and MVRs having various values may be included in the candidate MVR.

In the present specification, when a first MVR is higher than a second MVR, it means that a pixel unit of the first MVR is higher than a pixel unit of the second MVR. For example, an MVR of 1 pixel unit is higher than an MVR of ½ pixel unit, and an MVR of ½ pixel unit is higher than an MVR of ¼ pixel unit. In fact, although prediction when a motion vector is determined by using an MVR of ¼ pixel unit is more accurate than that when a motion vector is determined by using an MVR of 1 pixel unit, the present specification will describe a size difference of each MVR based on a size of a pixel unit of each MVR for convenience of explanation.

The at least one candidate block may be selected from among blocks including spatial blocks and temporal blocks associated with the current block. The spatial blocks associated with the current block may include at least one block spatially adjacent to the current block. The temporal blocks may include a block located at the same position as the current block in a reference image having a picture order count (POC) different from a POC of the current block and at least one block spatially adjacent to the block at the same position.

In an embodiment, when the at least one candidate MVR includes an MVR of ¼ pixel unit, an MVR of ½ pixel unit, an MVR of 1 pixel unit, and an MVR of 2 pixel unit and the at least one candidate block includes a left block, an upper block, a left upper block, and an upper left block, a mapping relationship or a correspondence relationship between (the MVR of ¼ pixel unit and the left block), (the MVR of ½ pixel unit and the upper block), (the MVR of 1 pixel unit and the left upper block), and (the MVR of 2 pixel unit and the upper left block) may be set in the motion vector encoding apparatus 10. Accordingly, when the MVR of ¼ pixel unit is selected as an MVR of the current block, the prediction encoder 11 may accordingly use a motion vector of the left block as a prediction motion vector of the current block. Also, when the upper block is selected as a prediction motion vector of the current block, the prediction encoder 11 may accordingly determine the MVR of ½ pixel unit as an MVR of the current block.

In an embodiment, the prediction encoder 11 may determine the number and a type of selectable candidate MVRs in a block unit, a slice unit, or a picture unit, based on information about at least one from among a current block, a previously encoded block, a current slice, a previously encoded slice, a current picture, and a previously encoded picture. The prediction encoder 11 may determine one candidate MVR from among the selectable candidate MVRs for the current block determined in the block unit, the slice unit, or the picture unit as an MVR of the current block.

For example, the prediction encoder 11 may differently determine at least one candidate MVR selectable for the current block and at least one candidate MVR selectable for a subsequent block. For example, an MVR of ¼ pixel unit and an MVR of ½ pixel unit may be determined as the at least one candidate MVR selectable for the current block, and an MVR of 1 pixel unit and an MVR of 2 pixel unit may be determined as the at least one candidate MVR for the subsequent block. Alternatively, only one MVR may be determined as a candidate MVR for any block.

For example, when the selectable at least one candidate MVR is determined in the block unit, the prediction encoder 11 may compare a size of the current block with a predetermined size and may cause only one MVR to be included in the candidate MVR or may cause a plurality of MVRs to be included in the candidate MVR. Alternatively, when the selectable at least one candidate MVR is determined in the block unit, the prediction encoder 11 may determine the number and a type of the candidate MVR selectable for the current block based on an MVR of a previously encoded neighboring block.

Also, for example, when the selectable at least one candidate MVR is determined in the slice or picture unit, the prediction encoder 11 may determine the number and a type of candidate MVRs selectable for the current slice or the current picture according to a type of a slice or a picture. Also, for example, when the selectable at least one candidate MVR is determined in the slice or picture unit, the prediction encoder 11 may determine the number and a type of the candidate MVR selectable for the current slice or the current picture according to whether the slice or the picture is referred to by another slice or picture.

In an embodiment, the prediction encoder 11 may determine a position of at least one candidate block mapped to each of at least one candidate MVR in a block unit, a slice unit, or a picture unit, based on information about at least one from among a current block, a previously encoded block, a current slice, a previously encoded slice, a current picture, and a previously encoded picture.

For example, the prediction encoder 11 may differently determine at least one candidate block selectable for the current block and at least one candidate block selectable for a subsequent block. For example, when the position of the selectable candidate block is determined in the block unit, an upper block and a left block may be respectively mapped to an MVR of 1 pixel unit and an MVR of 2 pixel unit corresponding to candidate MVRs of the current block and an upper left block and a left lower block may be respectively mapped to an MVR of 1 pixel unit and an MVR of 2 pixel unit corresponding to candidate MVRs of the subsequent block.

In an embodiment, the number and a type of at least one candidate MVR and a position of at least one candidate block to be respectively mapped to the at least one candidate MVR may be fixed and set as a default for a video to be encoded.

In an embodiment, the prediction encoder 11 may determine one candidate MVR from among at least one candidate MVR as an MVR of a current block, and may determine a motion vector of the current block according to the MVR of the current block.

In order to determine the motion vector of the current block, the prediction encoder 11 may interpolate a reference image by using a minimum MVR from among the at least one candidate MVR.

In an embodiment, when a candidate MVR of smallest pixel unit (i.e., a minimum MVR) from among the at least one candidate MVR has a 1/n pixel unit (n is a natural number), the prediction encoder 11 may generate a subpixel of 1/n pixel unit from an integer pixel of the reference image for motion estimation, and may determine the motion vector of the current block indicating a subpixel of maximum 1/n pixel unit according to the MVR of the current block.

Determining a motion vector by using an MVR of small pixel unit according to characteristics of a current image may always be less efficient than determining a motion vector by using an MVR of large pixel unit. A case where a motion vector is determined by using an MVR of small pixel unit may require more bits to represent a size of a motion vector (or a residual motion vector) and may be less efficient in terms of a bit rate than a case where a motion vector is determined by using an MVR of large pixel unit. Accordingly, for example, an MVR may be adaptively determined according to a resolution of an image to reduce a bit rate and minimize a decrease in the quality of a reconstructed image.

The prediction encoder 11 according to an embodiment may adaptively determine an MVR of a current block, and may determine a motion vector by using a pixel unit of the determined MVR. For example, when a pixel unit of the MVR of the current block is ½, the prediction encoder 11 may determine a motion vector indicating a pixel of ½ pixel unit in a reference image interpolated according to a minimum MVR.

The prediction encoder 11 according to an embodiment may use a motion vector of any of candidate blocks as a prediction motion vector of the current block, or may change the motion vector of any of the candidate blocks and may use the changed motion vector as a prediction motion vector of the current block.

In an embodiment, the prediction encoder 11 may adjust a motion vector of a candidate block for the current block based on a difference between the minimum MVR from among available candidate MVRs and the MVR of the current block, and then may determine a motion vector of the current block by using the adjusted motion vector.

Because the motion vector of the candidate block is predicted to indicate pixel coordinates in an image interpolated according to the minimum MVR, the motion vector of the candidate block is adjusted to correspond to the MVR of the current block. Also, the reason why the motion vector of the candidate block is adjusted is to represent a residual motion vector in an integer unit as described below.

For example, when the MVR of the current block is a 1 pixel unit, the motion vector of the current block has to be determined to indicate a pixel of 1 pixel unit in the image interpolated according to the minimum MVR. However, when the motion vector of the candidate block does not indicate the pixel of 1 pixel unit, the motion vector of the candidate block is adjusted to indicate the pixel of 1 pixel unit.

A method of adjusting a motion vector of a candidate block will be described below with reference to FIGS. 9A and 9B.

The prediction encoder 11 determines a motion vector of a current block by using each candidate MVR, by using a motion vector of any of candidate blocks respectively mapped to at least one candidate MVR as a prediction motion vector, and determines one from among the at least one candidate MVR based on a cost. When the cost is calculated, a rate-distortion cost may be used.

In order to determine the motion vector of the current block, the prediction encoder 11 may determine a search start position in a reference image by using a motion vector (or an adjusted motion vector) of a candidate block allocated to the each candidate MVR, and may determine the motion vector of the current block according to the each candidate MVR by searching for an optimal reference block according to the each candidate MVR. For example, first, the prediction encoder 11 may perform box search in a search range of 5 pixels around the search start position. Second, the prediction encoder 11 may perform diamond search in various step sizes. Selectively, the prediction encoder 11 may determine an optimal position by performing raster search.

The prediction encoder 11 may compare a rate-distortion cost based on a difference value between the motion vector of the current block determined according to the each candidate MVR and the motion vector of the candidate block allocated to the each candidate MVR and may determine a candidate MVR and a candidate block having a minimum cost as an MVR of the current block and a candidate block for a prediction motion vector of the current block.

For example, when an MVR of ¼ pixel unit mapped to a left block, an MVR of ½ pixel unit mapped to an upper block, and an MVR of 1 pixel unit mapped to an upper right block are included in the at least one candidate MVR, the prediction encoder 11 may determine the motion vector of the current block in a ¼ pixel unit in a reference image interpolated according to a ¼ pixel unit MVR that is a minimum MVR by using a motion vector of the left block, may determine the motion vector of the current block in a ½ pixel unit in a reference image interpolated according to the ¼ pixel unit MVR by using a motion vector of the upper block, and may determine the motion vector of the current block in a 1 pixel unit in a reference image interpolated according to the ¼ pixel unit MVR by using a motion vector of the upper right block. The prediction encoder 11 may determine one candidate MVR selected based on a cost as the MVR of the current block.

In an embodiment, when a motion vector does not exist in a candidate block from among the candidate blocks respectively mapped to the candidate MVRs for the current block, the prediction encoder 11 may exclude the candidate block having no motion vector and may use another block having a motion vector as a candidate block. In this case, the other block newly used as a candidate block may include a block other than the candidate blocks respectively mapped to the candidate MVRs. The prediction encoder 11 may use the motion vector of the other block determined according to the candidate MVR as a prediction motion vector of the current block. When a block is intra predicted, the intra predicted block may be determined to be a block not having a motion vector.

For example, when it is assumed that at least one candidate MVR available for the current block includes the MVR of ¼ pixel unit mapped to the left block, the MVR of ½ pixel unit mapped to the upper block, and the MVR of 1 pixel unit mapped to the upper right block and a motion vector does not exist in the upper right block, the prediction encoder 11 may map the MVR of 1 pixel unit to a block (e.g., an upper left block) other than the at least one candidate block.

In an embodiment, when a motion vector does not exist in some candidate blocks from among at least one candidate block mapped to the candidate MVRs, positions and mapping priorities of blocks to be newly mapped may be pre-determined.

Also, in an embodiment, when a motion vector does not exist in some candidate blocks from among at least one candidate block mapped to the at least one candidate MVR available for the current block, the prediction encoder 11 may use an arbitrary motion vector (e.g., a zero vector) as a motion vector of the some candidate blocks.

Also, in an embodiment, when candidate blocks having the same motion vector exist from among the at least one candidate block mapped to the at least one candidate MVR available for the current block, some from among the candidate blocks having the same motion vector may be replaced by blocks other than the at least one candidate block. For example, when a motion vector of the left block mapped to a ¼ pixel unit MVR and a motion vector of the upper block mapped to a ½ pixel unit MVR are the same, the prediction encoder 11 may replace one block (e.g., the upper block) from among the left block and the upper block with another block (e.g., the upper left block) and may map the replaced block to a candidate MVR (e.g., a ½ pixel resolution).

In an embodiment, whether motion vectors of two or more candidate blocks are the same may be determined by adjusting motion vectors of the candidate blocks and then comparing the adjusted motion vectors.

When there are a plurality of candidate blocks having the same motion vector, a priority indicating which block from among the plurality of candidate blocks is to be replaced by another block, and positions and priorities of blocks to be newly blocks may be pre-determined.

In an embodiment, when a candidate block and a motion vector of a current block are determined, the prediction encoder 11 may obtain a residual motion vector between the motion vector of the current block and a prediction motion vector.

The generator 13 may generate a bitstream including at least one from among information indicating an MVR of a current block and information indicating a candidate block used as a prediction motion vector of the current block. As described above, because a candidate MVR and the candidate block have a 1:1 mapping relationship, when the MVR of the current is determined, a position of the candidate block may be accordingly determined, and in contrast, when the candidate block is determined in contrast, the MVR of the current block may be accordingly determined. Accordingly, the generator 13 may generate the bitstream including at least one from among information about the MVR of the current block and information for specifying the candidate block.

The generator 13 may cause at least one from among an index indicating the MVR of the current block and an index indicating the candidate block to be included as at least one from among the information indicating the MVR of the current block and the information indicating the candidate block used as the prediction motion vector of the current block.

In an embodiment, when an index is allocated in a unary manner to each of candidate MVRs available for the current block and one index is selected by the prediction encoder 11, the generator 13 may generate a bitstream including the selected index. For example, when the available candidate MVRs include an MVR of ¼ pixel unit, an MVR of ½ pixel unit, an MVR of 1 pixel unit, an MVR of 2 pixel unit, an MVR of 4 pixel unit, and an MVR of 8 pixel unit, the MVR of ¼ pixel unit, the MVR of ½ pixel unit, the MVR of 1 pixel unit, the MVR of 2 pixel unit, the MVR of 4 pixel unit, and the MVR of 8 pixel unit may be respectively represented by indices 0, 10, 110, 1110, 11110, and 11111.

In an embodiment, when an index is allocated in a unary manner to each of at least one candidate block respectively mapped to at least one candidate MVR and one index is selected by the prediction encoder 11, the generator 13 may generate a bitstream including the selected index. For example, when the at least one candidate block includes a left block, an upper block, a left upper block, a left lower block, an upper left block, and an upper right block, the left block, the upper block, the left upper block, the left lower block, the upper left block, and the upper right block may be respectively represented by indices 0, 10, 110, 1110, 11110, and 11111.

In an embodiment, when there is one candidate MVR available for a current block, the prediction encoder 11 omits generating of information indicating an MVR of the current block and a candidate block. Accordingly, information indicating the MVR of the current block and the candidate block may not be included in a bitstream generated by the generator 13.

In an embodiment, when there are two or more candidate MVRs available for a current block, the prediction encoder 11 may generate at least one from among information indicating a candidate block and an MVR of the current block by using a flag or an index.

In an embodiment, the prediction encoder 11 may downscale a residual motion vector that is a difference between a motion vector of a current block and a prediction motion vector.

For example, when an MVR of the current block is higher than a minimum MVR from among candidate MVRs, the prediction encoder 11 may downscale the residual motion vector based on a difference between the minimum MVR and the MVR of the current block. For example, when the minimum MVR has a ¼ pixel unit and the MVR of the current block has a ½ pixel unit, the prediction encoder 11 may downscale the residual motion vector by ½.

In an embodiment, because a residual motion vector is adaptively or selectively downscaled according to an MVR adaptively selected for a current block, a motion vector of the current block may be encoded by using fewer bits.

Figure 2:
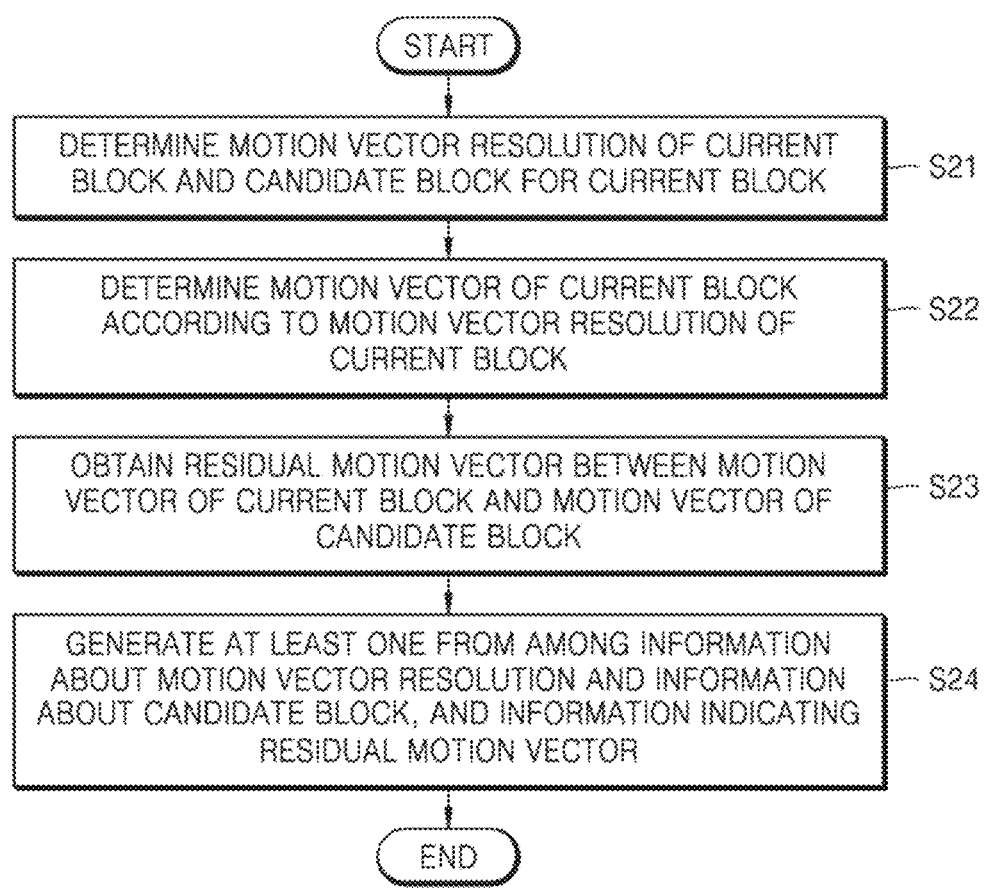
FIG. 2 is a flowchart for describing a motion vector encoding method, according to an embodiment.

FIG. 2 is a flowchart for describing a motion vector encoding method, according to an embodiment.

In operation S21, the motion vector encoding apparatus 10 may determine one candidate MVR from among at least one candidate MVR available for a current block as an MVR of the current block, and may determine a candidate block mapped to the selected MVR from among at least one candidate block as a candidate block for a prediction motion vector of the current block.

Alternatively, in an embodiment, the motion vector encoding apparatus 10 may select a candidate block to be used as the prediction motion vector from among the at least one candidate block, and may determine a candidate MVR mapped to the selected candidate block as the MVR of the current block.

The available at least one candidate MVR may be mapped in a 1:1 manner to the at least one candidate block, and the motion vector encoding apparatus 10 may determine a motion vector of the current block according to each candidate MVR by using each available candidate MVR and a motion vector of a candidate block mapped to the each available candidate MVR. The motion vector encoding apparatus 10 may select a candidate block and one candidate MVR selected based on a cost as the MVR of the current block and the candidate block for the prediction motion vector of the current block.

In an embodiment, the motion vector encoding apparatus 10 may determine the number and a type of the at least one candidate MVR in a block unit, a slice unit, or a picture unit, based on at least one from among the current block, a previously encoded block, a current slice, a previously encoded slice, a current picture, and a previously encoded picture.

In an embodiment, the motion vector encoding apparatus 10 may determine a position of the at least one candidate block to be respectively mapped to the at least one candidate MVR in the block unit, the slice unit, or the picture unit, based on the information about at least one from among the current block, the previously encoded block, the current slice, the previously encoded slice, the current picture, and the previously encoded picture.

In an embodiment, when a motion vector does not exist in a candidate block from among the at least one candidate block respectively mapped to the at least one candidate MVR, the motion vector encoding apparatus 10 may newly map a block other than the at least one candidate block mapped to the candidate MVR to a candidate block, instead of the candidate block not including the motion vector, and may use a motion vector of the newly mapped block as the prediction motion vector of the current block.

Also, in an embodiment, when a motion vector does not exist in a candidate block from among the at least one candidate block mapped to the at least one candidate MVR, the motion vector encoding apparatus 10 may use an arbitrary motion vector (e.g., a zero vector) as a motion vector of the candidate block not including the motion vector.

Also, in an embodiment, when there are candidate blocks having the same motion vector from among the at least one candidate block respectively mapped to the at least one candidate MVR, the motion vector encoding apparatus 10 may replace some of the candidate blocks having the same motion vector with blocks other than the at least one candidate block mapped to the candidate MVR and may newly map the replaced blocks to the candidate MVR.

In operation S22, the motion vector encoding apparatus 10 determines a motion vector of the current block in an interpolated reference image, according to the MVR of the current block.

The motion vector encoding apparatus 10 may adjust a motion vector of a candidate block by comparing a minimum MVR from among at least one candidate MVR selectable for the current block and the MVR of the current block. The motion vector encoding apparatus 10 may determine a search start position in the reference image according to the adjusted motion vector of the candidate block, may search for an optimal reference block in the reference image, and may determine the motion vector of the current block according to the MVR of the current block.

In operation S23, the motion vector encoding apparatus 10 obtains a residual motion vector between the motion vector of the current block and the motion vector (or the adjusted motion vector) of the candidate block.

In operation S24, the motion vector encoding apparatus 10 generates information indicating the residual motion vector, and at least one from among information about the MVR of the current block and information indicating the candidate block used as the prediction motion vector.

The information indicating the residual motion vector and at least one from among the information about the MVR of the current block and the information indicating the candidate block used as the prediction motion vector may be included in a bitstream.

As described above, the motion vector encoding apparatus 10 may downscale the residual motion vector by comparing the MVR of the current block with the minimum MVR from among the at least one candidate MVR.

Figure 3:
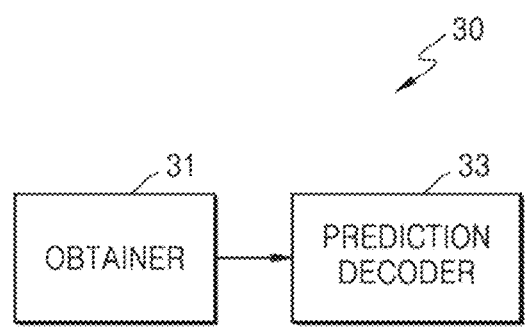
FIG. 3 is a block diagram illustrating a configuration of a motion vector decoding apparatus, according to an embodiment.

FIG. 3 is a block diagram illustrating a configuration of the motion vector decoding apparatus 30, according to an embodiment. The motion vector decoding apparatus 30 of FIG. 3 may be included in the video decoding apparatus 100. In detail, an obtainer 31 may be included in a bitstream obtainer 110 of the video decoding apparatus 100, and a prediction decoder 33 may be included in a decoder 120 of the video decoding apparatus 100.

The motion vector decoding apparatus 30 may determine a motion vector for performing inter prediction of a current block by parsing an obtained bitstream.

The obtainer 31 may obtain information indicating a residual motion vector, and at least one from among information about an MVR of the current block and information indicating a candidate block from the bitstream.

The information about the MVR of the current block may include an index indicating the MVR of the current block, and the information indicating the candidate block may include an index indicating the candidate block.

When the information about the MVR of the current block is obtained by the obtainer 31, the prediction decoder 33 may determine a candidate block to be used as a prediction motion vector of the current block according to the MVR of the current block.

In an embodiment, the obtainer 31 may obtain the information about the MVR for each inter predicted coding unit. FIG. 10 is a diagram illustrating syntax for obtaining information about an MVR from a bitstream.

Referring to FIG. 10, when a slice including a current coding unit in a phrase 'a' is not an I slice, cu_skip_flag is extracted in a phrase 'b'. cu_skip_flag indicates whether a skip mode is applied to the current coding unit. When it is checked that the skip mode is applied in a phrase 'c', the current coding unit is processed in the skip mode. When it is checked that the skip mode is not applied in a phrase 'd', pred_mode_flag is extracted in a phrase 'e'. pred_mode_flag indicates whether the current coding unit is intra predicted or inter predicted. When the current coding unit is not intra predicted, that is, is inter predicted in a phrase 'f', pred_mvr_idx is extracted in a phrase 'g'. pred_mvr_idx is an index indicating an MVR of the current coding unit, and an MVR corresponding to each index is as shown in Table 1.

TABLE 1

| MVR Index | 0 | 1 | 2 | 3 | 4 |
|---|---|---|---|---|---|
| Resolution (R) in pel | 1/4 | 1/2 | 1 | 2 | 4 |

In an embodiment, when the information indicating the candidate block to be used as the prediction motion vector of the current block is obtained by the obtainer 31, the prediction decoder 33 may determine one candidate MVR from among at least one candidate MVR as the MVR of the current block.

The prediction decoder 33 may pre-store information about a 1:1 mapping relationship (or a correspondence relationship) between at least one candidate MVR selectable for the current block and at least one candidate block. Accordingly, when the information about the MVR of the current block is obtained by the obtainer 31, a candidate block of the current block mapped to the obtained information may be selected, or when the information indicating the candidate block is obtained by the obtainer 31, an MVR of the current block mapped to the obtained information may be selected.

In an embodiment, an MVR index shown in Table 1 may be used as an index of the at least one candidate block. A candidate MVR and a candidate block determined according to an index are as shown in Table 2.

TABLE 2

| Index | 0 | 1 | 2 | 3 | 4 |
|---|---|---|---|---|---|
| Resolution in pel | 1/4 | 1/2 | 1 | 2 | 4 |
| $N^{th}$ MVP | $1^{st}$ MVP | $2^{nd}$ MVP | $3^{rd}$ MVP | $4^{th}$ MVP | $5^{th}$ MVP |

In Table 2, a $1^{st}$ MVP, a $2^{nd}$ MVP, a $3^{rd}$ MVP, a $4^{th}$ MVP, and a $5^{th}$ MVP indicate different candidate blocks.

In an embodiment, the at least one candidate MVR may include at least one from among an MVR of 1/8 pixel unit, an MVR of 1/4 pixel unit, an MVR of 1/2 pixel unit, an MVR of 1 pixel unit, an MVR of 2 pixel unit, an MVR of 4 pixel unit, and an MVR of 8 pixel unit. However, available at least one candidate MVR is not limited to the above example, and MVRs having various values may be included in the candidate MVR.

In an embodiment, the at least one candidate block may be selected from among blocks including spatial blocks and temporal blocks associated with the current block. The spatial blocks may include at least one block spatially adjacent to the current block. The temporal blocks may include a block located at the same point as the current block in a reference image having a POC different from a POC of the current block and at least one block spatially adjacent block to the block at the same position.

In an embodiment, when the at least one candidate MVR includes an MVR of 1/4 pixel unit, an MVR of 1/2 pixel unit, an MVR of 1 pixel unit, and an MVR of 2 pixel unit and the at least one candidate block includes a left block, an upper block, a left upper block, and an upper left block, a mapping relationship or a correspondence relationship between (the MVR of 1/4 pixel unit and the left block), (the MVR of 1/2 pixel unit and the upper block), (the MVR of 1 pixel unit and the left upper block), and (the MVR of 2 pixel unit and the upper left block) may be set in the motion vector decoding apparatus 30. Accordingly, when it is checked that the MVR of 1/4 pixel unit is the MVR of the current block, the prediction decoder 33 may accordingly use a motion vector of the left block as the prediction motion vector of the current block. Also, when the upper block is checked as the prediction motion vector of the current block, the prediction decoder 33 may accordingly determine the MVR of 1/2 pixel unit as the MVR of the current block.

In an embodiment, the prediction decoder 33 may determine the number and a type of selectable at least one candidate MVR in a block unit, a slice unit, or a picture unit, based on information about at least one from among the current block, a previously decoded block, a current slice, a previously decoded slice, a current picture, and a previously decoded picture.

For example, the prediction decoder 33 may differently determine at least one candidate MVR selectable for the current block and at least one candidate MVR selectable for a subsequent block. For example, the MVR of 1/4 pixel unit and the MVR of 1/2 pixel unit may be determined as the at least one candidate MVR selectable for the current block, and the MVR of 1 pixel unit and the MVR of 2 pixel unit may be determined as the at least one candidate MVR selectable for the subsequent block. Alternatively, only one MVR may be included as a candidate MVR for any block.

For example, when the at least one candidate MVR is determined in the block unit, the prediction decoder 33 may compare a size of the current block with a pre-determined size, and may cause only one MVR to be included in the candidate MVR or may cause a plurality of MVRs to be included in the candidate MVR. Alternatively, when the at least one candidate MVR is determined in the block unit, the prediction decoder 33 may determine the number and a type of the candidate MVR of the current block, based on an MVR of the previously decoded block.

Also, for example, when the selectable at least one candidate MVR is determined in the slice or picture unit, the prediction decoder 33 may determine the number and a type of candidate MVRs available for the current slice or the current picture according to a type of a slice or a picture. Also, for example, when the selected at least one candidate MVR is determined in the slice or picture unit, the prediction decoder 33 may determine the number and a type of candidate MVRs selectable for the current slice or the current picture according to whether the slice or the picture is referred to by another slice or picture.

In an embodiment, the prediction decoder 33 may determine a position of the at least one candidate block to be mapped to the at least one candidate MVR in the block unit, the slice unit, or the picture unit, based on the information about at least one from among the current block, the previously decoded block, the current slice, the previously decoded slice, the current picture, and the previously decoded picture.

For example, the prediction decoder 33 may determine a position of a candidate block mapped in a 1:1 manner to a candidate MVR selectable for the current block, based on the information about at least one from among the current block, the previously decoded block, the current slice, the previously decoded slice, the current picture, and the previously decoded picture. For example, the prediction decoder 33 may determine a position of each candidate block to be mapped to the candidate MVR selectable for the current block according to information such as a prediction mode (an intra or inter mode), a motion vector, an MVR, a reference image, or existence of bidirectional prediction of the previously decoded block.

For example, the prediction decoder 33 may differently determine at least one candidate block selectable for the current block and at least one candidate block selectable for a subsequent block. For example, when a position of the candidate block is determined in the block unit, an upper block and a left block may be respectively mapped to an MVR of 1 pixel unit and an MVR of 2 pixel unit corresponding to a candidate MVR of the current block, and an upper left block and a left lower block may be respectively mapped to an MVR of 1 pixel unit and an MVR of 2 pixel unit corresponding to a candidate MVR of the subsequent block.

In an embodiment, an index may be allocated in a unary manner to the each candidate MVR selectable for the current block, and the prediction decoder 33 may select the MVR of the current block according to an index indicating the MVR of the current block obtained by the obtainer 31. For example, when the available candidate MVR includes an MVR of ¼ pixel unit, an MVR of ½ pixel unit, an MVR of 1 pixel unit, an MVR of 2 pixel unit, an MVR of 4 pixel unit, and an MVR of 8 pixel unit, indices 0, 10, 110, 1110, 11110, and 11111 may be respectively allocated to the MVR of ¼ pixel unit, the MVR of ½ pixel unit, the MVR of 1 pixel unit, the MVR of 2 pixel unit, the MVR of 4 pixel unit, and the MVR of 8 pixel unit.

In an embodiment, an index may be allocated in a unary manner to each candidate block mapped to the at least one candidate MVR, and the prediction decoder 33 may select the candidate block used as the prediction motion vector of the current block according to a candidate block index obtained by the obtainer 31. For example, when the at least one candidate block includes a left block, an upper block, a left upper block, a left lower block, an upper left block, and an upper right block, indices 0, 10, 110, 1110, 11110, and 11111 may be respectively allocated to the left block, the upper block, the left upper block, the left lower block, the upper left block, and the upper right block.

In an embodiment, when there is one candidate MVR available for the current block, the obtainer 31 may skip or omit obtaining of the information indicating the candidate block used for the prediction motion vector of the current block and the MVR of the current block. When obtaining of information is skipped, it may mean that the information is not obtained from a bitstream.

In an embodiment, when there are two or more candidate MVRs available for the current block, the obtainer 31 may obtain a flag or an index indicating at least one from among the information indicating the MVR of the current block and the information indicating the candidate block used to determine the prediction motion vector of the current block.

The prediction decoder 33 according to an embodiment may use directly a motion vector of the candidate block as the prediction motion vector of the current block, or may change the motion vector of the candidate block and may use the changed motion vector as the prediction motion vector of the current block.

In an embodiment, when a motion vector does not exist in a candidate block mapped to the MVR of the current block, the prediction decoder 33 may map a block having a motion vector other than candidate blocks respectively mapped to candidate MVRs to the MVR of the current block. The prediction decoder 33 may use a motion vector of the newly mapped block as the prediction motion vector of the current block. When a certain block is intra predicted, the block may be determined to be a block not including a motion vector.

For example, when it is assumed that the at least one candidate MVR available for the current block includes the MVR of ¼ pixel unit mapped to the left block, the MVR of ½ pixel unit mapped to the upper block, and the MVR of 1 pixel unit mapped to the upper right block and a motion vector does not exist in the upper right block, the prediction decoder 33 may map the MVR of 1 pixel unit to a block, for example, the upper left block, other than the at least one candidate block.

In an embodiment, when a motion vector does not exist in the candidate block mapped to the MVR of the current block, positions and priorities of other blocks to be newly used may be pre-determined.

Also, in an embodiment, when a motion vector does not exist in the candidate block mapped to the MVR of the current block, the prediction decoder 33 may use an arbitrary motion vector (e.g., a zero vector) as the prediction motion vector of the current block.

Also, in an embodiment, when a motion vector does not exist in the candidate block mapped to an MVR of the current block, a motion vector of a candidate block corresponding to the current block may be derived by using a motion vector of another candidate block.

Also, in an embodiment, when candidate blocks having the same motion vector exist from among the at least one candidate block mapped to the at least one candidate MVR available for the current block, the prediction decoder 33 may replace some from among the candidate blocks having the same motion vector with blocks other than the at least one candidate block mapped to each candidate MVR. For example, when a motion vector of the left block mapped to a ¼ pixel unit MVR and a motion vector of the upper block mapped to a ½ pixel unit MVR are the same, the prediction decoder 33 may replace one block (e.g., the upper block) from among the left block and the upper block with another block (e.g., the upper left block) and may map the replaced block to a candidate MVR (e.g., a ½ pixel resolution).

When there are a plurality of candidate blocks having the same motion vector, a priority indicating which block from among the plurality of candidate blocks is to be replaced by another block, and types and priorities of blocks to be newly mapped may be pre-determined.

In an embodiment, when candidate blocks having the same motion vector exist from among the at least one candidate block mapped to the at least one candidate MVR available for the current block, the prediction decoder 33 may allocate an arbitrary motion vector (e.g., a zero vector) to some from among the candidate blocks having the same motion vector. In this case, priorities of candidate blocks to which the arbitrary motion vector is to be allocated may be pre-determined.

In an embodiment, when candidate blocks having the same motion vector exist from among the at least one candidate block mapped to the at least one candidate MVR available for the current block, the prediction decoder 33 may derive a motion vector of any of some from among the candidate blocks having the same motion vector by using a motion vector of another candidate block.

In an embodiment, whether motion vectors of two or more candidate blocks are the same may be determined by adjusting motion vectors of the candidate blocks and then comparing the adjusted motion vectors as described below.

Also, in an embodiment, the prediction decoder 33 may receive related information from a bitstream, without directly determining whether candidate blocks having the same motion vector exist from among the at least one candidate block. In an embodiment, the obtainer 31 may obtain information indicating that a candidate block is replaced from the bitstream, and the prediction decoder 33 may use a motion vector of the replaced block as the prediction motion vector. When information indicating that a candidate block is replaced is obtained, a type and a priority of a block to be used as the prediction motion vector of the current block according to the MVR of the current block may be pre-determined.

In an embodiment, the prediction decoder 33 may upscale a residual motion vector obtained by the obtainer 31, based on a difference between the MVR of the current block and a minimum MVR from among the at least one candidate MVR. For example, when the MVR of the current block is higher than the minimum MVR, the prediction decoder 33 may upscale the residual motion vector.

Also, in an embodiment, the prediction decoder 33 may selectively adjust the motion vector of the candidate block mapped to the MVR of the current block.

The prediction decoder 33 may obtain a motion vector of the current block by using the selected adjusted motion vector of the candidate block and the selectively upscaled residual motion vector.

Upscaling of the residual motion vector and adjusting of the motion vector of the candidate block will be described in detail.

The prediction decoder 33 may search for a prediction block in a reference image by using the motion vector of the current block, and may reconstruct the current block by adding inverse quantized and inverse transformed residual data to the prediction block.

In an embodiment, the prediction decoder 33 may search for the prediction block in a reference image that is not interpolated when the MVR of the current block is equal to or greater than a 1 pixel unit, and may search for the prediction block in a reference image that is interpolated when the MVR of the current block is less than a 1 pixel unit.

Figure 4:
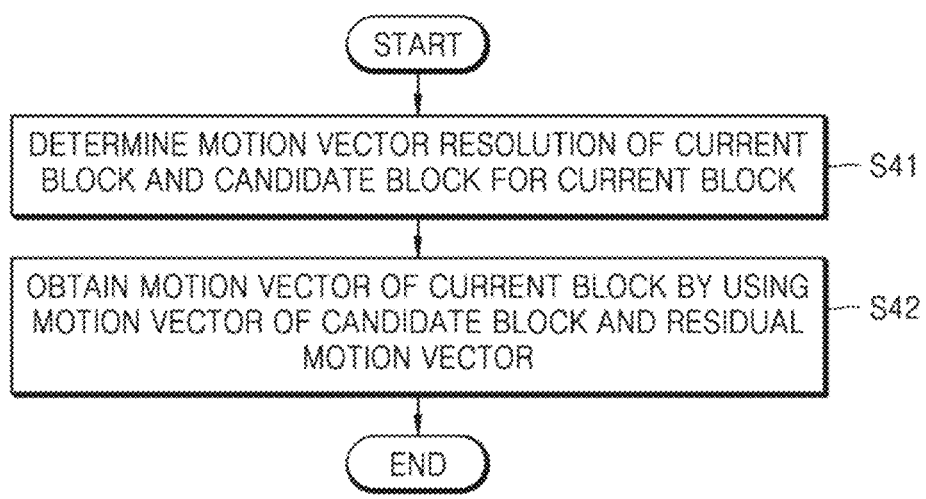
FIG. 4 is a flowchart for describing a motion vector decoding method, according to an embodiment.

FIG. 4 is a flowchart for describing a motion vector decoding method, according to an embodiment.

In operation S41, the motion vector decoding apparatus 30 determines an MVR of a current block, and a candidate block used to determine a prediction motion vector of the current block. The MVR of the current block determined by the motion vector decoding apparatus 30 may correspond to one of at least one MVR candidate selectable for the current block, and the candidate block for the prediction motion vector of the current block may correspond to one from among at least one candidate block mapped to each of the at least one MVR candidate.

The motion vector decoding apparatus 30 may obtain at least one from among information indicating the MVR of the current block and information indicating the candidate block, and a residual motion vector from a bitstream.

When the information indicating the MVR of the current block is obtained from the bitstream, the motion vector decoding apparatus 30 may determine the candidate block to be used as the prediction motion vector based on the obtained information, and when the information indicating the candidate block is obtained from the bitstream, the motion vector decoding apparatus 30 may determine the MVR of the current block based on the obtained information.

In operation S42, the motion vector decoding apparatus 30 obtains a motion vector of the current block by using a motion vector of the candidate block and the residual motion vector.

In an embodiment, the motion vector decoding apparatus 30 may selectively adjust the motion vector of the candidate block according to a difference between the MVR of the current block and a minimum MVR, and may selectively upscale the residual motion vector according to a difference between the minimum MVR and the MVR of the current block.

Figure 5:
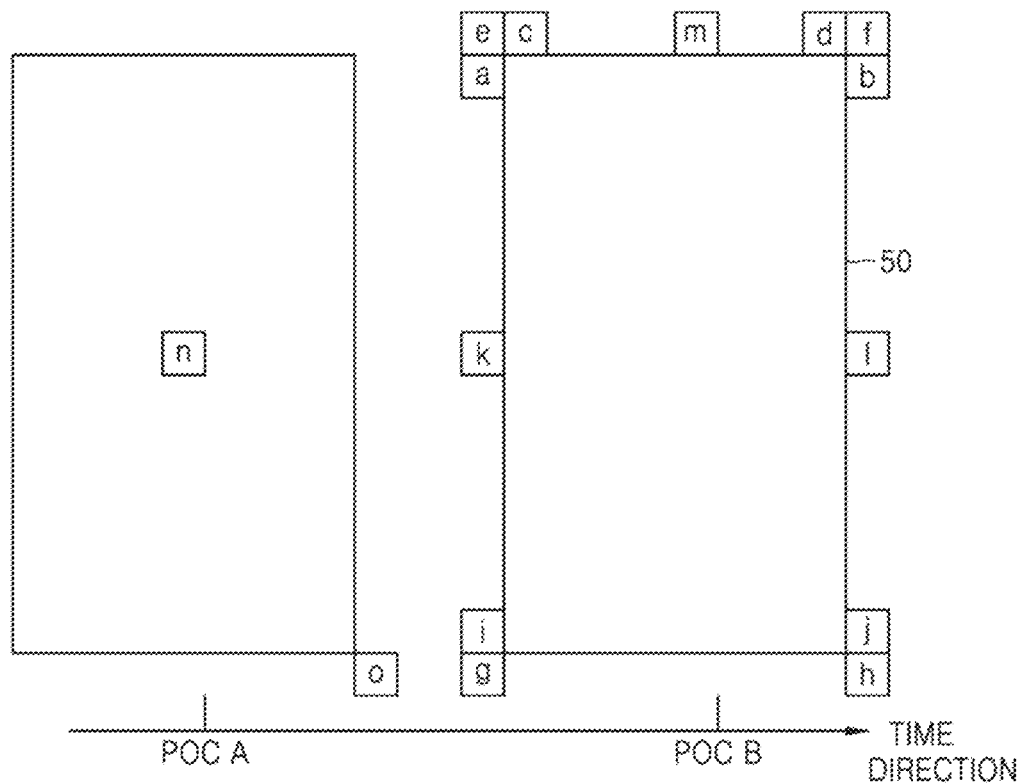
FIG. 5 is a diagram for describing at least one candidate block mapped in a one-to-one (1:1) manner to at least one candidate motion vector resolution (MVR).

FIG. 5 is a diagram for describing at least one candidate block mapped in a 1:1 manner to at least one candidate MVR.

At least one candidate block selected from among spatial blocks and temporal blocks associated with a current block 50 may be mapped to each candidate MVR.

For example, the spatial blocks may include a left upper block a, a right upper block b, an upper left block c, an upper right block d, a left top outer block e, a right top outer block f, a left bottom outer block g, a right bottom outer block h, a left lower block I, a right lower block j, a left block k, a right block l, and an upper block m that are adjacent to the current block 50. The temporal blocks may include a block n that is located at the same position as the current block 50 in a reference image having a POC different from that of the current block 50 and a block o adjacent to the block n at the same position.

The at least one candidate block selected from among the spatial blocks and the temporal blocks may be mapped to the each candidate MVR, and as shown in FIG. 6, an MVR of ⅛ pixel unit may be mapped to the left block k, an MVR of ¼ pixel unit may be mapped to the upper block m, an MVR of ½ pixel unit may be mapped to the left upper block a, an MVR of 1 pixel unit may be mapped to the upper left block c, and an MVR of 2 pixel unit may be mapped to the left lower block i. The illustrated mapping relationship may be an example, and various mapping relationships may be set.

According to an embodiment of FIG. 6, when an MVR of the current block is determined to be a ⅛ pixel unit, the motion vector encoding apparatus 10 uses a motion vector of the left block as a prediction motion vector of the current block. Also, when a motion vector of the upper block is used as the prediction motion vector of the current block, the motion vector encoding apparatus 10 may determine the MVR of the current block as a ¼ pixel unit.

Also, when it is checked that the MVR of the current block is a ⅛ pixel unit, the motion vector decoding apparatus 30 uses a motion vector of the left block as the prediction motion vector of the current block. Also, when it is checked that a motion vector of the upper block is used as the prediction motion vector of the current block, the motion vector decoding apparatus 30 may determine the MVR of the current block as a ¼ pixel unit.

In an embodiment, positions of candidate blocks mapped to at least one candidate MVR may be determined in an order of selection as the prediction motion vector when motion vector of blocks in a predetermined number of pictures are determined by using an MVR of arbitrary pixel unit. For example, when the number of available candidate MVRs is 5, each of 5 blocks frequently selected as the prediction motion vector from among blocks including spatial blocks and temporal blocks may be mapped to each candidate MVR.

In an embodiment, when candidate MVRs and candidate blocks are mapped in a 1:1 manner, the candidate MVRs may be arranged in an ascending order according to a size of a pixel unit, the candidate blocks may be arranged in a descending order according to the number of times selected as the prediction motion vector, and then candidate MVRs and candidate blocks having orders corresponding to each other may be mapped.

As described above, a type and the number of candidate MVRs selectable for the current block may vary according to information about at least one from among the current block, a previously decoded block, a current slice, a previously decoded slice, a current picture, and a previously decoded picture.

Also, positions of candidate blocks respectively mapped to the candidate MVRs selectable for the current block may vary according to the information about at least one from among the current block, the previously decoded block, the current slice, the previously decoded slice, the current picture, and the previously decoded picture.

The type and the number of the candidate MVRs selectable for the current block and the positions of the candidate blocks respectively mapped to the candidate MVRs selectable for the current block may be determined by using the same criterion by the motion vector encoding apparatus 10 and the motion vector decoding apparatus 30, and thus although the motion vector encoding apparatus 10 encodes an index indicating the MVR of the current block or an index indicating a candidate block for the current block and transmits the encoded indices to the motion vector decoding apparatus 30, the motion vector decoding apparatus 30 may determine the MVR or the candidate block corresponding to each index.

Figure 7:
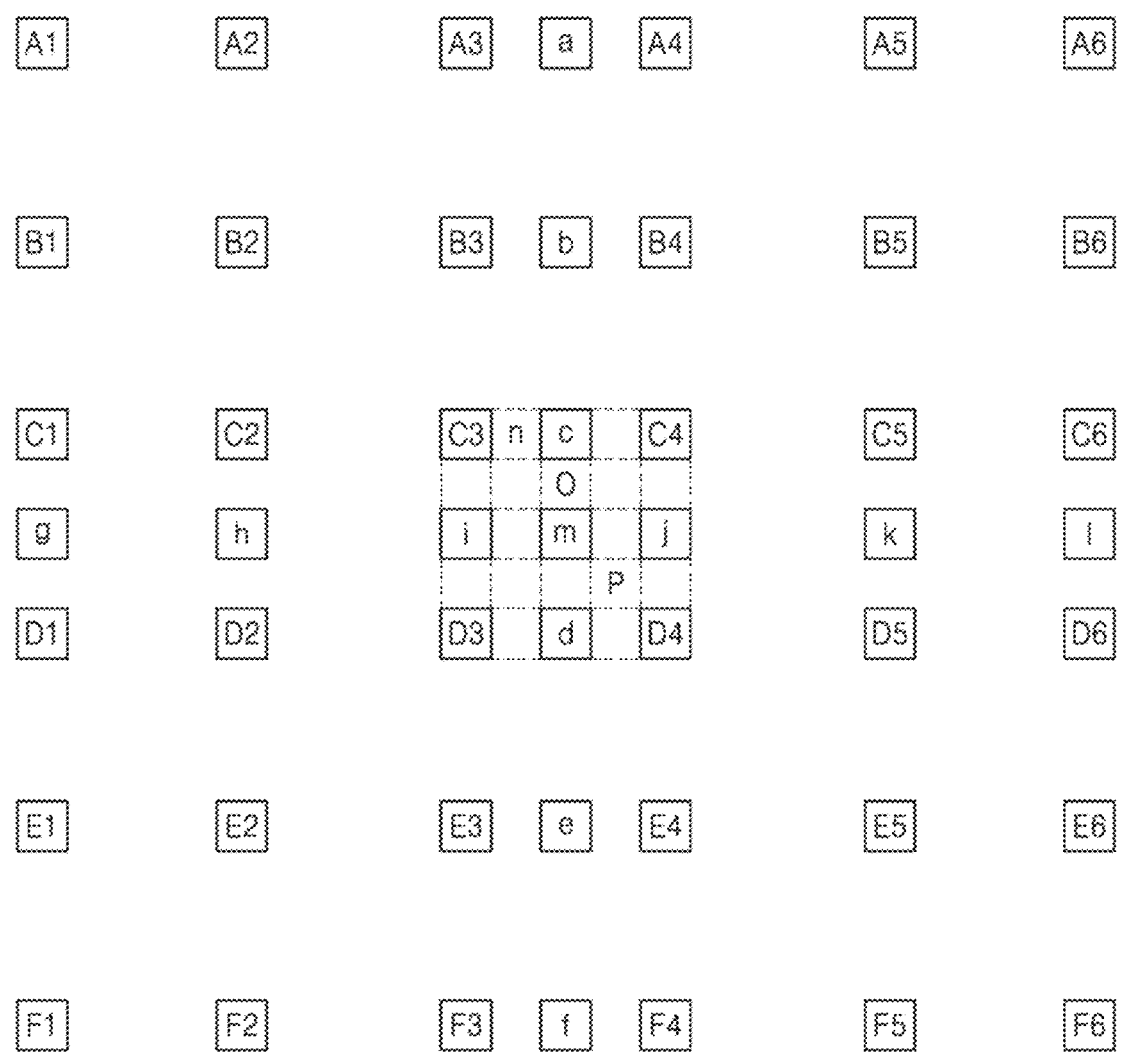

FIG. 7 is a diagram for describing interpolation for determining a motion vector according to various MVRs.

The motion vector encoding apparatus 10 may determine a motion vector of a current block according to at least one candidate MVR to inter predict the current block. Available candidate MVRs may include an MVR of $2^k$ pixel unit (k is an integer). When k is greater than 0, the motion vector may indicate only integer pixels in an interpolated reference image, and when k is less than 0, the motion vector may indicate subpixels and integer pixels.

For example, when a minimum MVR has a ¼ pixel unit, the motion vector encoding apparatus 10 may interpolate a reference image so that subpixels of ¼ pixel unit are generated, and may determine the motion vector so that the motion vector indicates a pixel corresponding to each candidate MVR, for example, a ¼ pixel unit MVR, a ½ pixel unit MVR, a 1 pixel unit MVR, or a 2 pixel unit MVR.

For example, the motion vector encoding apparatus 10 may generate subpixels (a through l) of ½ pixel unit by performing interpolation on the reference image by using an n-tap finite impulse response (FIR) filter. Upon examining vertical ½ subpixels, the motion vector encoding apparatus 10 may generate the subpixel 'a' by performing interpolation by using A1, A2, A3, A4, A5, and A6 of integer pixel unit, and may generate the subpixel 'b' by performing interpolation by using B1, B2, B3, B4, B5, and B6 of integer pixel unit. The subpixels 'c', 'd', 'e', and 'f' may be generated by using the same method.

Pixel values of vertical subpixels may be calculated as follows. For example, pixel values of the subpixels 'a' and 'b' may be calculated as shown in a=(A1−5×A2+20×A3+20×A4−5×A5+A6)/32 and b=(B1−5×B2+20×B3+20×B4−5×B5+B6)/32. Pixel values of the subpixels 'c', 'd', 'e', and 'f' may be calculated by using the same method.

The motion vector encoding apparatus 10 may generate horizontal subpixels by performing interpolation by using a 6-tap FIR filter, like vertical subpixels. The subpixel 'g' may be generated by using A1, B1, C1, D1, E1, and F1, and the subpixel 'h' may be generated by using A2, B2, C2, D2, E2, and F2.

Pixel values of the horizontal subpixels are calculated by using the same method as that used to calculate the pixel values of the vertical subpixels. For example, a pixel value of the subpixel 'g' may be calculated as shown in g=(A1−5×B1+20×C1+20×D1−5×E1+F1)/32.

The subpixel 'm' of ½ pixel unit in a diagonal direction may be interpolated by using another ½ pixel unit subpixel. In other words, a pixel value of the subpixel 'm' may be calculated as shown in m=(a−5×b+20×c+20×d−5×e+f)/32.

When the subpixels of ½ pixel unit are generated, the motion vector encoding apparatus 10 may generate subpixels of ¼ pixel unit by using the subpixels of ½ pixel unit and integer pixels. The motion vector encoding apparatus 10 may generate subpixels of ¼ pixel unit by performing interpolation by using two adjacent pixels. Alternatively, the subpixels of ¼ pixel unit may be generated by directly applying an interpolation filter to pixel values of the integer pixels without using pixel values of the subpixels of ½ pixel unit.

Although the interpolation filter is, for example, a 6-tap filter in the above, the motion vector encoding apparatus 10 may interpolate a picture by using a filter having another tap number. Examples of the interpolation filter may include a 4-tap filter, a 7-tap filter, an 8-tap filter, and a 12-tap filter.

FIG. 8 illustrates positions of pixels that may be indicated by motion vectors according to a ¼ pixel unit MVR, a ½ pixel unit MVR, a 1 pixel unit MVR, and a 2 pixel unit MVR when an available minimum MVR is the ¼ pixel unit MVR.

(a), (b), (c), and (d) of FIG. 8 respectively illustrate coordinates (marked by black squares) of pixels that may be indicated by motion vectors of the ¼ pixel unit MVR, the ½ pixel unit MVR, the 1 pixel unit MVR, and the 2 pixel unit MVR based on coordinates (0, 0).

When a minimum MVR is the ¼ pixel unit MVR, the coordinates of the pixel that may be indicated by the motion vector of the ¼ pixel unit MVR become (a/4, b/4) (a and b are integers), the coordinates of the pixel that may be indicated by the motion vector of the ½ pixel unit MVR become (2c/4, 2d/4) (c and d are integers), the coordinates of the pixel that may be indicated by the motion vector of the 1 pixel unit MVR become (4c/4, 4f/4) (e and f are integers), and the coordinates of the pixel that may be indicated by the motion vector of the 2 pixel unit MVR become (8 g/4, 8h/4) (g and h are integers). That is, when a minimum MVR has a $2^m$ (m is an integer) pixel unit, coordinates of a pixel that may be indicated by a $2^n$ (n is an integer) pixel unit MVR become ($2^{n-m}*i/2^{-m}$, $2^{n-m}*j/2^{-m}$) (i and j are integers) Although a motion vector is determined according to a specific MVR, the motion vector is represented by coordinates in an image interpolated according to a ¼ pixel unit.

In an embodiment, because the motion vector encoding apparatus 10 determines a motion vector in an image interpolated according to a minimum MVR, in order to represent the motion vector (and a prediction motion vector) by using an integer, the motion vector of an integer unit may be represented by multiplying the motion vector (and the prediction motion vector) by a reciprocal of a pixel unit value of the minimum MVR, for example, $2^{-m}$ when the minimum MVR has a $2^m$ (m is an integer) pixel unit. The motion vector of the integer unit multiplied by $2^{-m}$ may be used in the motion vector encoding apparatus 10 and the motion vector decoding apparatus 30.

When the motion vector of the ½ pixel unit MVR starting from the coordinates (0, 0) indicates coordinates (2/4, 6/4) and the minimum MVR has a ¼ pixel unit, the motion vector encoding apparatus 10 may determine (2, 6), which is obtained by multiplying the motion vector by an integer 4, as a motion vector.

When a size of an MVR is less than a 1 pixel unit, in order to perform motion prediction in a subpixel unit, the motion vector encoding apparatus 10 according to an embodiment may search for a block similar to a current block in a reference image based on the subpixel unit according to a motion vector determined in an integer pixel unit.

For example, when an MVR of a current block is the ¼ pixel unit MVR, the motion vector encoding apparatus 10 may determine a motion vector in an integer pixel unit, may interpolate a reference image to generate subpixels of ½ pixel unit, and then may search for a most similar prediction bock in a (−1~1, −1~1) range based on the motion vector determined in the integer pixel unit. Next, the motion vector encoding apparatus 10 may interpolate the reference image to generate subpixels of ¼ pixel unit again, and then may search for a most similar prediction block in the (−1~1, −1~1) range based on a motion vector determined in a ½ pixel unit, thereby determining a motion vector of the final ¼ pixel unit MVR.

For example, when a motion vector of an integer pixel unit is (−4, −3) based on the coordinates (0, 0), a motion vector in the ½ pixel unit MVR becomes (−8, −6) (=(−4*2, −3*2)); and when the motion vector moves by (0, −1), the motion vector of the ½ pixel unit MVR is finally determined to be (−8, −7) (=(−8, −6-1)). When a motion vector in the ¼ pixel unit MVR is changed to (−16, −14) (=(−8*2, −7*2)); and when the motion vector moves by (−1, 0) again, a final motion vector of the ¼ pixel unit MVR may be determined to be (−17, −14) (=(−16-1, −14)).

When the MVR of the current block is higher than the 1 pixel unit MVR, in order to perform motion prediction in a large pixel unit, the motion vector encoding apparatus 10 according to an embodiment may search for a block similar to the current block in a reference picture based on a pixel unit larger than a 1 pixel unit according to a motion vector determined in an integer pixel unit. Pixels located in pixel units (e.g., a 2 pixel unit, a 3 pixel unit, or a 4 pixel unit) larger than the 1 pixel unit may be referred to as super pixels.

A prediction motion vector adjusting method selectively performed by the motion vector encoding apparatus 10 and the motion vector decoding apparatus 30 according to an embodiment will be described with reference to FIGS. 9A and 9B.

When an MVR of the current block is higher than a minimum MVR from among selectable candidate MVRs, the motion vector encoding apparatus 10 and the motion vector decoding apparatus 30 may adjust a motion vector of a candidate block used as a prediction motion vector of the current block.

In order to adjust the prediction motion vector represented by coordinates in an image interpolated according to the minimum MVR to the MVR of the current block, the motion vector encoding apparatus 10 and the motion vector decoding apparatus 30 may adjust the prediction motion vector to indicate neighboring pixels instead of a pixel indicated by the prediction motion vector.

Figure 9A:
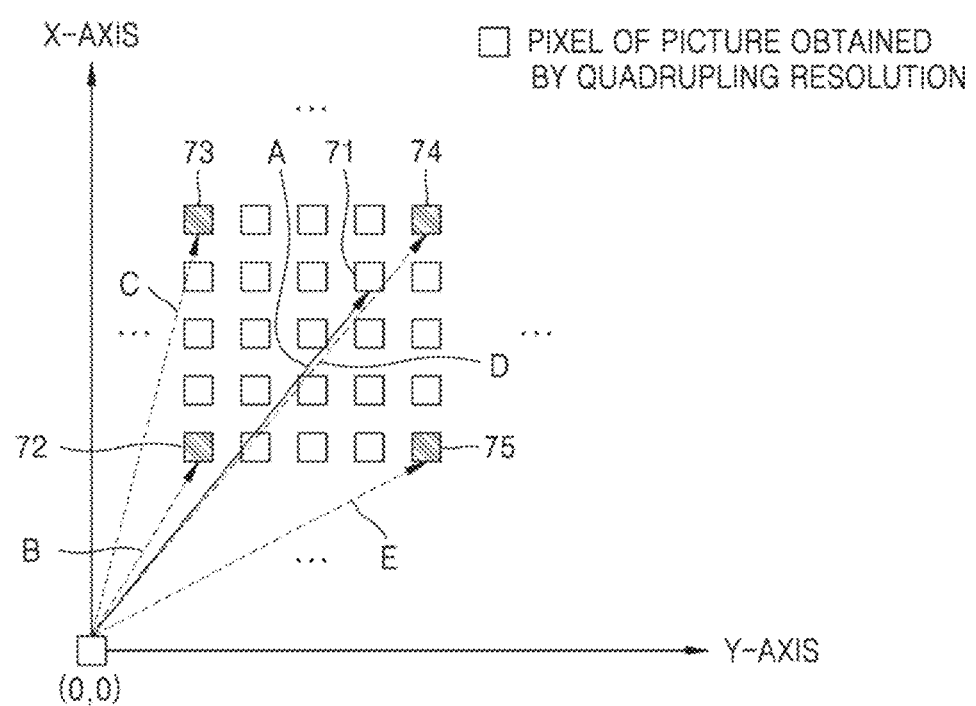
FIGS. 9A and 9B are diagrams for describing a method of adjusting a prediction motion vector.

For example, in order to adjust a prediction motion vector A indicating a pixel 71 of coordinates (19, 27) based on coordinates (0, 0) in FIG. 9A to a 1 pixel unit MVR that is the MVR of the current block, the coordinates (19, 27) of the pixel 71 indicated by the prediction motion vector A may be divided by an integer 4 (that is, may be downscaled), and coordinates (19/4, 27/4) obtained as a division result may not indicate an integer pixel unit.

The motion vector encoding apparatus 10 and the motion vector decoding apparatus 30 may adjust the downscaled prediction motion vector to indicate an integer pixel unit. For example, coordinates of neighboring integer pixels around the coordinates (19/4, 27/4) are (16/4, 28/4), (16/4, 24/4), (20/4, 28/4), and (20/4, 24/4). In this case, after the motion vector encoding apparatus 10 and the motion vector decoding apparatus 30 may adjust the downscaled prediction motion vector A to indicate the coordinates (20/4, 28/4) located at the right-top instead of the coordinates (19/4, 27/4) and may multiply an integer 4 (that is, upscale) so that a finally adjusted prediction motion vector D indicates a pixel 74 corresponding to coordinates (20, 28).

Referring to FIG. 9A, the prediction motion vector A before adjustment may indicate the pixel 71, and the finally adjusted prediction motion vector D may indicate the pixel 74 of an integer unit located at the right-top of the pixel 71.

When a prediction motion vector is adjusted according to an MVR of a current block, the motion vector encoding apparatus 10 and the motion vector decoding apparatus 30 according to an embodiment may cause the adjusted prediction motion vector to indicate a pixel located at the right-top of a pixel indicated by the prediction motion vector before adjustment. The motion vector encoding apparatus 10 and the motion vector decoding apparatus 30 according to another embodiment may cause the adjusted prediction motion vector to indicate a pixel located at the left-top, a pixel located at the left-bottom, or a pixel located at the right-bottom of the pixel indicated by the prediction motion vector before adjustment.

In an embodiment, when any one of an x-coordinate value and a y-coordinate value indicated by the downscaled prediction motion vector indicates an integer pixel, the motion vector encoding apparatus 10 and the motion vector decoding apparatus 30 may increase or decrease only the coordinate value not indicating the integer pixel to indicate an integer pixel. That is, when the x-coordinate value indicated by the downscaled prediction motion vector indicates an integer pixel, the motion vector encoding apparatus 10 and the motion vector decoding apparatus 30 may cause the adjusted prediction motion vector to indicate an integer pixel located at the top or the bottom of the pixel indicated by the prediction motion vector before adjustment. Alternatively, when the y-coordinate value indicated by the downscaled prediction motion vector indicates an integer pixel, the motion vector encoding apparatus 10 and the motion vector decoding apparatus 30 may cause the adjusted prediction motion vector to indicate an integer pixel located at the left or the right of the pixel indicated by the prediction motion vector before adjustment.

When the prediction motion vector is adjusted, the motion vector encoding apparatus 10 and the motion vector decoding apparatus 30 may different select a point indicated by the adjusted prediction motion vector according to the MVR of the current block.

Figure 9B:
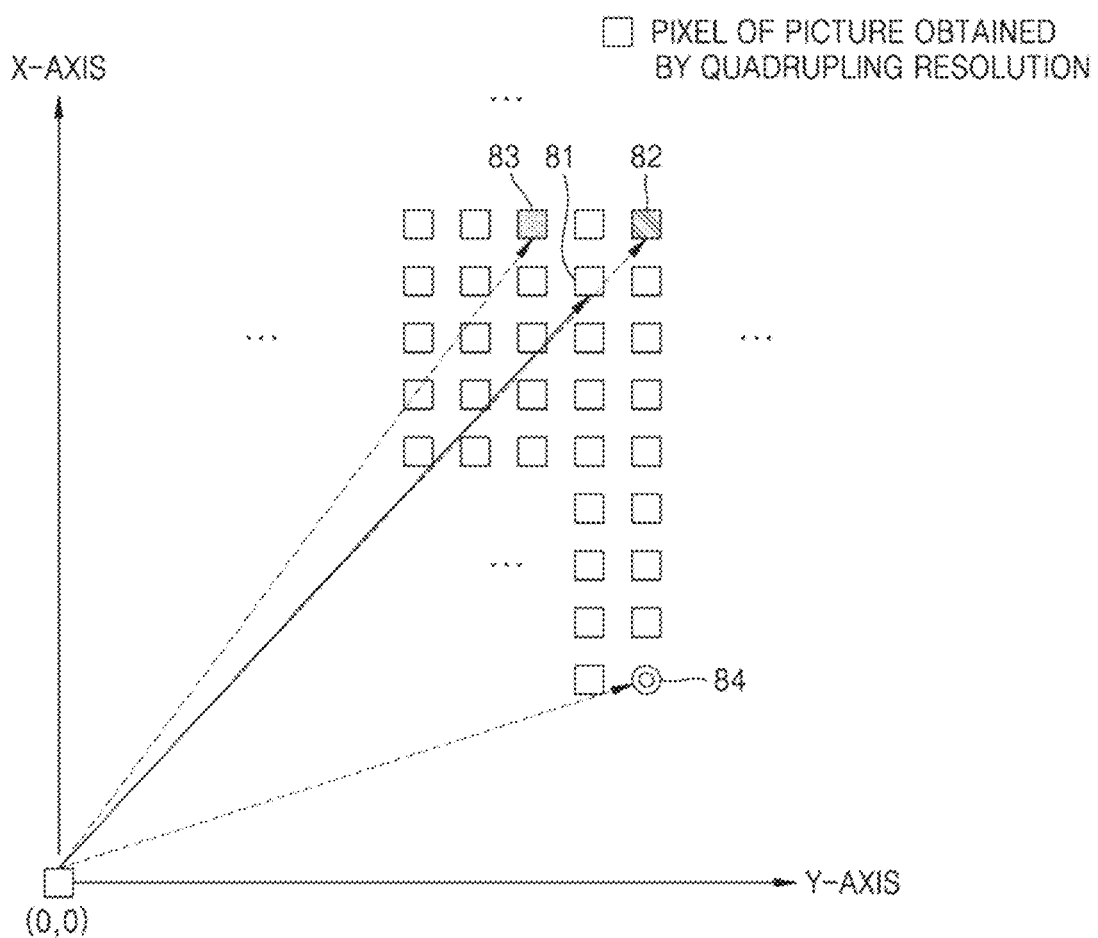

For example, referring to FIG. 9B, when the MVR of the current block is a ½ pixel unit MVR, the motion vector encoding apparatus 10 and the motion vector decoding apparatus 30 may cause the adjusted prediction motion vector to indicate a pixel 83 at the left-top of a pixel 81 indicated by the prediction motion vector before adjustment; when the MVR of the current block is a 1 pixel unit MVR, the motion vector encoding apparatus 10 and the motion vector decoding apparatus 30 may cause the adjusted prediction motion vector to indicate a pixel 82 at the right-top of the pixel 81 indicated by the prediction motion vector before adjustment; and when the MVR of the current block is a 2 pixel unit MVR, the motion vector encoding apparatus 10 and the motion vector decoding apparatus 30 may cause the adjusted prediction motion vector to indicate a pixel 84 at the right-bottom of the pixel 81 indicated by the prediction motion vector before adjustment.

The motion vector encoding apparatus 10 and the motion vector decoding apparatus 30 may determine which pixel is to be indicated by the adjusted prediction motion vector, based on at least one from among the MVR of the current block, the prediction motion vector, information of a neighboring block, encoding information, and an arbitrary pattern.

When the motion vector of the candidate block is adjusted in consideration of the MVR of the current block and the minimum MVR, the motion vector encoding apparatus 10 and the motion vector decoding apparatus 30 may adjust the motion vector of the candidate block according to Equation 1.

$$pMV' = ((pMV >> k) + \text{offset}) << k \quad \text{[Equation 1]}$$

In Equation 1, when pMV' denotes the adjusted prediction motion vector, and k that is a value determined according to a difference between the MVR of the current block and the minimum MVR may be m-n when the MVR of the current block is a $2^m$ pixel unit (m is an integer), the minimum MVR is a $2^n$ pixel unit (n is an integer), and m>n.

In an embodiment, k may be an index of an MVR, and when candidate MVRs include a ¼ pixel unit MVR, a ½ pixel unit MVR, a 1 pixel unit MVR, a 2 pixel unit MVR, and a 4 pixel unit MVR, MVRs corresponding to indices are as shown in Table 1. When an MVR index is received from a bitstream, the motion vector decoding apparatus 30 may adjust the motion vector of the candidate block according to Equation 1 by using the MVR index as k.

Also, in Equation 1, >> or << that is a bit shift operation refers to an operation of reducing or increasing a size of the prediction motion vector. Also, offset denotes a value added or subtracted to indicate an integer pixel when pMV downscaled according to a k value does not indicate an integer pixel. offset may be differently determined according to each of an x-coordinate value and a y-coordinate value of a basic MV.

In an embodiment, when the downscaled pMV is changed to indicate an integer pixel, the motion vector encoding apparatus 10 and the motion vector decoding apparatus 30 may change the downscaled pMV according to the same criterion.

In an embodiment, when an x-coordinate value and a y-coordinate value of the downscaled pMV do not indicate an integer pixel, the motion vector encoding apparatus 10 and the motion vector decoding apparatus 30 may always increase or decrease the x-coordinate value and the y-coordinate value of the downscaled pMV to indicate an integer pixel. Alternatively, the motion vector encoding apparatus 10 and the motion vector decoding apparatus 30 may round the x-coordinate value and the y-coordinate value of the downscaled pMV to indicate an integer pixel.

In an embodiment, when the motion vector of the candidate block is adjusted, the motion vector encoding apparatus 10 and the motion vector decoding apparatus 30 may omit downscaling and upscaling of the motion vector, and may adjust the motion vector in a coordinate plane in a reference image interpolated according to the minimum MVR to indicate a pixel unit corresponding to the MVR of the current block.

Also, in an embodiment, when the motion vector of the candidate block is adjusted in consideration of the MVR of the current block and the minimum MVR, the motion vector encoding apparatus 10 and the motion vector decoding apparatus 30 may adjust the motion vector according to Equation 2, instead of Equation 1.

$$pMV' = ((pMV + \text{offset}) >> k) << k \quad \text{[Equation 2]}$$

Although Equation 2 is similar to Equation 1, unlike in Equation where offset is applied to the downscaled pMV, offset is applied to original pmV and then is downscaled according to k.

The motion vector encoding apparatus 10 finds a motion vector of the current block by using the MVR of the current block, and obtains a difference between the motion vector of the current block and the prediction motion vector that is selectively adjusted as a residual motion vector.

The motion vector encoding apparatus 10 may determine and encode the residual motion vector as shown in Equation 3. In Equation 3, MV denotes the motion vector of the current block, pMV' denotes the adjusted prediction motion vector, and MVD denotes the residual motion vector.

$$MVD = MV - pMV' \quad \text{[Equation 3]}$$

When the MVR of the current block is higher than the minimum MVR, the motion vector encoding apparatus 10 may downscale the residual motion vector as shown in Equation 4, and may generate a bitstream including information indicating the downscaled residual motion vector.

$$MVD' = (MVD >> k) \quad \text{[Equation 4]}$$

In Equation 4, MVD' denotes the downscaled residual motion vector, and k that is a value determined according to a difference between the minimum MVR and the MVR of the current block is the same as k of Equation 1.

In an embodiment, the motion vector encoding apparatus 10 may downscale the motion vector of the current block and the prediction motion vector (or the adjusted prediction motion vector) according to the k value, and then may encode a difference between the two values as the residual motion vector.

In an embodiment, the motion vector encoding apparatus 10 may calculate the downscaled residual motion vector according to Equation 5, instead of Equation 3 and Equation 4.

$$MVD' = (MV - pMV')/(R*S) \qquad \text{[Equation 5]}$$

In Equation 5, MVD' denotes the downscaled residual motion vector, MV denotes the motion vector of the current block, and pMV' denotes the adjusted prediction motion vector. Also, R denotes a pixel unit value of the MVR of the current block, (e.g., ¼ when the MVR of the current block is a ¼ pixel unit MVR). Also, S denotes a reciprocal of a pixel unit value of the minimum MVR (e.g., 4 when the minimum MVR is a ¼ pixel unit).

The motion vector decoding apparatus 30 may reconstruct the motion vector of the current block by using at least one from among information indicating the candidate block and information indicating the MVR of the current block obtained from the bitstream, and the residual motion vector.

When the MVR of the current block is higher than the minimum MVR, the motion vector decoding apparatus 30 may adjust the prediction motion vector as shown in Equation 1 or Equation 2.

When the MVR of the current block is higher than the minimum MVR, the motion vector decoding apparatus 30 may upscale residual motion data as shown in Equation 6.

$$MVD'' = (MVD' << k) \qquad \text{[Equation 6]}$$

In Equation 6, MVD' denotes the residual motion vector downscaled by an encoding apparatus, and MVD" denotes an upscaled residual motion vector. k that is a value determined according to a difference between the minimum MVR and the MVR of the current block is the same as k of Equation 1.

The motion vector decoding apparatus 30 may decode the motion vector of the current block by adding the prediction motion vector that is selectively adjusted according to a size difference between the minimum MVR and the MVR of the current block to the residual motion vector that is selectively upscaled.

In an embodiment, the motion vector decoding apparatus 30 may determine the upscaled residual motion vector according to Equation 7, instead of Equation 6.

$$MVD'' = MVD' * (R*S) \qquad \text{[Equation 7]}$$

In Equation 7, MVD' denotes the downscaled residual motion vector, and R denotes a pixel unit value of the MVR of the current block (e.g., ¼ when the MVR of the current block is a ¼ pixel unit MVR). Also, S denotes a reciprocal of a pixel unit value of the minimum MVR (e.g., 4 when the minimum MVR is a ¼ pixel unit).

In an embodiment, when the MVR of the current block is less than a 1 pixel unit MVR, the motion vector decoding apparatus 30 may interpolate the reference image according to the minimum MVR and then may search for a prediction block according to the motion vector of the current block. Also, when the MVR of the current block is equal to or higher than a 1 pixel unit MVR, the motion vector decoding apparatus 30 may search for the prediction block according to the motion vector of the current block without interpolating the reference image.

A video encoding method and apparatus and a video decoding method and apparatus based on coding units and transform units having a tree structure according to an embodiment will be described with reference to FIGS. 11 through 34.

Figure 11:
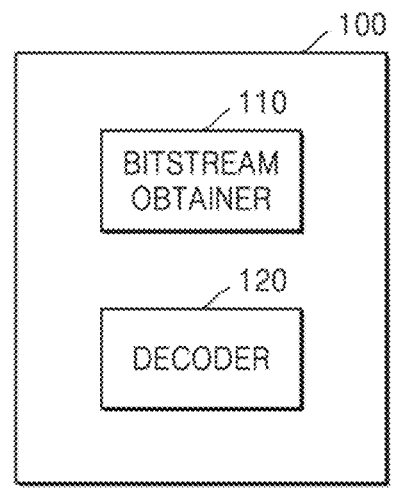
FIG. 11 is a block diagram of a video decoding apparatus for decoding an image based on at least one from among block shape information and split shape information, according to an embodiment.

FIG. 11 is a block diagram of the video decoding apparatus 100 for decoding an image based on at least one from among block shape information and split shape information, according to an embodiment.

Referring to FIG. 11, according to an embodiment, the video decoding apparatus 100 may include the bitstream obtainer 110 for obtaining predetermined information such as split shape information or block shape information from a bitstream and the decoder 120 for decoding an image by using the obtained information. When the bitstream obtainer 110 of the video decoding apparatus 100 obtains at least one from among the block shape information and the split shape information according to an embodiment, the decoder 120 of the video decoding apparatus 100 may determine at least one coding unit for splitting an image based on the at least one from among the block shape information and the split shape information.

According to an embodiment, the decoder 120 of the video decoding apparatus 100 may determine a shape of the coding unit based on the block shape information. For example, the block shape information may include information indicating whether the coding unit has a square shape or a non-square shape. The decoder 120 may determine the shape of the coding unit by using the block shape information.

According to an embodiment, the decoder 120 may determine a shape into which a coding unit is to be split based on the split shape information. For example, the split shape information may indicate information about a shape of at least one coding unit included in the coding unit.

According to an embodiment, the decoder 120 may determine whether the coding unit is split or not split according to the split shape information. The split shape information may include the information about the at least one coding unit included in the coding unit, and when the split shape information indicates that only one coding unit is included in the coding unit or is not split, the decoder 120 may determine that the coding unit including the split shape information is not split. When the split shape information indicates that the coding unit is split into a plurality of coding units, the decoder 120 may split the coding unit into the plurality of coding units included in the coding unit based on the split shape information.

According to an embodiment, the split shape information may indicate the number of coding units into which the coding unit is to be split or a direction in which the coding unit is to be split. For example, the split shape information may indicate that the coding unit is split in at least one direction from among a vertical direction and a horizontal direction or is not split.

Figure 13:
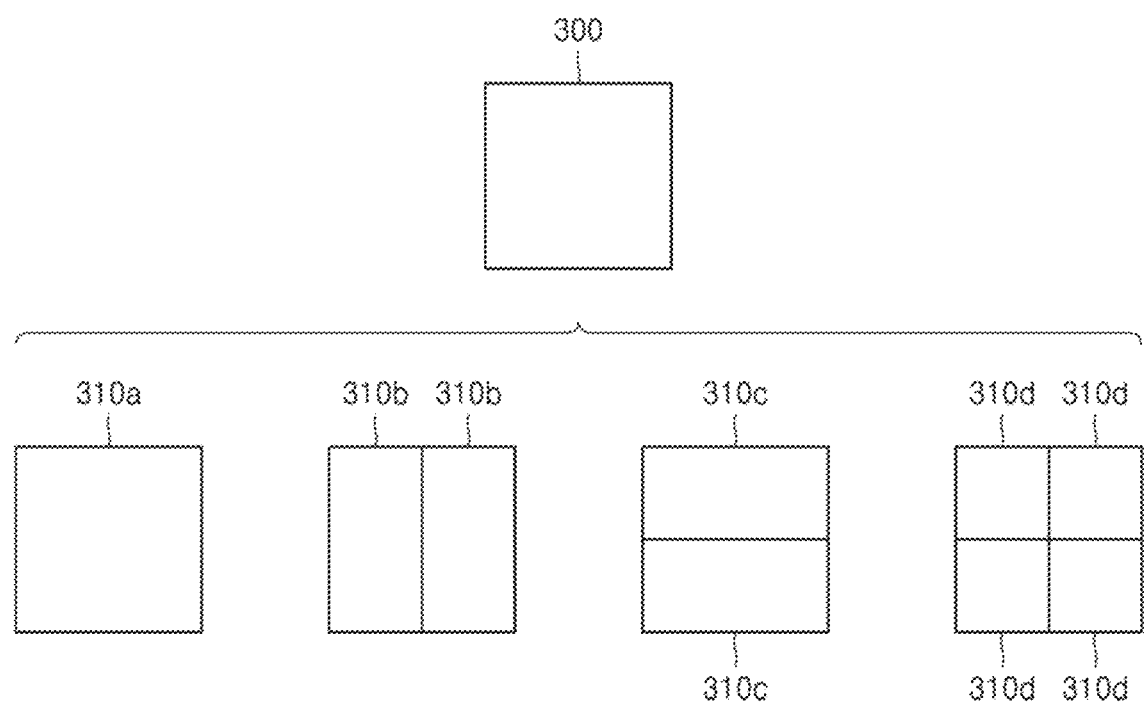
FIG. 13 illustrates a process in which a current coding unit is split to determine at least one coding unit, according to an embodiment.

FIG. 13 illustrates a process in which the video decoding apparatus 100 determines at least one coding unit by splitting a current coding unit according to an embodiment.

A block shape may include 4N×4N, 4N×2N, 2N×4N, 4N×N, or N×4N. N may be a positive integer. Block shape information is information indicating at least one from among a ratio or a size of a shape, a direction, a width, and a height of a coding unit.

The shape of the coding unit may include a square shape and a non-square shape. When the width and the height of the coding unit are the same (4N×4N), the video decoding apparatus 100 may determine the block shape information of the coding unit as a square shape. The video decoding apparatus 100 may determine the shape of the coding unit as a non-square shape.

When the width and the height of the coding unit are different from each other (4N×2N, 2N×4N, 4N×N, or N×4N), the video decoding apparatus 100 may determine the block shape information of the coding unit as a non-square shape. When the shape of the coding unit is a non-square shape, the video decoding apparatus 100 may determine the ratio of the width and the height in the block shape information of the coding unit as at least one from among 1:2, 2:1, 1:4, 4:1, 1:8, and 8:1. Also, the video decoding apparatus 100 may determine whether the coding unit is a horizontal direction or a vertical direction, based on a length of the width and a length of the height of the coding unit. Also, the video decoding apparatus 100 may determine the size of the coding unit, based on at least one from among the length of the width, the length of the height, and an area of the coding unit.

According to an embodiment, the video decoding apparatus 100 may determine a shape of the coding unit by using the block shape information, and may determine which shape the coding unit is split into by using information about a split shape mode. That is, a coding unit splitting method indicated by the information about the split shape mode may be determined according to which block shape is indicated by the block shape information used by the video decoding apparatus 100.

The video decoding apparatus 100 may obtain the information about the split shape mode from a bitstream. However, the present disclosure is not limited thereto, and the video decoding apparatus 100 and the video encoding apparatus 200 may obtain the information about the split shape mode that is pre-promised based on the block shape information. The video decoding apparatus 100 may obtain the information about the split shape mode that is pre-promised for a largest coding unit or a smallest coding unit. For example, the video decoding apparatus 100 may determine a size of the largest coding unit to be 256×256. The video decoding apparatus 100 may determine the information about the pre-promised split shape mode by using quad split. The quad split is a split shape mode in which the width and the height of the coding unit are halved. The video decoding apparatus 100 may obtain the coding unit having a size of 128×128 from the largest coding unit having a size of 256×256 based on the information about the split shape mode. Also, the video decoding apparatus 100 may determine a size of the smallest coding unit to be 4×4. The video decoding apparatus 100 may obtain the information about the split shape mode indicating "not to perform splitting" for the smallest coding unit.

According to an embodiment, the video decoding apparatus 100 may use the block shape information indicating that the current coding unit has a square shape. For example, the video decoding apparatus 100 may determine whether not to split a square coding unit, whether to vertically split the square coding unit, whether to horizontally split the square coding unit, or whether to split the square coding unit into four coding units, based on the information about the split shape mode. Referring to FIG. 13, when the block shape information of a current coding unit 300 indicates a square shape, the decoder 120 may determine that a coding unit 310a having the same size as the current coding unit 300 is not split, based on the information about the split shape mode indicating not to perform splitting, or may determine coding units 310b, 310c, or 310d split based on the information about the split shape mode indicating a predetermined splitting method.

Referring to FIG. 13, according to an embodiment, the video decoding apparatus 100 may determine two coding units 310b obtained by vertically splitting the current coding unit 300, based on the information about the split shape mode indicating to vertically perform splitting. The video decoding apparatus 100 may determine two coding units 310c obtained by horizontally splitting the current coding unit 300, based on the information about the split shape mode indicating to horizontally perform splitting. The video decoding apparatus 100 may determine four coding units 310d obtained by vertically and horizontally splitting the current coding unit 300, based on the information about the split shape mode indicating to vertically and horizontally perform splitting. However, splitting methods of the square coding unit are not limited to the above-described methods, and the information about the split shape mode may indicate various methods. Predetermined splitting methods of splitting the square coding unit will be described in detail below in relation to various embodiments.

Figure 14:
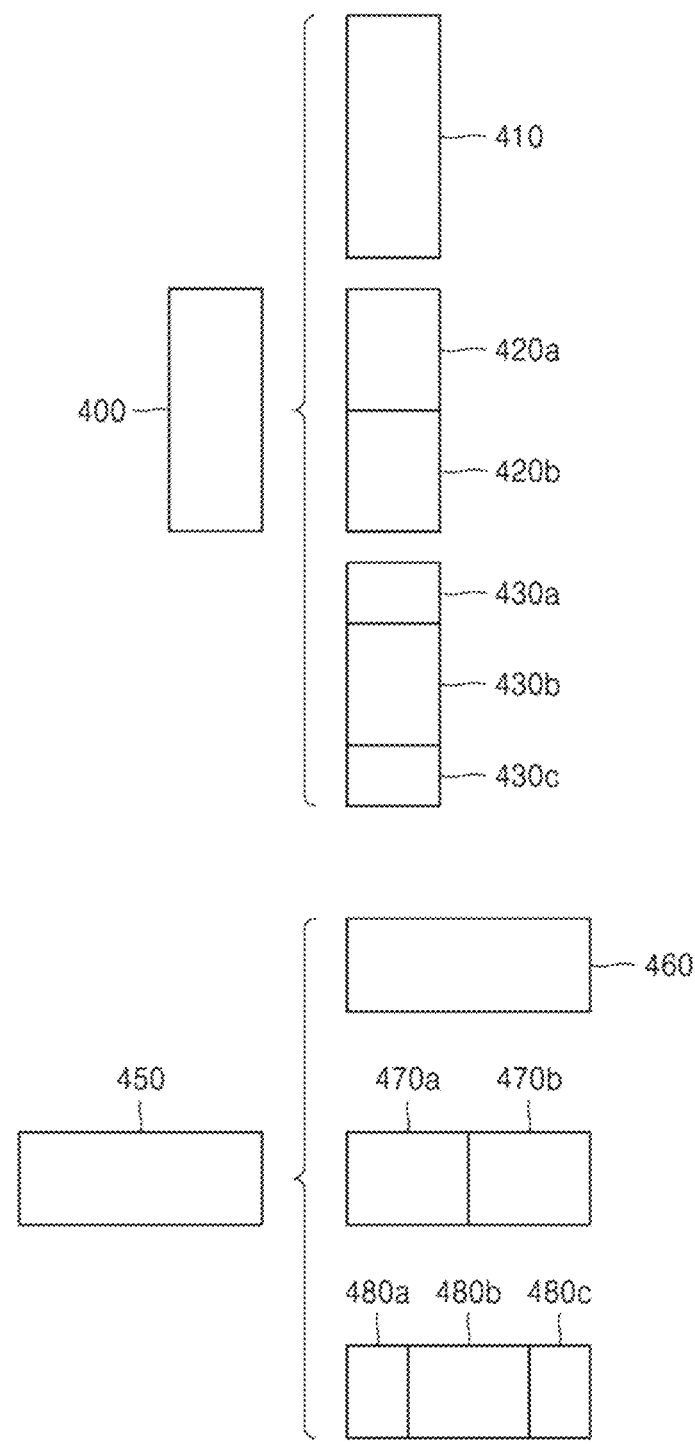
FIG. 14 illustrates a process of determining at least one coding unit by splitting a non-square coding unit, according to an embodiment.

FIG. 14 illustrates a process, performed by the video decoding apparatus 100, of determining at least one coding unit by splitting a non-square coding unit, according to an embodiment.

According to an embodiment, the video decoding apparatus 100 may use block shape information indicating that a current coding unit has a non-square shape. The video decoding apparatus 100 may determine whether not to split the non-square current coding unit or whether to split the non-square current coding unit by using a predetermined splitting method based on information about a split shape mode. Referring to FIG. 14, when the block shape information of a current coding unit 400 or 450 indicates a non-square shape, the video decoding apparatus 100 may determine that a coding unit 410 or 460 having the same size as the current coding unit 400 or 450 is not split, based on the information about the split shape mode indicating not to perform splitting, or determine coding units 420a and 420b, 430a to 430c, 470a and 470b, or 480a to 480c split based on the information about the split shape mode indicating a predetermined splitting method. Predetermined splitting methods of splitting a non-square coding unit will be described in detail below in relation to various embodiments.

According to an embodiment, the video decoding apparatus 100 may determine a splitting method of a coding unit by using the information about the split shape mode and, in this case, the split shape information may indicate the number of one or more coding units generated by splitting the coding unit. Referring to FIG. 14, when the information about the split shape mode indicates to split the current coding unit 400 or 450 into two coding units, the video decoding apparatus 100 may determine two coding units 420a and 420b, or 470a and 470b included in the current coding unit 400 or 450, by splitting the current coding unit 400 or 450 based on the information about the split shape mode.

According to an embodiment, when the video decoding apparatus 100 splits the non-square current coding unit 400 or 450 based on the information about the split shape mode, the location of a long side of the non-square current coding unit 400 or 450 may be considered. For example, the video decoding apparatus 100 may determine a plurality of coding units by splitting the long side of the current coding unit 400 or 450, in consideration of the shape of the current coding unit 400 or 450.

According to an embodiment, when the information about the split shape mode indicates to split a coding unit into an odd number of blocks, the video decoding apparatus 100 may determine an odd number of coding units included in the current coding unit 400 or 450. For example, when the information about the split shape mode indicates to split the current coding unit 400 or 450 into three coding units, the video decoding apparatus 100 may split the current coding unit 400 or 450 into three coding units 430*a*, 430*b*, and 430*c*, or 480*a*, 480*b*, and 480*c*.

According to an embodiment, a ratio between a width and a height of the current coding unit 400 or 450 may be 4:1 or 1:4. When the ratio between the width and the height is 4:1, a length of the width is greater than a length of the height, and thus block shape information may be horizontal. When the ratio between the width and the height is 1:4, a length of the width is less than a length of the height, and thus the block shape information may be vertical. The video decoding apparatus 100 may determine to split the current coding unit into an odd number of blocks based on the information about the split shape mode. Also, the video decoding apparatus 100 may determine a split direction of the current coding unit 400 or 450 based on the block shape information of the current coding unit 400 or 450. For example, when the current coding unit 400 is in a vertical direction, the video decoding apparatus 100 may horizontally split the current coding unit 400 and may determine the coding units 430*a*, 430*b*, and 430*c*. Also, when the current coding unit 450 is in a horizontal direction, the video decoding apparatus 100 may vertically split the current coding unit 450 and may determine the coding units 480*a*, 480*b*, and 480*c*.

According to an embodiment, the video decoding apparatus 100 may determine an odd number of coding units included in the current coding unit 400 or 450, and sizes of all of the determined coding units may not be the same. For example, a predetermined coding unit 430*b* or 480*b* from among the determined odd number of coding units 430*a*, 430*b*, and 430*c*, or 480*a*, 480*b*, and 480*c* may have a size different from the size of the other coding units 430*a* and 430*c*, or 480*a* and 480*c*. That is, coding units which may be determined by splitting the current coding unit 400 or 450 may have multiple sizes and, in some cases, all of the odd number of coding units 430*a*, 430*b*, and 430*c*, or 480*a*, 480*b*, and 480*c* may have different sizes.

According to an embodiment, when the information about the split shape mode indicates to split a coding unit into an odd number of blocks, the video decoding apparatus 100 may determine an odd number of coding units included in the current coding unit 400 or 450, and may put a predetermined restriction on at least one coding unit from among the odd number of coding units generated by splitting the current coding unit 400 or 450. Referring to FIG. 4, the video decoding apparatus 100 may allow a decoding method of the coding unit 430*b* or 480*b* to be different from that of the other coding units 430*a* and 430*c*, or 480*a* and 480*c*, wherein the coding unit 430*b* or 480*b* is at a center location from among the three coding units 430*a*, 430*b*, and 430*c*, or 480*a*, 480*b*, and 480*c* generated by splitting the current coding unit 400 or 450. For example, the video decoding apparatus 100 may restrict the coding unit 430*b* or 480*b* at the center location to be no longer split or to be split only a predetermined number of times, unlike the other coding units 430*a* and 430*c*, or 480*a* and 480*c*.

Figure 15:
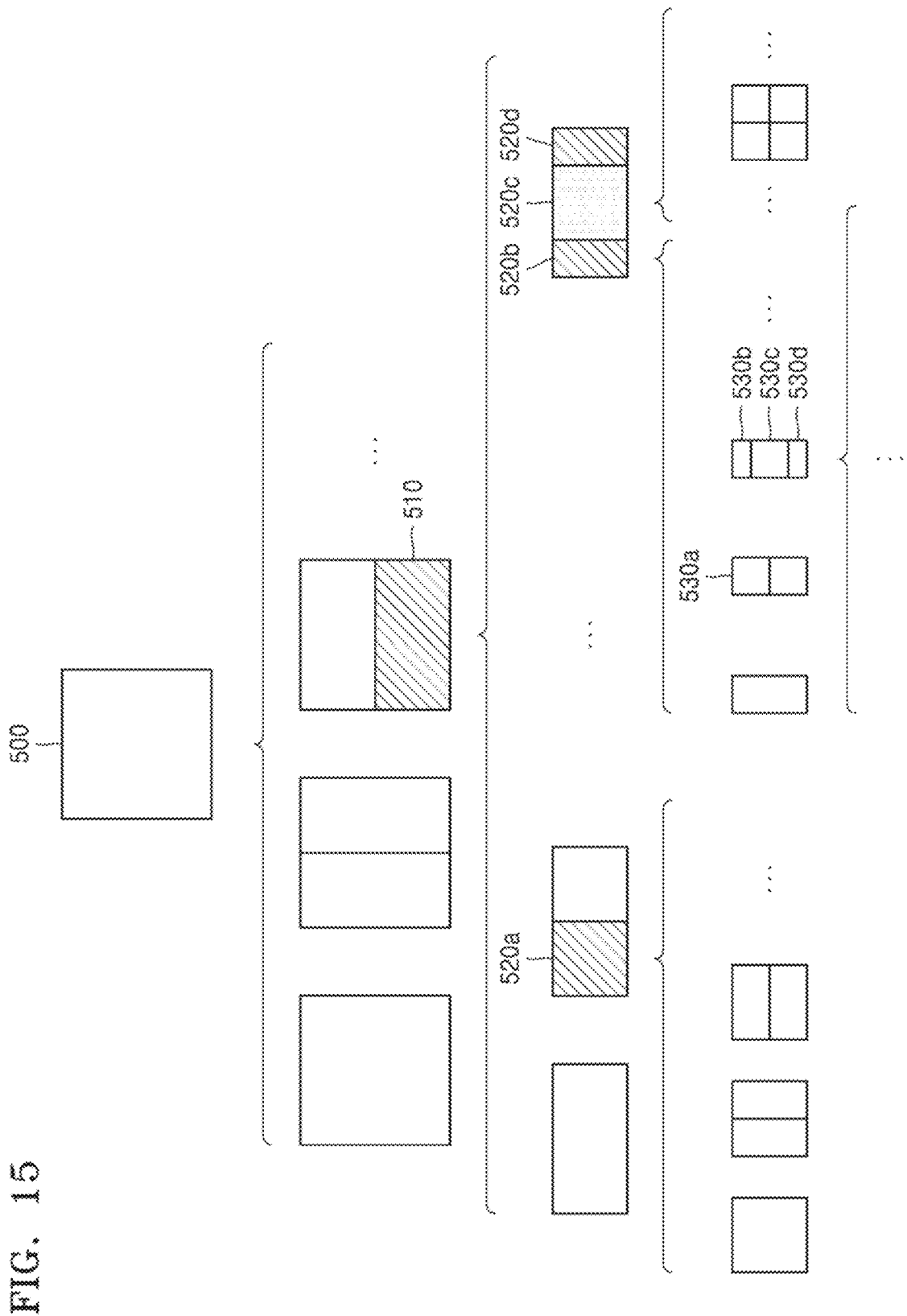
FIG. 15 illustrates a process of splitting a coding unit based on at least one of block shape information and split shape information, according to an embodiment.

FIG. 15 illustrates a process, performed by the video decoding apparatus 100, of splitting a coding unit based on at least one from among block shape information and split shape information, according to an embodiment.

According to an embodiment, the video decoding apparatus 100 may determine to split or not to split a square first coding unit 500 into coding units, based on at least one of the block shape information and information about a split shape mode. According to an embodiment, when the information about the split shape mode indicates to split the first coding unit 500 in a horizontal direction, the video decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that a relationship among the first coding unit, the second coding unit, and the third coding unit follows the above descriptions.

According to an embodiment, the video decoding apparatus 100 may determine to split or not to split the determined second coding unit 510 into coding units, based on at least one of the block shape information and the information about the split shape mode. Referring to FIG. 15, the video decoding apparatus 100 may or may not split the non-square second coding unit 510, which is determined by splitting the first coding unit 500, into one or more third coding units 520*a*, or 520*b*, 520*c*, and 520*d* based on at least one of the block shape information and the information about the split shape mode. The video decoding apparatus 100 may obtain at least one of the block shape information and the information about the split shape mode, and split a plurality of various-shaped second coding units (e.g., 510) by splitting the first coding unit 500, based on the obtained at least one of the block shape information and the information about the split shape mode, and the second coding unit 510 may be split by using the splitting method of the first coding unit 500, based on at least one of the block shape information and the information about the split shape mode. According to an embodiment, when the first coding unit 500 is split into the second coding units 510 based on at least one of the block shape information and the information about the split shape mode of the first coding unit 500, the second coding unit 510 may also be split into the third coding units 520*a*, or 520*b*, 520*c*, and 520*d* based on at least one of the block shape information and the information about the split shape mode of the second coding unit 510. That is, a coding unit may be recursively split based on at least one of the block shape information and the information about the split shape mode of each coding unit. Therefore, a square coding unit may be determined by splitting a non-square coding unit, and a non-square coding unit may be determined by recursively splitting the square coding unit.

Referring to FIG. 15, a predetermined coding unit from among an odd number of third coding units 520*b*, 520*c*, and 520*d* determined by splitting the non-square second coding unit 510 (e.g., a coding unit at a center location or a square coding unit) may be recursively split. According to an embodiment, the square third coding unit 520*b* from among the odd number of third coding units 520*b*, 520*c*, and 520*d* may be split in a horizontal direction into a plurality of fourth coding units. A non-square fourth coding unit 530*b* or 530*d* from among the plurality of fourth coding units 530*a*, 530*b*, 530*c*, and 530*d* may be split into a plurality of coding units. For example, the non-square fourth coding unit 530 or 530*d* may be split into an odd number of coding units again. A method that may be used to recursively split a coding unit will be described below in relation to various embodiments.

According to an embodiment, the video decoding apparatus 100 may split each of the third coding units 520*a*, or 520*b*, 520*c*, and 520*d* into coding units, based on at least one of the block shape information and the information about the split shape mode. Also, the video decoding apparatus 100 may determine not to split the second coding unit 510 based on at least one of the block shape information and the information about the split shape mode. According to an embodiment, the video decoding apparatus 100 may split the non-square second coding unit 510 into the odd number of third coding units 520*b*, 520*c*, and 520*d*. The video decoding apparatus 100 may put a predetermined restriction on a predetermined third coding unit from among the odd number of third coding units 520*b*, 520*c*, and 520*d*. For example, the video decoding apparatus 100 may restrict the third coding unit 520*c* at a center location from among the odd number of third coding units 520*b*, 520*c*, and 520*d* to be no longer split or to be split a settable number of times.

Referring to FIG. 15, the video decoding apparatus 100 may restrict the third coding unit 520*c*, which is at the center location from among the odd number of third coding units 520*b*, 520*c*, and 520*d* included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an embodiment, the video decoding apparatus 100 may obtain at least one of the block shape information and the information about the split shape mode, which is used to split a current coding unit, from a predetermined location in the current coding unit.

Figure 16:
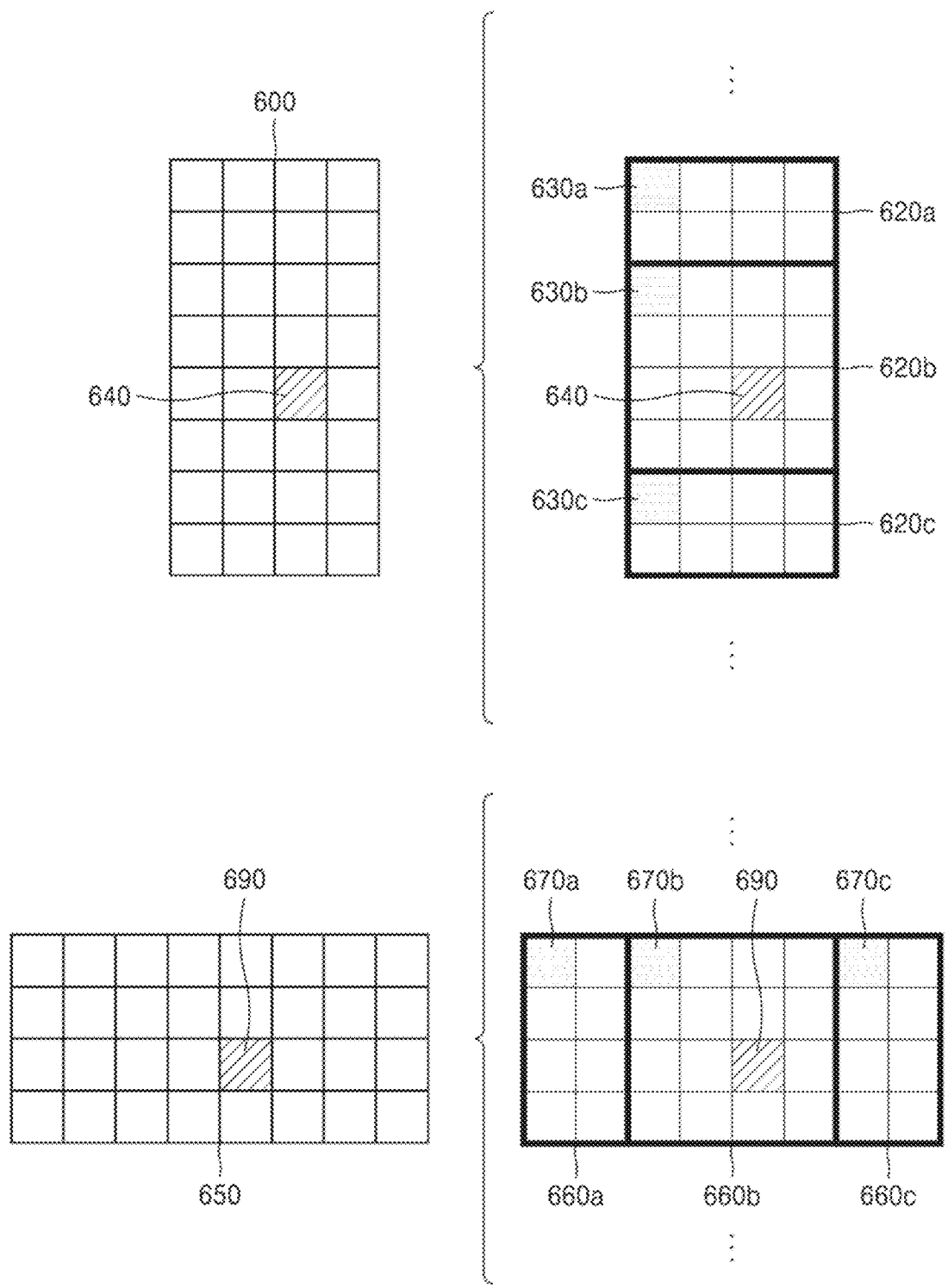
FIG. 16 illustrates a method of determining a predetermined coding unit from among an odd number of coding units, according to an embodiment.

FIG. 16 illustrates a method, performed by the video decoding apparatus 100, of determining a predetermined coding unit from among an odd number of coding units, according to an embodiment.

Referring to FIG. 16, at least one of block shape information and information about a split shape mode of a current coding unit 600 or 650 may be obtained from a sample of a predetermined location from among a plurality of samples included in the current coding unit 600 or 650 (e.g., a sample 640 or 690 of a center location). However, the predetermined location in the current coding unit 600, from which at least one of the block shape information and the information about the split shape mode may be obtained, is not limited to the center location in FIG. 16, and may include various locations included in the current coding unit 600 (e.g., top, bottom, left, right, top left, bottom left, top right, and bottom right locations). The video decoding apparatus 100 may obtain at least one of the block shape information and the information about the split shape mode from the predetermined location and determine to split or not to split the current coding unit into various-shaped and various-sized coding units.

According to an embodiment, when the current coding unit is split into a predetermined number of coding units, the video decoding apparatus 100 may select one of the coding units. Various methods may be used to select one of a plurality of coding units, as will be described below in relation to various embodiments.

According to an embodiment, the video decoding apparatus 100 may split the current coding unit into a plurality of coding units, and may determine a coding unit at a predetermined location.

According to an embodiment, the video decoding apparatus 100 may use information indicating locations of an odd number of coding units to determine a coding unit at a center location from among the odd number of coding units. Referring to FIG. 16, the video decoding apparatus 100 may determine an odd number of coding units 620*a*, 620*b*, and 620*c* or an odd number of coding units 660*a*, 660*b*, and 660*c* by splitting the current coding unit 600 or the current coding unit 650. The video decoding apparatus 100 may determine the coding unit 620*b* at a center location or the coding unit 660*b* at a center location by using information about locations of the odd number of coding units 620*a*, 620*b*, and 620*c* or the odd number of coding units 660*a*, 660*b*, and 660*c*. For example, the video decoding apparatus 100 may determine the coding unit 620*b* of the center location by determining the locations of the coding units 620*a*, 620*b*, and 620*c* based on information indicating locations of predetermined samples included in the coding units 620*a*, 620*b*, and 620*c*. In detail, the video decoding apparatus 100 may determine the coding unit 620*b* at the center location by determining the locations of the coding units 620*a*, 620*b*, and 620*c* based on information indicating locations of top left samples 630*a*, 630*b*, and 630*c* of the coding units 620*a*, 620*b*, and 620*c*.

According to an embodiment, the information indicating the locations of the top left samples 630*a*, 630*b*, and 630*c*, which are included in the coding units 620*a*, 620*b*, and 620*c*, respectively, may include information about locations or coordinates of the coding units 620*a*, 620*b*, and 620*c* in a picture. According to an embodiment, the information indicating the locations of the top left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the video decoding apparatus 100 may determine the coding unit 620*b* at the center location by directly using the information about the locations or coordinates of the coding units 620*a*, 620*b*, and 620*c* in the picture, or by using the information about the widths or heights of the coding units, which correspond to the difference values between the coordinates.

According to an embodiment, information indicating the location of the top left sample 630*a* of the upper coding unit 620*a* may include coordinates (xa, ya), information indicating the location of the top left sample 630*b* of the middle coding unit 620*b* may include coordinates (xb, yb), and information indicating the location of the top left sample 630*c* of the lower coding unit 620*c* may include coordinates (xc, yc). The video decoding apparatus 100 may determine the middle coding unit 620*b* by using the coordinates of the top left samples 630*a*, 630*b*, and 630*c* which are included in the coding units 620*a*, 620*b*, and 620*c*, respectively. For example, when the coordinates of the top left samples 630*a*, 630*b*, and 630*c* are sorted in an ascending or descending order, the coding unit 620*b* including the coordinates (xb, yb) of the sample 630*b* at a center location may be determined as a coding unit at a center location from among the coding units 620*a*, 620*b*, and 620*c* determined by splitting the current coding unit 600. However, the coordinates indicating the locations of the top left samples 630*a*, 630*b*, and 630*c* may include coordinates indicating absolute locations in the picture, or may use coordinates (dxb, dyb) indicating a relative location of the top left sample 630*b* of the middle coding unit 620*b* and coordinates (dxc, dyc) indicating a relative location of the top left sample 630*c* of the lower coding unit 620*c* with reference to the location of the top left sample 630*a* of the upper coding unit 620*a*. Also, a method of determining a coding unit at a predetermined location by using coordinates of a sample included in the coding unit as information indicating a location of the sample is not limited to the above-described method, and may include various arithmetic methods capable of using the coordinates of the sample.

According to an embodiment, the video decoding apparatus 100 may split the current coding unit 600 into the plurality of coding units 620*a*, 620*b*, and 620*c*, and may select one of the coding units 620*a*, 620*b*, and 620*c* based on a predetermined criterion. For example, the video decoding apparatus 100 may select the coding unit 620*b*, which has a size different from that of the others, from among the coding units 620*a*, 620*b*, and 620*c*.

According to an embodiment, the video decoding apparatus 100 may determine the widths or heights of the coding units 620*a*, 620*b*, and 620*c* by using the coordinates (xa, ya) indicating the location of the top left sample 630*a* of the upper coding unit 620*a*, the coordinates (xb, yb) indicating the location of the top left sample 630*b* of the middle coding unit 620*b*, and the coordinates (xc, yc) indicating the location of the top left sample 630*c* of the lower coding unit 620*c*. The video decoding apparatus 100 may determine the respective sizes of the coding units 620*a*, 620*b*, and 620*c* by using the coordinates (xa, ya), (xb, yb), and (xc, yc) indicating the locations of the coding units 620*a*, 620*b*, and 620*c*. According to an embodiment, the video decoding apparatus 100 may determine the width of the upper coding unit 620*a* to be a width of the current coding unit 600. The video decoding apparatus 100 may determine the height of the upper coding unit 620*a* to be yb-ya. According to an embodiment, the video decoding apparatus 100 may determine the width of the middle coding unit 620*b* to be a width of the current coding unit 600. The video decoding apparatus 100 may determine the height of the middle coding unit 620*b* to be yc-yb. According to an embodiment, the video decoding apparatus 100 may determine the width or height of the lower coding unit 620*c* by using the width or height of the current coding unit 600 or the widths or heights of the upper and middle coding units 620*a* and 620*b*. The video decoding apparatus 100 may determine a coding unit, which has a size different from that of the others, based on the determined widths and heights of the coding units 620*a* to 620*c*. Referring to FIG. 16, the video decoding apparatus 100 may determine the middle coding unit 620*b*, which has a size different from the size of the upper and lower coding units 620*a* and 620*c*, as the coding unit of the predetermined location. However, the above-described method, performed by the video decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The video decoding apparatus 100 may determine a width or a height of each of the coding units 660*a*, 660*b*, and 660*c* by using coordinates (xd, yd) that are information indicating a location of a top left sample 670*a* of the left coding unit 660*a*, coordinates (xe, ye) that are information indicating a location of a top left sample 670*b* of the middle coding unit 660*b*, and coordinates (xf, yf) that are information indicating a location of a top left sample 670*c* of the right coding unit 660*c*. The video decoding apparatus 100 may determine sizes of the coding units 660*a*, 660*b*, and 660*c* by using the coordinates (xd, yd), (x, ye), and (xf, yf) indicating locations of the coding units 660*a*, 660*b*, and 660*c*.

According to an embodiment, the video decoding apparatus 100 may determine the width of the left coding unit 660*a* to be xe-xd. The video decoding apparatus 100 may determine the height of the left coding unit 660*a* as the height of the current coding unit 650. According to an embodiment, the video decoding apparatus 100 may determine the width of the middle coding unit 660*b* to be xf-xe. The video decoding apparatus 100 may determine the height of the middle coding unit 660*b* to be the height of the current coding unit 600. According to an embodiment, the video decoding apparatus 100 may determine the width or the height of the right coding unit 660*c* by using the width or the height of the current coding unit 650 and the width and the height of the left coding unit 660*a* and the middle coding unit 660*b*. The video decoding apparatus 100 may determine a coding unit, which has a size different from that of the others, based on the determined widths and heights of the coding units 660*a*, 660*b*, and 660*c*. Referring to FIG. 16, the video decoding apparatus 100 may determine the middle coding unit 660*b*, which has a size different from the size of the left coding unit 660*a* and the right coding unit 660*c*, as the coding unit of the predetermined location. However, the above-described method, performed by the video decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the video decoding apparatus 100 may select a coding unit at a predetermined location from among an odd number of coding units determined by splitting the current coding unit, considering the shape of the current coding unit. For example, when the current coding unit has a non-square shape, a width of which is longer than a height, the video decoding apparatus 100 may determine the coding unit at the predetermined location in a horizontal direction. That is, the video decoding apparatus 100 may determine one of coding units at different locations in a horizontal direction and may put a restriction on the coding unit. When the current coding unit has a non-square shape, a height of which is longer than a width, the video decoding apparatus 100 may determine the coding unit at the predetermined location in a vertical direction. That is, the video decoding apparatus 100 may determine one of coding units at different locations in a vertical direction and may put a restriction on the coding unit.

According to an embodiment, the video decoding apparatus 100 may use information indicating respective locations of an even number of coding units, to determine the coding unit at the predetermined location from among the even number of coding units. The video decoding apparatus 100 may determine an even number of coding units by splitting the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 16, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the video decoding apparatus 100 may use at least one of block shape information and information about a split shape mode, which is stored in a sample included in a coding unit at a center location, in a splitting operation to determine the coding unit at the center location from among the plurality of coding units determined by splitting the current coding unit.

Referring to FIG. 16, the video decoding apparatus 100 may split the current coding unit 600 into the plurality of coding units 620a, 620b, and 620c based on at least one of the block shape information and the information about the split shape mode, and may determine the coding unit 620b at a center location from among the plurality of the coding units 620a, 620b, and 620c. Furthermore, the video decoding apparatus 100 may determine the coding unit 620b at the center location, in consideration of a location from which at least one of the block shape information and the information about the split shape mode is obtained. That is, at least one of the block shape information and the information about the split shape mode of the current coding unit 600 may be obtained from the sample 640 at a center location of the current coding unit 600 and, when the current coding unit 600 is split into the plurality of coding units 620a, 620b, and 620c based on at least one of the block shape information and the information about the split shape mode, the coding unit 620b including the sample 640 may be determined as the coding unit at the center location. However, information used to determine the coding unit at the center location is not limited to at least one of the block shape information and the information about the split shape mode, and various kinds of information may be used to determine the coding unit at the center location.

According to an embodiment, predetermined information for identifying the coding unit at the predetermined location may be obtained from a predetermined sample included in a coding unit to be determined. Referring to FIG. 16, the video decoding apparatus 100 may use at least one of the block shape information and the information about the split shape mode, which is obtained from a sample at a predetermined location in the current coding unit 600 (e.g., a sample at a center location of the current coding unit 600) to determine a coding unit at a predetermined location from among the plurality of the coding units 620a, 620b, and 620c determined by splitting the current coding unit 600 (e.g., a coding unit at a center location from among a plurality of split coding units). That is, the video decoding apparatus 100 may determine the sample at the predetermined location by considering a block shape of the current coding unit 600, determine the coding unit 620b including a sample, from which predetermined information (e.g., at least one of the block shape information and the information about the split shape mode) may be obtained, from among the plurality of coding units 620a, 620b, and 620c determined by splitting the current coding unit 600, and may put a predetermined restriction on the coding unit 620b. Referring to FIG. 16, according to an embodiment, the video decoding apparatus 100 may determine the sample 640 at the center location of the current coding unit 600 as the sample from which the predetermined information may be obtained, and may put a predetermined restriction on the coding unit 620b including the sample 640, in a decoding operation. However, the location of the sample from which the predetermined information may be obtained is not limited to the above-described location, and may include arbitrary locations of samples included in the coding unit 620b to be determined for a restriction.

According to an embodiment, the location of the sample from which the predetermined information may be obtained may be determined based on the shape of the current coding unit 600. According to an embodiment, the block shape information may indicate whether the current coding unit has a square or non-square shape, and the location of the sample from which the predetermined information may be obtained may be determined based on the shape. For example, the video decoding apparatus 100 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the video decoding apparatus 100 may determine one of samples adjacent to a boundary for dividing a long side of the current coding unit in half, as the sample from which the predetermined information may be obtained.

According to an embodiment, when the current coding unit is split into a plurality of coding units, the video decoding apparatus 100 may use at least one of the block shape information and the information about the split shape mode to determine a coding unit at a predetermined location from among the plurality of coding units. According to an embodiment, the video decoding apparatus 100 may obtain at least one of the block shape information and the information about the split shape mode from a sample at a predetermined location in a coding unit, and may split the plurality of coding units, which are generated by splitting the current coding unit, by using at least one of the block shape information and the information about the split shape mode, which is obtained from the sample of the predetermined location in each of the plurality of coding units. That is, a coding unit may be recursively split based on at least one of the block shape information and the information about the split shape mode, which is obtained from the sample at the predetermined location in each coding unit. An operation of recursively splitting a coding unit has been described above in relation to FIG. 15, and thus detailed descriptions thereof will not be provided here.

According to an embodiment, the video decoding apparatus 100 may determine one or more coding units by splitting the current coding unit, and may determine an order of decoding the one or more coding units, based on a predetermined block (e.g., the current coding unit).

Figure 17:
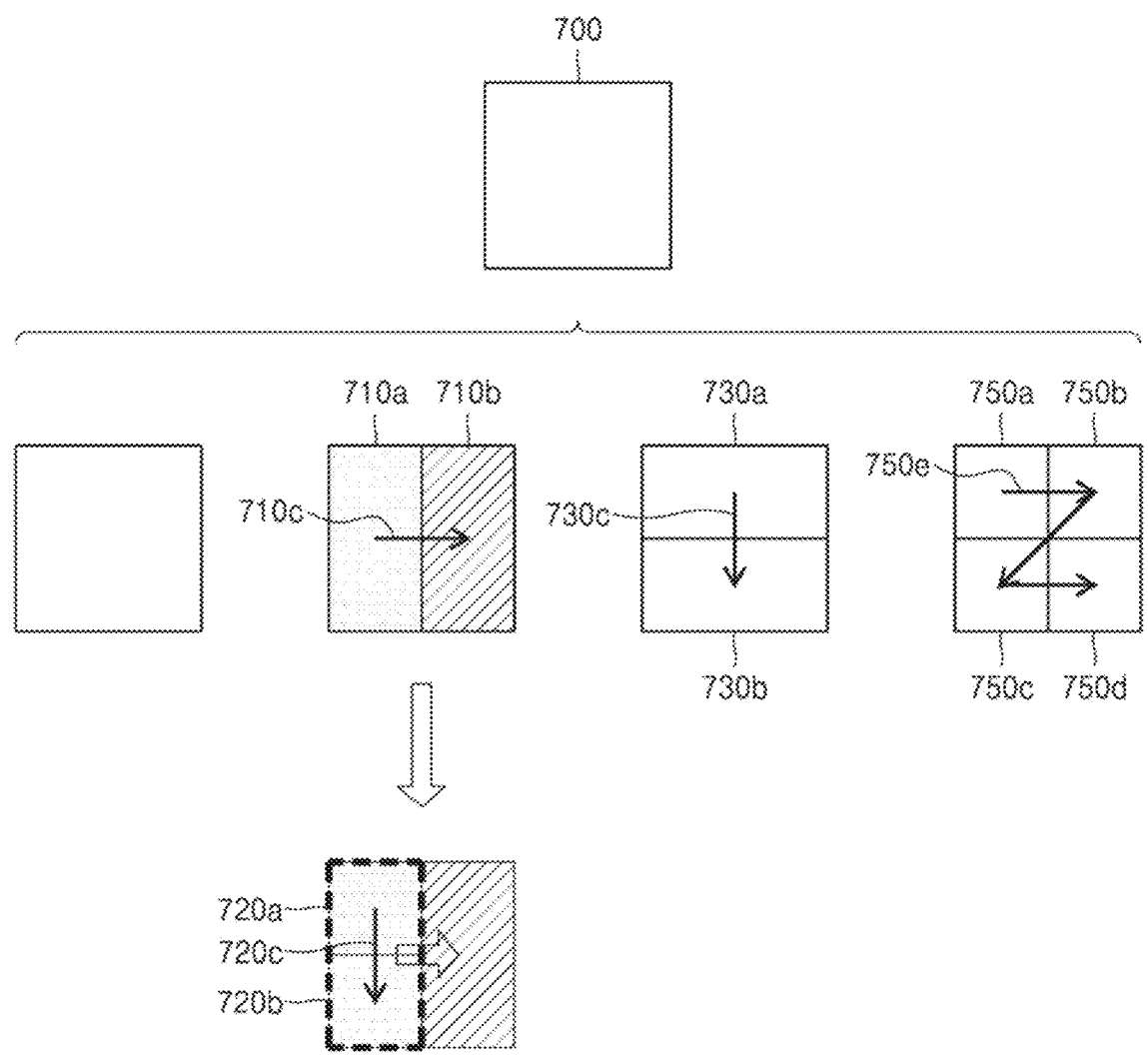
FIG. 17 illustrates an order of processing a plurality of coding units when the plurality of coding units are determined by splitting a current coding unit, according to an embodiment.

FIG. 17 illustrates an order of processing a plurality of coding units when the video decoding apparatus 100 determines the plurality of coding units by splitting a current coding unit, according to an embodiment.

According to an embodiment, the video decoding apparatus 100 may determine second coding units 710a and 710b by splitting a first coding unit 700 in a vertical direction, determine second coding units 730a and 730b by splitting the first coding unit 700 in a horizontal direction, or determine second coding units 750a to 750d by splitting the first coding unit 700 in vertical and horizontal directions, based on block shape information and information about a split shape mode.

Referring to FIG. 17, the video decoding apparatus 100 may determine to process the second coding units 710a and 710b, which are determined by splitting the first coding unit 700 in a vertical direction, in a horizontal direction order 710c. The video decoding apparatus 100 may determine to process the second coding units 730a and 730b, which are determined by splitting the first coding unit 1400 in a horizontal direction, in a vertical direction order 730c. The video decoding apparatus 100 may determine to process the second coding units 750a to 750d, which are determined by splitting the first coding unit 700 in vertical and horizontal directions, in a predetermined order for processing coding units in a row and then processing coding units in a next row (e.g., in a raster scan order or Z-scan order 750e).

According to an embodiment, the video decoding apparatus 100 may recursively split coding units. Referring to FIG. 17, the video decoding apparatus 100 may determine the plurality of coding units 710a, 710b, 730a, 730b, 750a, 750b, 750c, and 750d by splitting the first coding unit 700, and may recursively split each of the determined plurality of coding units 710a, 710b, 730a, 730b, 750a, 750b, 750c, and 750d. A splitting method of the plurality of coding units 710a, 710b, 730a, 730b, 750a, 750b, 750c, and 750d may correspond to a splitting method of the first coding unit 700. As such, each of the plurality of coding units 710a, 710b, 730a, 730b, 750a, 750b, 750c, and 750d may be independently split into a plurality of coding units. Referring to FIG. 17, the video decoding apparatus 100 may determine the second coding units 710a and 710b by splitting the first coding unit 700 in a vertical direction, and may determine to independently split or not to split each of the second coding units 710a and 710b.

According to an embodiment, the video decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The video decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a predetermined order.

Figure 18:
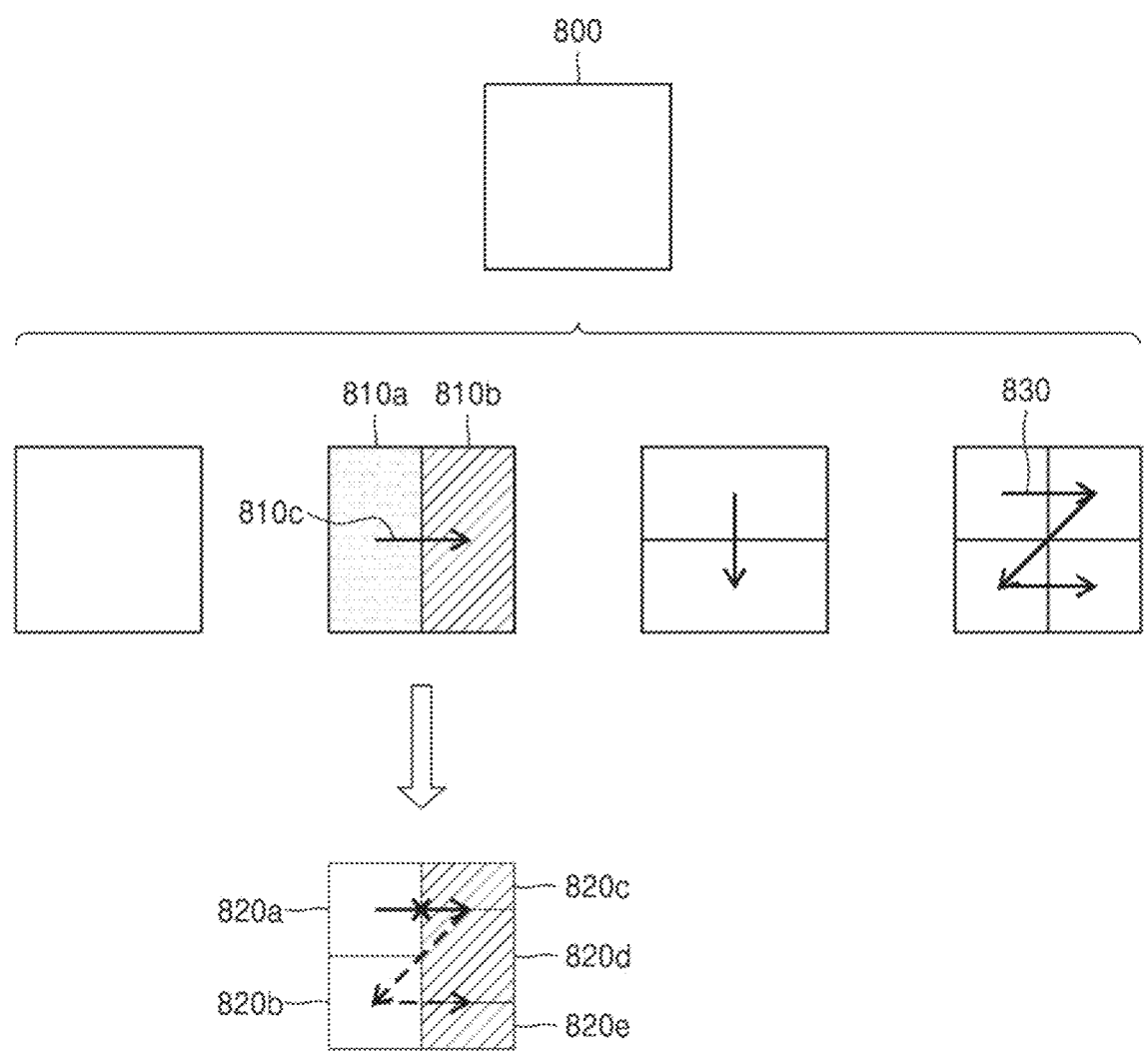
FIG. 18 illustrates a process of determining that a current coding unit is to be split into an odd number of coding units, when the coding units are not processable in a predetermined order, according to an embodiment.

FIG. 18 illustrates a process, performed by the video decoding apparatus 100, of determining that a current coding unit is to be split into an odd number of coding units, when the coding units are not processable in a predetermined order, according to an embodiment.

According to an embodiment, the video decoding apparatus 100 may determine whether the current coding unit is split into an odd number of coding units, based on obtained block shape information and information about a split shape mode. Referring to FIG. 18, a square first coding unit 800 may be split into non-square second coding units 810a and 810b, and the second coding units 810a and 810b may be independently split into third coding units 820a and 820b, and 820c to 820e. According to an embodiment, the video decoding apparatus 100 may determine the plurality of third coding units 820a and 820b by splitting the left second coding unit 810a in a horizontal direction, and may split the right second coding unit 810b into an odd number of third coding units 820c to 820e.

According to an embodiment, the video decoding apparatus 100 may determine whether any coding unit is split into an odd number of coding units, by determining whether the third coding units 820a and 820b, and 820c to 820e are processable in a predetermined order. Referring to FIG. 18, the video decoding apparatus 100 may determine the third coding units 820a and 820b, and 820c to 820e by recursively splitting the first coding unit 800. The video decoding apparatus 100 may determine whether any of the first coding unit 800, the second coding units 810a and 810b, and the third coding units 820a and 820b, and 820c, 820d, and 820e are split into an odd number of coding units, based on at least one of the block shape information and the information about the split shape mode. For example, the right second coding unit 810b may be split into an odd number of third coding units 820c, 820d, and 820e. A processing order of a plurality of coding units included in the first coding unit 800 may be a predetermined order (e.g., a Z-scan order 830), and the video decoding apparatus 100 may decide whether the third coding units 820c, 820d, and 820c, which are determined by splitting the right second coding unit 810b into an odd number of coding units, satisfy a condition for processing in the predetermined order.

According to an embodiment, the video decoding apparatus 100 may determine whether the third coding units 820a and 820b, and 820c, 820d, and 820e included in the first coding unit 800 satisfy the condition for processing in the predetermined order, and the condition relates to whether at least one of a width and height of the second coding units 810a and 810b is divided in half along a boundary of the third coding units 820a and 820b, and 820c, 820d, and 820c. For example, the third coding units 820a and 820b determined by dividing the height of the non-square left second coding unit 810a in half satisfy the condition. However, because boundaries of the third coding units 820c, 820d, and 820e determined by splitting the right second coding unit 810b into three coding units do not divide the width or height of the right second coding unit 810b in half, it may be determined that the third coding units 820c, 820d, and 820e do not satisfy the condition. When the condition is not satisfied as described above, the video decoding apparatus 100 may decide disconnection of a scan order, and determine that the right second coding unit 810*b* is split into an odd number of coding units, based on a result of the decision. According to an embodiment, when a coding unit is split into an odd number of coding units, the video decoding apparatus 100 may put a predetermined restriction on a coding unit at a predetermined location among the split coding units, and the restriction or the predetermined location has been described above in relation to various embodiments and thus detailed descriptions thereof will not be provided here.

Figure 19:
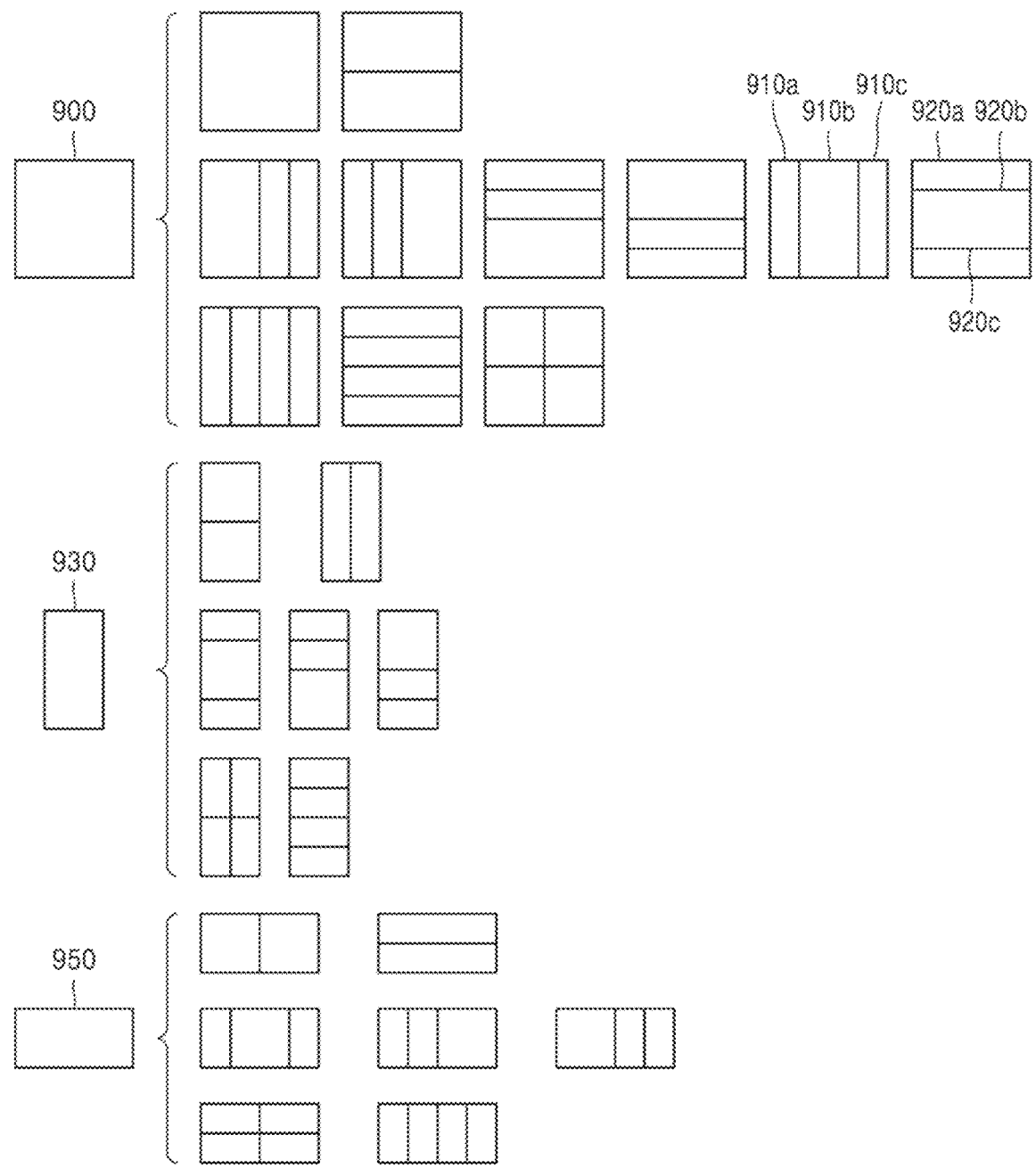
FIG. 19 illustrates a process of determining at least one coding unit by splitting a first coding unit, according to an embodiment.

FIG. 19 illustrates a process, performed by the video decoding apparatus 100, of determining at least one coding unit by splitting a first coding unit 900, according to an embodiment.

According to an embodiment, the video decoding apparatus 100 may split the first coding unit 900, based on at least one of block shape information and information about a split shape mode, which is obtained by the bitstream obtainer 110. The square first coding unit 900 may be split into four square coding units, or may be split into a plurality of non-square coding units. For example, referring to FIG. 19, when the block shape information indicates that the first coding unit 900 has a square shape and the information about the split shape mode indicates to split the first coding unit 900 into non-square coding units, the video decoding apparatus 100 may split the first coding unit 900 into a plurality of non-square coding units. In detail, when the information about the split shape mode indicates to determine an odd number of coding units by splitting the first coding unit 900 in a horizontal direction or a vertical direction, the video decoding apparatus 100 may split the square first coding unit 900 into an odd number of coding units, e.g., second coding units 910*a*, 910*b*, and 910*c* determined by splitting the square first coding unit 900 in a vertical direction or second coding units 920*a*, 920*b*, and 920*c* determined by splitting the square first coding unit 900 in a horizontal direction.

According to an embodiment, the video decoding apparatus 100 may determine whether the second coding units 910*a*, 910*b*, 910*c*, 920*a*, 920*b*, and 920*c* included in the first coding unit 900 satisfy a condition for processing in a predetermined order, and the condition relates to whether at least one of a width and height of the first coding unit 900 is divided in half along a boundary of the second coding units 910*a*, 910*b*, 910*c*, 920*a*, 920*b*, and 920*c*. Referring to FIG. 19, because boundaries of the second coding units 910*a*, 910*b*, and 910*c* determined by splitting the square first coding unit 900 in a vertical direction do not divide the width of the first coding unit 900 in half, it may be determined that the first coding unit 900 does not satisfy the condition for processing in the predetermined order. In addition, because boundaries of the second coding units 920*a*, 920*b*, and 920*c* determined by splitting the square first coding unit 900 in a horizontal direction do not divide the width of the first coding unit 900 in half, it may be determined that the first coding unit 900 does not satisfy the condition for processing in the predetermined order. When the condition is not satisfied as described above, the video decoding apparatus 100 may decide disconnection of a scan order, and may determine that the first coding unit 900 is split into an odd number of coding units, based on a result of the decision. According to an embodiment, when a coding unit is split into an odd number of coding units, the video decoding apparatus 100 may put a predetermined restriction on a coding unit at a predetermined location from among the split coding units, and the restriction or the predetermined location has been described above in relation to various embodiments and thus detailed descriptions thereof will not be provided herein.

According to an embodiment, the video decoding apparatus 100 may determine various-shaped coding units by splitting a first coding unit.

Referring to FIG. 19, the video decoding apparatus 100 may split the square first coding unit 900 or a non-square first coding unit 930 or 950 into various-shaped coding units.

Figure 20:
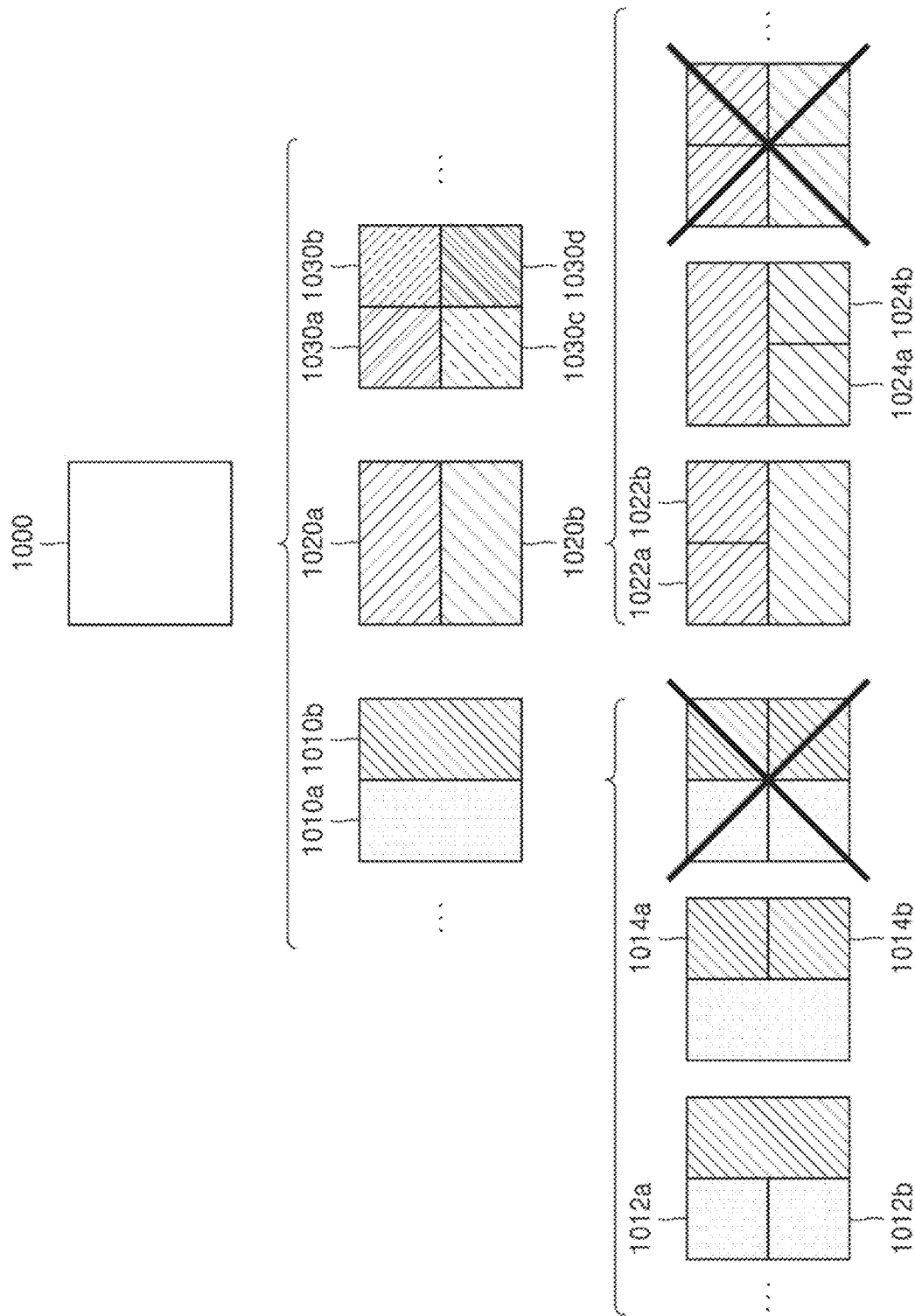
FIG. 20 illustrates that a shape into which a second coding unit is splittable is restricted when the second coding unit having a non-square shape, which is determined by splitting a first coding unit, satisfies a predetermined condition, according to an embodiment.

FIG. 20 illustrates that a shape into which a second coding unit is splittable by the video decoding apparatus 100 is restricted when the second coding unit having a non-square shape, which is determined by splitting a first coding unit 1000, satisfies a predetermined condition, according to an embodiment.

According to an embodiment, the video decoding apparatus 100 may determine to split the square first coding unit 1000 into non-square second coding units 1010*a*, 1010*b*, 1020*a*, and 1020*b*, based on at least one of block shape information and information about a split shape mode, which is obtained by the bitstream obtainer 110. The second coding units 1010*a*, 1010*b*, 1020*a*, and 1020*b* may be independently split. As such, the video decoding apparatus 100 may determine to split or not to split the first coding unit 1000 into a plurality of coding units, based on at least one of the block shape information and the information about the split shape mode of each of the second coding units 1010*a*, 1010*b*, 1020*a*, and 1020*b*. According to an embodiment, the video decoding apparatus 100 may determine third coding units 1012*a* and 1012*b* by splitting the non-square left second coding unit 1010*a*, which is determined by splitting the first coding unit 1000 in a vertical direction, in a horizontal direction. However, when the left second coding unit 1010*a* is split in a horizontal direction, the video decoding apparatus 100 may restrict the right second coding unit 1010*b* to not be split in a horizontal direction in which the left second coding unit 1010*a* is split. When third coding units 1014*a* and 1014*b* are determined by splitting the right second coding unit 1010*b* in a same direction, because the left and right second coding units 1010*a* and 1010*b* are independently split in a horizontal direction, the third coding units 1012*a*, 1012*b*, 1014*a*, and 1014*b* may be determined. However, this case serves equally as a case in which the video decoding apparatus 100 splits the first coding unit 1000 into four square second coding units 1030*a*, 1030*b*, 1030*c*, and 1030*d*, based on at least one of the block shape information and the information about the split shape mode, and may be inefficient in terms of image decoding.

According to an embodiment, the video decoding apparatus 100 may determine third coding units 1022*a*, 1022*b*, 1024*a*, and 1024*b* by splitting the non-square second coding unit 1020*a* or 1020*b*, which is determined by splitting the first coding unit 1000 in a horizontal direction, in a vertical direction. However, when a second coding unit (e.g., the upper second coding unit 1020*a*) is split in a vertical direction, for the above-described reason, the video decoding apparatus 100 may restrict the other second coding unit (e.g., the lower second coding unit 1020*b*) to not be split in a vertical direction in which the upper second coding unit 1020*a* is split.

Figure 21:
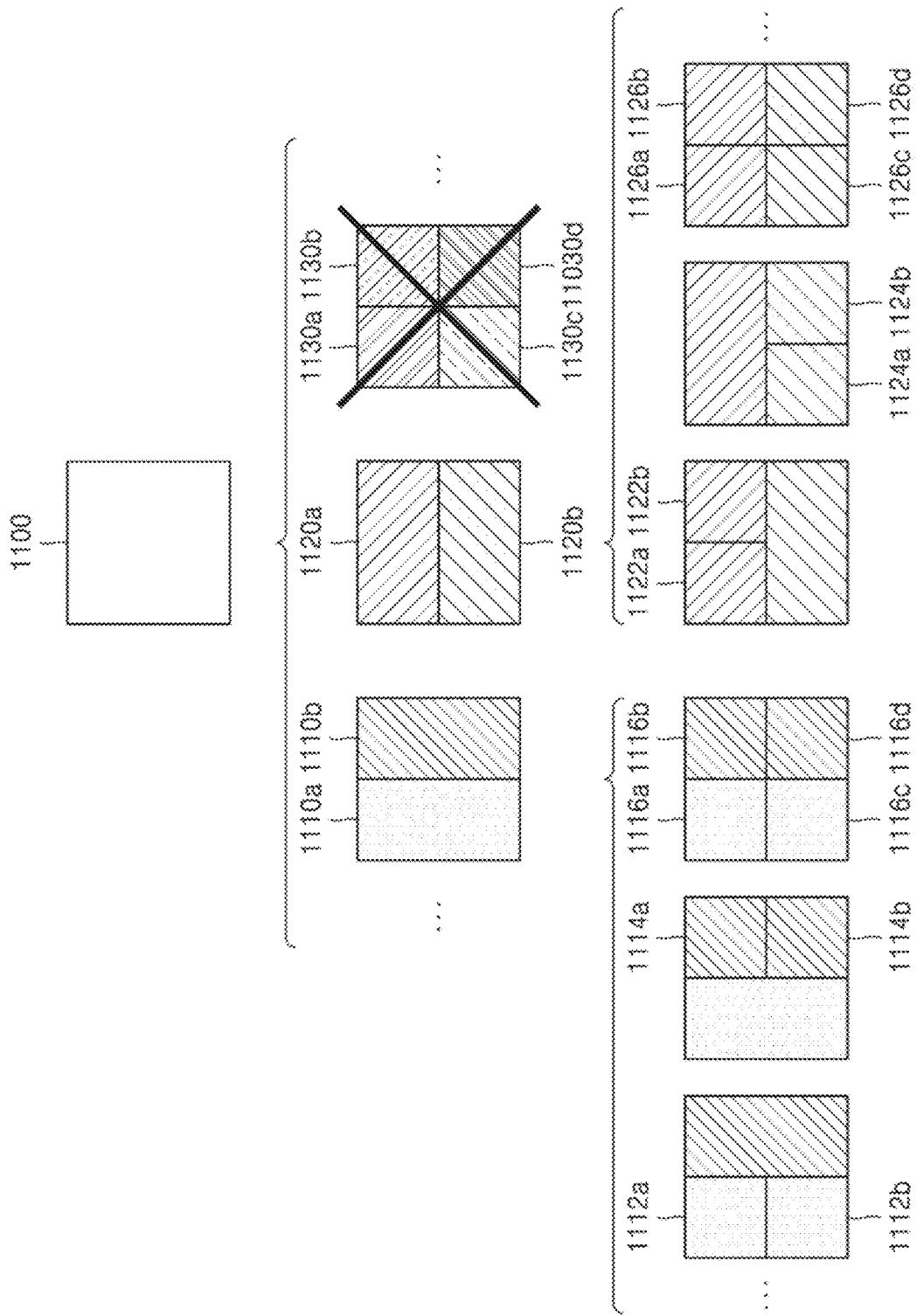
FIG. 21 illustrates a process of splitting a square coding unit when split shape information indicates that the square coding unit is not to be split into four square coding units, according to an embodiment.

FIG. 21 illustrates a process, performed by the video decoding apparatus 100, of splitting a square coding unit when information about a split shape mode indicates that the square coding unit is not to be split into four square coding units, according to an embodiment.

According to an embodiment, the video decoding apparatus 100 may determine second coding units 1110a, 1110b, 1120a, 1120b, etc. by splitting a first coding unit 1100, based on at least one of block shape information and information about a split shape mode. The information about the split shape mode may include information about various methods of splitting a coding unit but, the information about various splitting methods may not include information for splitting a coding unit into four square coding units. According to such information about a split shape mode, the video decoding apparatus 100 may not split the first square coding unit 1100 into four square second coding units 1130a, 1130b, 1130c, and 1130d. The video decoding apparatus 100 may determine the non-square second coding units 1110a, 1110b, 1120a, 1120b, etc., based on the information about the split shape mode.

According to an embodiment, the video decoding apparatus 100 may independently split the non-square second coding units 1110a, 1110b, 1120a, 1120b, etc. Each of the second coding units 1110a, 1110b, 1120a, 1120b, etc. may be recursively split in a predetermined order, and this splitting method may correspond to a method of splitting the first coding unit 1100, based on at least one of the block shape information and the information about the split shape mode.

For example, the video decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the video decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the video decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the video decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 22:
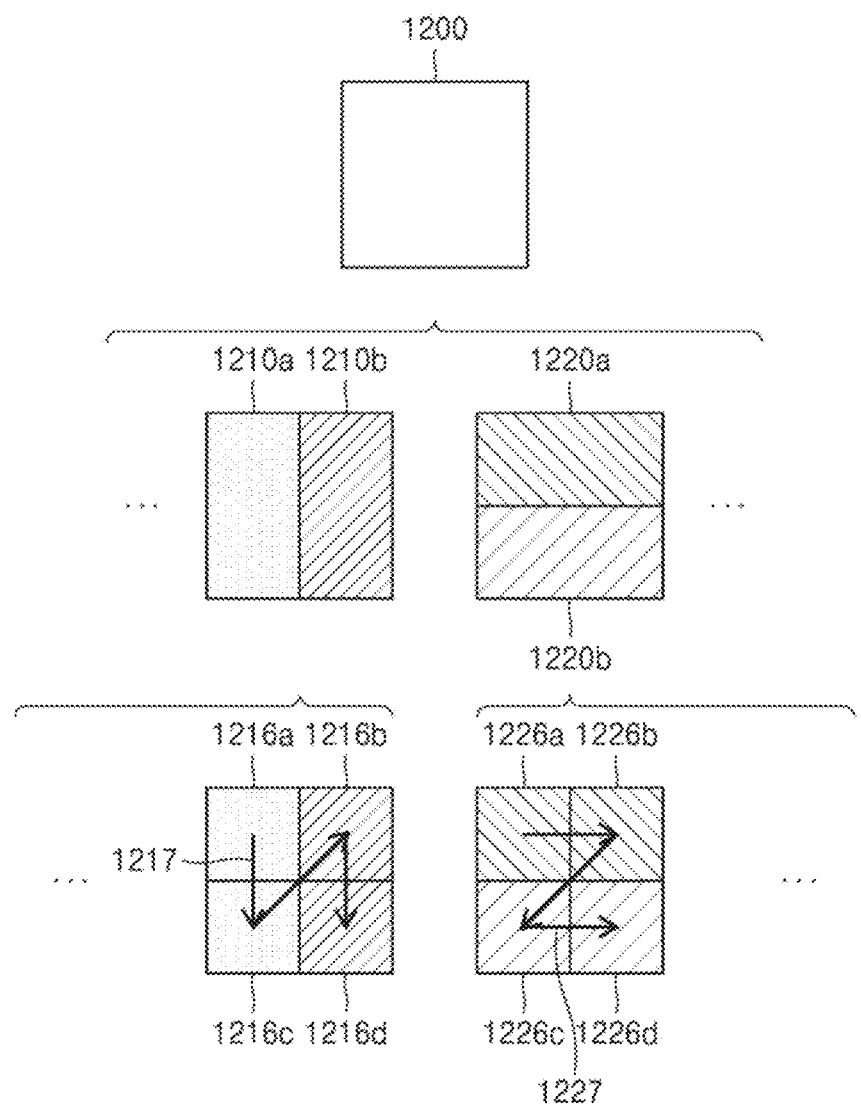
FIG. 22 illustrates that a processing order between a plurality of coding units may be changed depending on a process of splitting a coding unit, according to an embodiment.

FIG. 22 illustrates that a processing order between a plurality of coding units may be changed depending on a process of splitting a coding unit, according to an embodiment.

According to an embodiment, the video decoding apparatus 100 may split a first coding unit 1200, based on block shape information and information about a split shape mode. When the block shape information indicates a square shape and the information about the split shape mode indicates to split the first coding unit 1200 in at least one of horizontal and vertical directions, the video decoding apparatus 100 may determine second coding units 1210a, 1210b, 1220a, and 1220b, by splitting the first coding unit 1200. Referring to FIG. 22, the non-square second coding units 1210a, 1210b, 1220a, and 1220b determined by splitting the first coding unit 1200 in only a horizontal direction or vertical direction may be independently split based on the block shape information and the information about the split shape mode of each coding unit. For example, the video decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a horizontal direction. An operation of splitting the second coding units 1210a, 1210b, 1220a, and 1220b has been described above in relation to FIG. 21, and thus detailed descriptions thereof will not be provided herein.

According to an embodiment, the video decoding apparatus 100 may process coding units in a predetermined order. An operation of processing coding units in a predetermined order has been described above in relation to FIG. 17, and thus detailed descriptions thereof will not be provided herein. Referring to FIG. 22, the video decoding apparatus 100 may determine four square third coding units 1216a, 1216b, 1216c, and 1216d, and 1226a, 1226b, 1226c, and 1226d by splitting the square first coding unit 1200. According to an embodiment, the video decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the video decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the video decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 22, the square third coding units 1216a, 1216b, 1216c, and 1216d, and 1226a, 1226b, 1226c, and 1226d may be determined by splitting the second coding units 1210a, 1210b, 1220a, and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on at least one of the block shape information the information about the split shape mode, the video decoding apparatus 100 may process a plurality of coding units in different orders even when the coding units are eventually determined to be the same shape.

FIG. 23 illustrates a process of determining a depth of a coding unit as a shape and size of the coding unit change, when the coding unit is recursively split such that a plurality of coding units are determined, according to an embodiment.

According to an embodiment, the video decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the video decoding apparatus 100 may determine that a depth of the current coding unit is increased from a depth of the coding unit before being split, by n. In the following description, a coding unit having an increased depth is expressed as a coding unit of a deeper depth.

Referring to FIG. 23, according to an embodiment, the video decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by dividing a width and height of the first coding unit 1300 to ½ may have a size of N×N. Furthermore, the third coding unit 1304 determined by dividing a width and height of the second coding unit 1302 to ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the video decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The video decoding apparatus 100 may determine the second coding unit 1302, 1312, or 1322 by dividing at least one of a width and height of the first coding unit 1310 having a size of N×2N. That is, the video decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the video decoding apparatus 100 may determine the second coding unit 1302, 1312, or 1322 by dividing at least one of a width and height of the first coding unit 1320 having a size of 2N×N. That is, the video decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the video decoding apparatus 100 may determine the third coding unit 1304, 1314, or 1324 by dividing at least one of a width and height of the second coding unit 1302 having a size of N×N. That is, the video decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the video decoding apparatus 100 may determine the third coding unit 1304, 1314, or 1324 by dividing at least one of a width and height of the second coding unit 1312 having a size of N/2×N. That is, the video decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the video decoding apparatus 100 may determine the third coding unit 1304, 1314, or 1324 by dividing at least one of a width and height of the second coding unit 1322 having a size of N×N/2. That is, the video decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the video decoding apparatus 100 may split the square coding unit 1300, 1302, or 1304 in a horizontal or vertical direction. For example, the video decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 24:
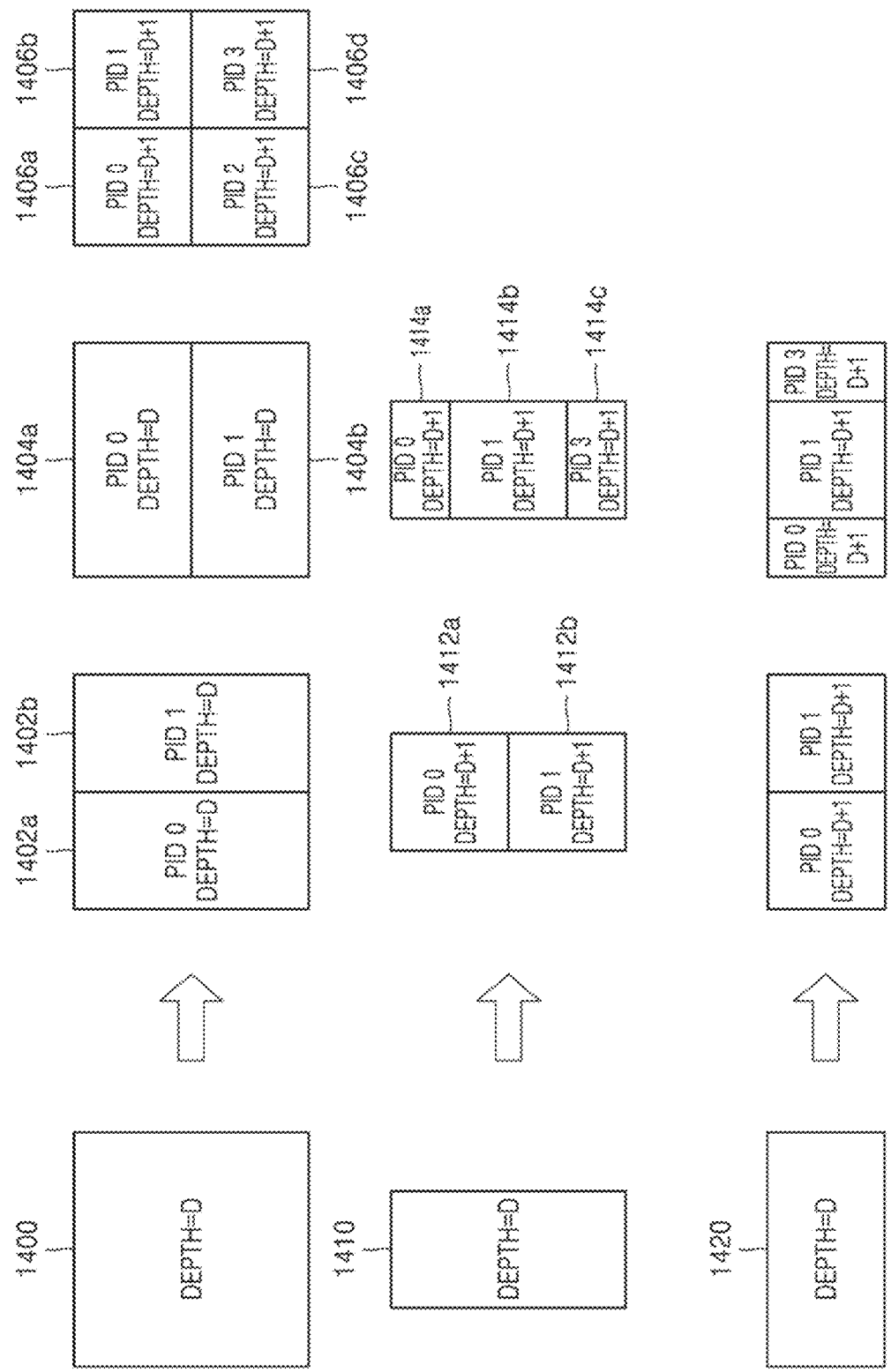
FIG. 24 illustrates depths that are determinable based on shapes and sizes of coding units, and part indexes (PIDs) for distinguishing the coding units, according to an embodiment.

FIG. 24 illustrates depths that are determinable based on shapes and sizes of coding units, and part indexes (PIDs) that are for distinguishing the coding units, according to an embodiment.

According to an embodiment, the video decoding apparatus 100 may determine various-shape second coding units by splitting a square first coding unit 1400. Referring to FIG. 14, the video decoding apparatus 100 may determine second coding units 1402a and 1402b, 1404a and 1404b, and 1406a, 1406b, 1406c, and 1406d by splitting the first coding unit 1400 in at least one of vertical and horizontal directions based on information about a split shape mode. That is, the video decoding apparatus 100 may determine the second coding units 1402a and 1402b, 1404a and 1404b, and 1406a, 1406b, 1406c, and 1406d, based on the information about the split shape mode of the first coding unit 1400.

According to an embodiment, a depth of the second coding units 1402a and 1402b, 1404a and 1404b, and 1406a, 1406b, 1406c, and 1406d, which are determined based on the information about the split shape mode of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the video decoding apparatus 100 splits the first coding unit 1400 into the four square second coding units 1406a, 1406b, 1406c, and 1406d based on the information about the split shape mode, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the video decoding apparatus 100 may determine a plurality of second coding units 1412a and 1412b, and 1414a, 1414b, and 1414c by splitting a first coding unit 1410, a height of which is longer than a width, in a horizontal direction based on the information about the split shape mode. According to an embodiment, the video decoding apparatus 100 may determine a plurality of second coding units 1422a and 1422b, and 1424a, 1424b, and 1424c by splitting a first coding unit 1420, a width of which is longer than a height, in a vertical direction based on the information about the split shape mode.

According to an embodiment, a depth of the second coding units 1412a and 1412b, 1414a, 1414b, and 1414c, 1422a and 1422b, and 1424a, 1424b, and 1424c, which are determined based on the information about the split shape mode of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the video decoding apparatus 100 may split the non-square first coding unit 1410 into an odd number of second coding units 1414a, 1414b, and 1414c based on the information about the split shape mode. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The video decoding apparatus 100 may determine depths of coding units split from the first coding unit 1420 having a non-square shape, a width of which is longer than a height, by using the above-described method of determining depths of coding units split from the first coding unit 1410.

According to an embodiment, the video decoding apparatus 100 may determine PIDs for identifying split coding units, based on a size ratio between the coding units when an odd number of split coding units do not have equal sizes. Referring to FIG. 24, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the video decoding apparatus 100 may determine whether an odd number of split coding units do not have equal sizes, based on whether discontinuity is present in PIDs for identifying the split coding units.

According to an embodiment, the video decoding apparatus 100 may determine whether to use a specific splitting method, based on PID values for identifying a plurality of coding units determined by splitting a current coding unit. Referring to FIG. 24, the video decoding apparatus 100 may determine an even number of coding units 1412a and 1412b or an odd number of coding units 1414a, 1414b, and 1414c by splitting the first coding unit 1410 having a rectangular shape, a height of which is longer than a width. The video decoding apparatus 100 may use PIDs to identify respective coding units. According to an embodiment, the PID may be obtained from a sample of a predetermined location of each coding unit (e.g., a top left sample).

According to an embodiment, the video decoding apparatus 100 may determine a coding unit at a predetermined location from among the split coding units, by using the PIDs for distinguishing the coding units. According to an embodiment, when the information about the split shape mode of the first coding unit 1410 having a rectangular shape, a height of which is longer than a width, indicates to split a coding unit into three coding units, the video decoding apparatus 100 may split the first coding unit 1410 into three coding units 1414a, 1414b, and 1414c. The video decoding apparatus 100 may assign a PID to each of the three coding units 1414a, 1414b, and 1414c. The video decoding apparatus 100 may compare PIDs of an odd number of split coding units to determine a coding unit at a center location from among the coding units. The video decoding apparatus 100 may determine the coding unit 1414b having a PID corresponding to a middle value among the PIDs of the coding units, as the coding unit at the center location from among the coding units determined by splitting the first coding unit 1410. According to an embodiment, the video decoding apparatus 100 may determine PIDs for distinguishing split coding units, based on a size ratio between the coding units when the split coding units do not have equal sizes. Referring to FIG. 24, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the video decoding apparatus 100 may determine that a coding unit is split into a plurality of coding units including a coding unit having a size different from that of the other coding units. According to an embodiment, when the information about the split shape mode indicates to split a coding unit into an odd number of coding units, the video decoding apparatus 100 may split a current coding unit in such a manner that a coding unit of a predetermined location among an odd number of coding units (e.g., a coding unit of a centre location) has a size different from that of the other coding units. In this case, the video decoding apparatus 100 may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the video decoding apparatus 100 may use a predetermined data unit where a coding unit starts to be recursively split.

Figure 25:
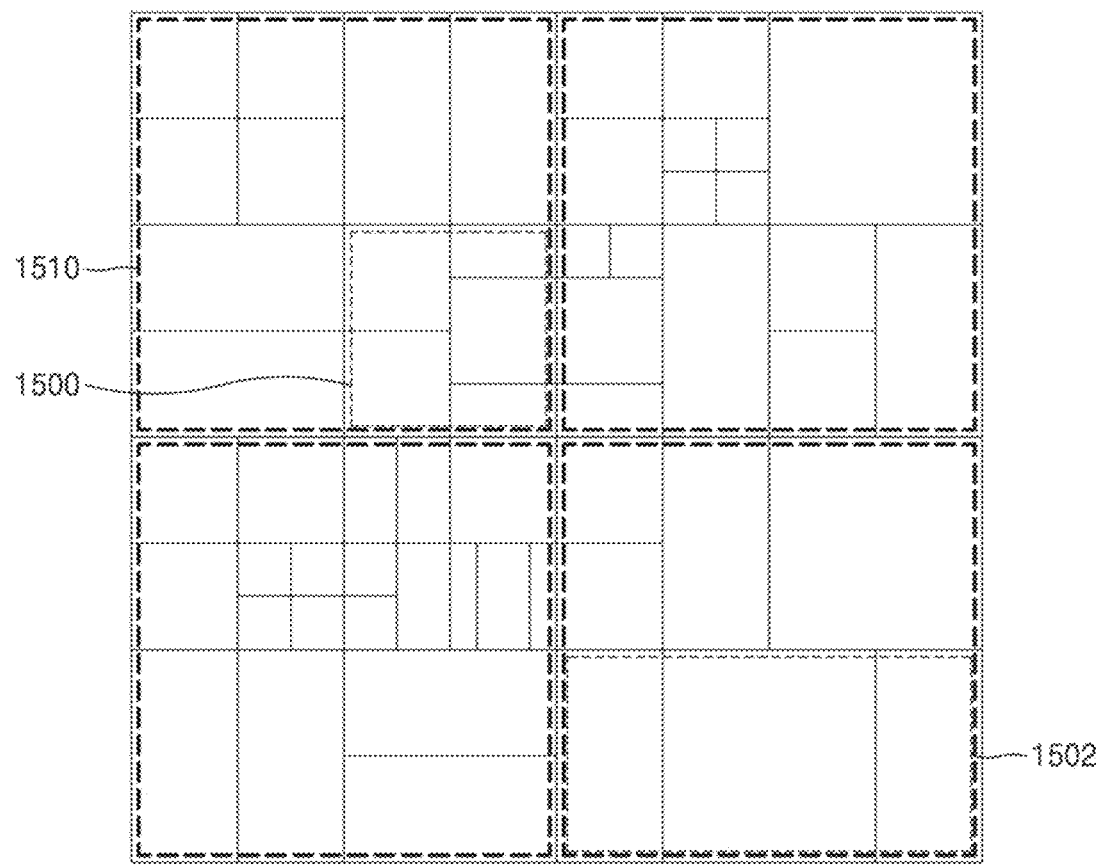
FIG. 25 illustrates that a plurality of coding units are determined based on a plurality of predetermined data units included in a picture, according to an embodiment.

FIG. 25 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and information about a split shape mode. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, the reference data unit may include M×N samples. Herein, M and N may be equal to each other, and may be integers expressed as multipliers of 2. That is, the reference data unit may have a square or non-square shape, and may be split into an integer number of coding units.

According to an embodiment, the video decoding apparatus 100 may split the current picture into a plurality of reference data units. According to an embodiment, the video decoding apparatus 100 may split the plurality of reference data units, which are split from the current picture, by using information about a split shape mode for each reference data unit. The operation of splitting the reference data unit may correspond to a splitting operation using a quadtree structure.

According to an embodiment, the video decoding apparatus 100 may previously determine the minimum size allowed for the reference data units included in the current picture. Accordingly, the video decoding apparatus 100 may determine various reference data units having sizes equal to or greater than the minimum size, and may determine one or more coding units by using the block shape information and the information about the split shape mode with reference to the determined reference data unit.

Referring to FIG. 25, the video decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, largest coding units, or the like).

According to an embodiment, the bitstream obtainer 110 of the video decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 13, and an operation of splitting the non-square reference coding unit 1502 into one or more coding units has been described above in relation to the operation of splitting the current coding unit 400 or 450 of FIG. 14, and thus, detailed descriptions thereof will not be provided herein.

According to an embodiment, the video decoding apparatus 100 may use a PID for identifying the size and shape of reference coding units, to determine the size and shape of reference coding units according to some data units previously determined based on a predetermined condition. That is, the bitstream obtainer 110 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The video decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the video decoding apparatus 100 may determine at least one of the size and shape of reference coding units included in a data unit serving as a unit for obtaining the PID, by selecting the previously determined at least one of the size and shape of reference coding units based on the PID.

According to an embodiment, the video decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the video decoding apparatus 100 may determine the reference coding units by splitting the largest coding unit n times based on a quadtree structure, and may split the reference coding unit based on at least one of the block shape information and the information about the split shape mode according to various embodiments.

Figure 26:
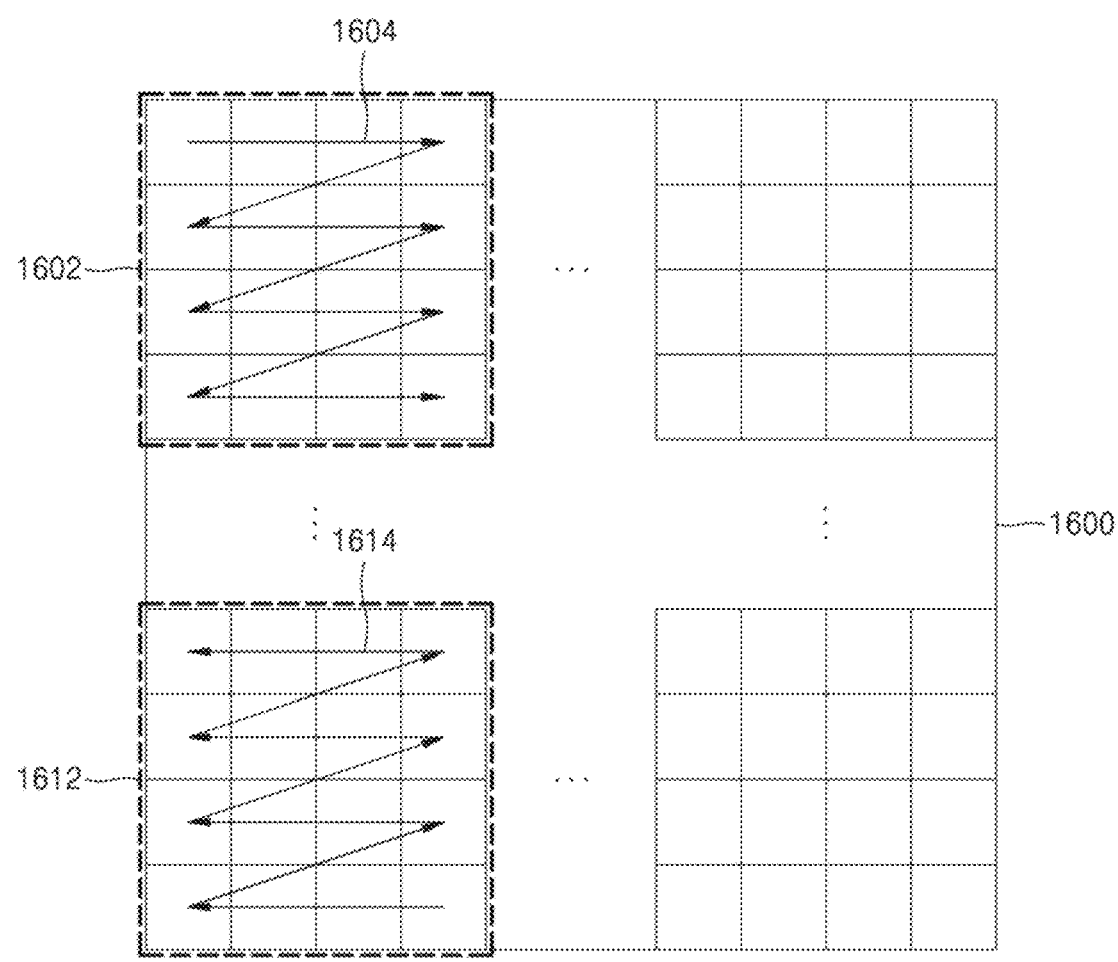
FIG. 26 illustrates a processing block serving as a unit for determining a determination order of reference coding units included in a picture, according to an embodiment.

FIG. 26 illustrates a processing block serving as a unit for determining a determination order of reference coding units included in a picture 1600, according to an embodiment.

According to an embodiment, the video decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the video decoding apparatus 100 may obtain processing block size information and may determine the size of one or more processing blocks included in the picture. The video decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the bitstream obtainer 110 of the video decoding apparatus 100 may obtain the processing block size information from the bitstream according to each specific data unit. For example, the processing block size information may be obtained from the bitstream in a data unit such as an image, sequence, picture, slice, or slice segment. That is, the bitstream obtainer 110 may obtain the processing block size information from the bitstream according to each of the various data units, the video decoding apparatus 100 may determine the size of one or more processing blocks, which are split from the picture, by using the obtained processing block size information, and the size of the processing blocks may be integer times that of the reference coding units.

According to an embodiment, the video decoding apparatus 100 may determine the size of processing blocks 1602 and 1612 included in the picture 1600. For example, the video decoding apparatus 100 may determine the size of processing blocks based on the processing block size information obtained from the bitstream. Referring to FIG. 26, according to an embodiment, the video decoding apparatus 100 may determine a width of the processing blocks 1602 and 1612 to be four times the width of the reference coding units, and may determine a height of the processing blocks 1602 and 1612 to be four times the height of the reference coding units. The video decoding apparatus 100 may determine a determination order of one or more reference coding units in one or more processing blocks.

According to an embodiment, the video decoding apparatus 100 may determine the processing blocks 1602 and 1612, which are included in the picture 1600, based on the size of processing blocks, and may determine a determination order of one or more reference coding units included in the processing blocks 1602 and 1612. According to an embodiment, determination of reference coding units may include determination of the size of the reference coding units.

According to an embodiment, the video decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the video decoding apparatus 100 may obtain, from the bitstream, the determination order information of reference coding units according to each specific data unit. For example, the bitstream obtainer 110 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the video decoding apparatus 100 may determine one or more reference coding units based on the determined determination order.

According to an embodiment, the bitstream obtainer 110 may obtain the determination order information of reference coding units from the bitstream as information related to the processing blocks 1602 and 1612, and the video decoding apparatus 100 may determine a determination order of one or more reference coding units included in the processing blocks 1602 and 1612 and determine one or more reference coding units, which are included in the picture 1600, based on the determination order. Referring to FIG. 26, the video decoding apparatus 100 may determine determination orders 1604 and 1614 of one or more reference coding units in the processing blocks 1602 and 1612, respectively. For example, when the determination order information of reference coding units is obtained with respect to each processing block, different kinds of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the video decoding apparatus 100 may decode the determined one or more reference coding units. The video decoding apparatus 100 may decode an image, based on the reference coding units determined as described above. A method of decoding the reference coding units may include various image decoding methods.

According to an embodiment, the video decoding apparatus 100 may obtain block shape information indicating the shape of a current coding unit or information about a split shape mode indicating a splitting method of the current coding unit, from the bitstream, and may use the obtained information. The block shape information or the information about the split shape mode may be included in the bitstream related to various data units. For example, the video decoding apparatus 100 may use the block shape information or the information about the split shape mode included in a sequence parameter set, a picture parameter set, a video parameter set, a slice header, or a slice segment header. Furthermore, the video decoding apparatus 100 may obtain, from the bitstream, a syntax element corresponding to the block shape information or the information about the split shape mode according to each largest coding unit, each reference coding unit, or each processing block, and may use the obtained syntax element.

Figure 27:
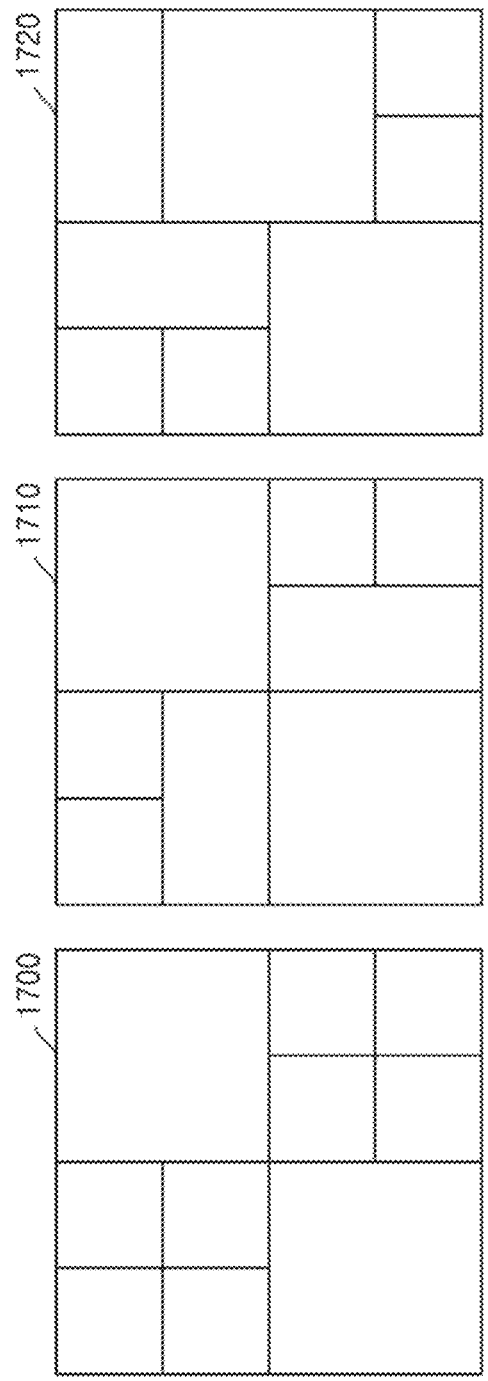
FIG. 27 illustrates coding units determinable per picture when a combination of shapes into which a coding unit is splittable is different per picture, according to an embodiment.

FIG. 27 illustrates coding units determinable per picture when a combination of shapes into which a coding unit is splittable is different per picture, according to an embodiment.

Referring to FIG. 27, the video decoding apparatus 100 may differently determine, per picture, a combination of shapes into which a coding unit is splittable. For example, the video decoding apparatus 100 may decode an image by using a picture that is splittable into 4 coding units, a picture 1710 that is splittable into 2 or 4 coding units, and a picture 1720 that is splittable into 2, 3, or 4 coding units, from among at least one picture included in the image. In order to split the picture 1700 into a plurality of coding units, the video decoding apparatus 100 may use only split shape information indicating that the picture 1700 is split into 4 square coding units. In order to split the picture 1710, the video decoding apparatus 100 may use only split shape information indicating that the picture 1710 is split into 2 or 4 coding units. In order to split the picture 1720, the video decoding apparatus 100 may use only split shape information indicating that the picture 1720 is divided into 2, 3, or 4 coding units. Because such a combination of split shapes is only an embodiment for describing operations of the video decoding apparatus 100, the combination of split shapes should not be interpreted as being limited to the embodiment and various combinations of split shapes may be used according to predetermined data units.

According to an embodiment, the bitstream obtainer 110 of the video decoding apparatus 100 may obtain a bitstream including an index indicating a combination of split shape information according to predetermined data unit units (e.g., sequences, pictures, or slices). For example, the bitstream obtainer 110 may obtain an index indicating a combination of split shape information from a sequence parameter set, a picture parameter set, or a slice header. The video decoding apparatus 100 may determine a combination of split shapes into which a coding unit is splittable according to predetermined data units by using the obtained index, and thus different combinations of split shapes may be used according to predetermined data units.

Figure 28:
FIG. 28 illustrates various shapes of a coding unit determinable based on split shape information representable as a binary code, according to an embodiment.

FIG. 28 illustrates various shapes of a coding unit determinable based on split shape information representable as a binary code, according to an embodiment.

According to an embodiment, the video decoding apparatus 100 may split a coding unit into various shapes by using block shape information and split shape information obtained by the bitstream obtainer 110. Shapes into which a coding unit is splittable may correspond to various shapes including the shapes described through the above embodiments.

Referring to FIG. 28, the video decoding apparatus 100 may split a coding unit having a square shape into at least one direction from among a horizontal direction and a vertical direction and may split a coding unit having a non-square shape in a horizontal direction or a vertical direction, based on split shape information.

According to an embodiment, when the video decoding apparatus 100 is able to split a coding unit having a square shape in a horizontal direction and a vertical direction to obtain four square coding units, the number of split shapes that may be indicated by split shape information about the coding unit having the square shape may be 4. According to an embodiment, split shape information may be represented as a 2-digit binary code, and a binary code may be allocated to each split shape. For example, when a coding unit is not split, split shape information may be represented as (00)b; when a coding unit is split in a horizontal direction and a vertical direction, split shape information may be represented as (01)b; when a coding unit is split in a horizontal direction, split shape information may be represented as (10)b; and when a coding unit is spilt in a vertical direction, split shape information may be represented as (11)b.

According to an embodiment, when the video decoding apparatus 100 splits a coding unit having a non-square shape in a horizontal direction or a vertical direction, types of split shapes that may be indicated by split shape information may be determined according to the number of coding units into which a coding unit is split. Referring to FIG. 28, the video decoding apparatus 100 may split a coding unit having a non-square shape into 3 coding units according to an embodiment. The video decoding apparatus 100 may split a coding unit into two coding units, and in this case, split shape information may be represented as (10)b. The video decoding apparatus 100 may split a coding unit into three coding units, and in this case, split shape information may be represented as (11)b. The video decoding apparatus 100 may determine not to split a coding unit, and in this case, split shape information may be represented as (0)b. That is, in order to use a binary code indicating split shape information, the video decoding apparatus 100 may use variable length coding (VLC), instead of fixed length coding (FLC).

According to an embodiment, referring to FIG. 28, a binary code of split shape information indicating that a coding unit is not split may be represented as (0)b. When a binary code of split shape information indicating that a coding unit is not split is set to (00)b, all 2-bit binary codes of split shape information have to be used despite that there is no split shape information set to (01)b. However, as shown in FIG. 28, when 3 split shapes are used for a coding unit having a non-square shape, the video decoding apparatus 100 may determine not to split a coding unit even by using a 1-bit binary code (0)b as split shape information, thereby efficiently using a bitstream. However, split shapes of a coding unit having a non-square shape, which are indicated by split shape information, should not be interpreted as being limited to 3 shapes shown in FIG. 28 and should be interpreted as being various shapes including the above embodiments.

Figure 29:
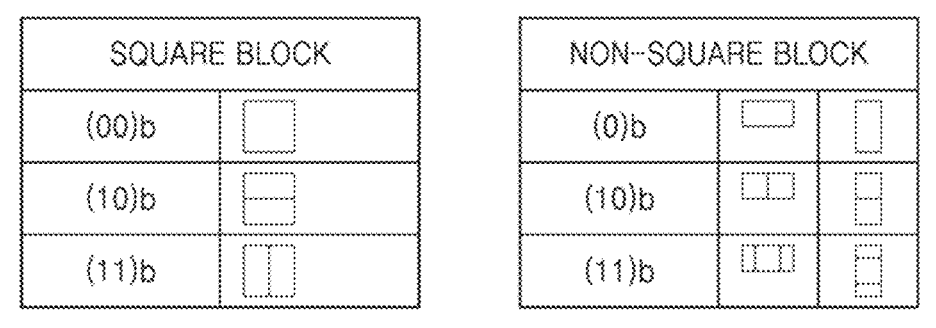

FIG. 29 illustrates other shapes of a coding unit determinable based on split shape information representable as a binary code, according to an embodiment.

Referring to FIG. 29, the video decoding apparatus 100 may split a coding unit having a square shape in a horizontal direction or a vertical direction and may split a coding unit having a non-square shape in a horizontal direction or a vertical direction, based on split shape information. That is, split shape information may indicate that a coding unit having a square shape is split in one direction. In this case, a binary code of split shape information indicating that a coding unit having a square shape is not split may be represented as (0)b. When a binary code of split shape information indicating that a coding unit is not split is set to (00)b, all 2-bit binary codes of split shape information have to be used despite that there is no split shape information set to (01)b. However, as shown in FIG. 29, when 3 split shapes are used for a coding unit having a square shape, the video decoding apparatus 100 may determine not to split a coding unit even by using a 1-bit binary code (0)b as split shape information, thereby efficiently using a bitstream. However, split shapes of a coding unit having a square shape, which are indicated by split shape information, should not be interpreted as being limited to 3 shapes shown in FIG. 29 and should be interpreted as being various shapes including the above embodiments.

According to an embodiment, block shape information or split shape information may be represented by using a binary code, and such information may be immediately generated as a bitstream. Alternatively, block shape information or split shape information representable as a binary code may not be immediately generated in a bitstream and may be used as a binary code input during context adaptive binary arithmetic coding (CABAC).

According to an embodiment, a process, performed by the video decoding apparatus 100, of obtaining syntax about block shape information or split shape information through CABAC will be described. A bitstream including a binary code for the syntax may be obtained by the bitstream obtainer 110. The video decoding apparatus 100 may detect a syntax element indicating the block shape information or the split shape information by de-binarizing a bin string included in the obtained bitstream. According to an embodiment, the video decoding apparatus 100 may obtain a set of binary bin strings corresponding to the syntax element to be decoded and may decode each bin by using probability information, and the video decoding apparatus 100 may repeatedly perform this process until a bin string including such decoded bins is the same as one of pre-obtained bin strings. The video decoding apparatus 100 may determine the syntax element by de-binarizing the bin string.

According to an embodiment, the video decoding apparatus 100 may determine syntax about a bin string by performing a decoding process of adaptive binary arithmetic coding, and may update a probability model for bins obtained by the bitstream obtainer 110. Referring to FIG. 28, the bitstream obtainer 110 of the video decoding apparatus 100 may obtain a bitstream indicating a binary code indicating split shape information according to an embodiment. The video decoding apparatus 100 may determine syntax about the split shape information by using the obtained binary code having a size of 1 bit or 2 bits. In order to determine the syntax about the split shape information, the video decoding apparatus 100 may update a probability of each bit from among the 2 bits of the binary code. That is, the video decoding apparatus 100 may update a probability that may have a value of 0 or 1 when decoding a next bin according to whether a value of a first bin in the 2-bits of the binary code is 0 or 1.

According to an embodiment, while determining the syntax, the video decoding apparatus 100 may update a probability of the bins used in a process of decoding the bins of the bin string for the syntax, and the video decoding apparatus 100 may determine that a specific bit in the bin string has the same probability without updating the probability.

Referring to FIG. 28, while determining syntax by using a bin string indicating split shape information about a coding unit having a non-square shape, the video decoding apparatus 100 may determine the syntax about the split shape information by using one bin having a value of 0 when the coding unit having a non-square shape is not split. That is, when block shape information indicates that a current coding unit has a non-square shape, a first bin of a bin string for the split shape information may be 0 when the coding unit having a non-square shape is not split and may be 1 when the coding unit having a non-square shape is split into two or three coding units. Accordingly, a probability that a first bin of a bin string of split shape information about a coding unit having a non-square shape is 0 may be ⅓, and a probability that the first bin of the bin string of the split shape information about the coding unit having a non-square shape is 1 may be ⅔. As described above, because split shape information indicating that a coding unit having a non-square shape is not split may represent only a bin string of 1 bit having a value of 0, the video decoding apparatus 100 may determine syntax about the split shape information by determining whether a second bin is 0 or 1 only when the first bin of the split shape information is 1. According to an embodiment, when the first bin for the split shape information is 1, the video decoding apparatus 100 may decode a bin by determining that probabilities that the second bin is 0 and 1 are the same.

According to an embodiment, the video decoding apparatus 100 may use various probabilities for each bin while determining a bin of a bin string for split shape information. According to an embodiment, the video decoding apparatus 100 may differently determine probabilities of bins for split shape information according to a direction of a non-square block. According to an embodiment, the video decoding apparatus 100 may differently determine probabilities of bins for split shape information according to an area or a length of a long side of a current coding unit. According to an embodiment, the video decoding apparatus 100 may differently determine probabilities of bins for split shape information according to at least one from among a shape and a length of a long side of a current coding unit.

According to an embodiment, the video decoding apparatus 100 may determine that probabilities of bins for split shape information are the same with respect to coding units having a predetermined size or more. For example, the video decoding apparatus 100 may determine that probabilities of bins for split shape information are the same with respect to coding units having a size equal to or greater than 64 samples based on a length of a long side of each coding unit.

According to an embodiment, the video decoding apparatus 100 may determine an initial probability of bins constituting a bin string of split shape information based on a slice type (e.g., an I-slice, a P-slice, a B-slice, or the like).

Figure 30:
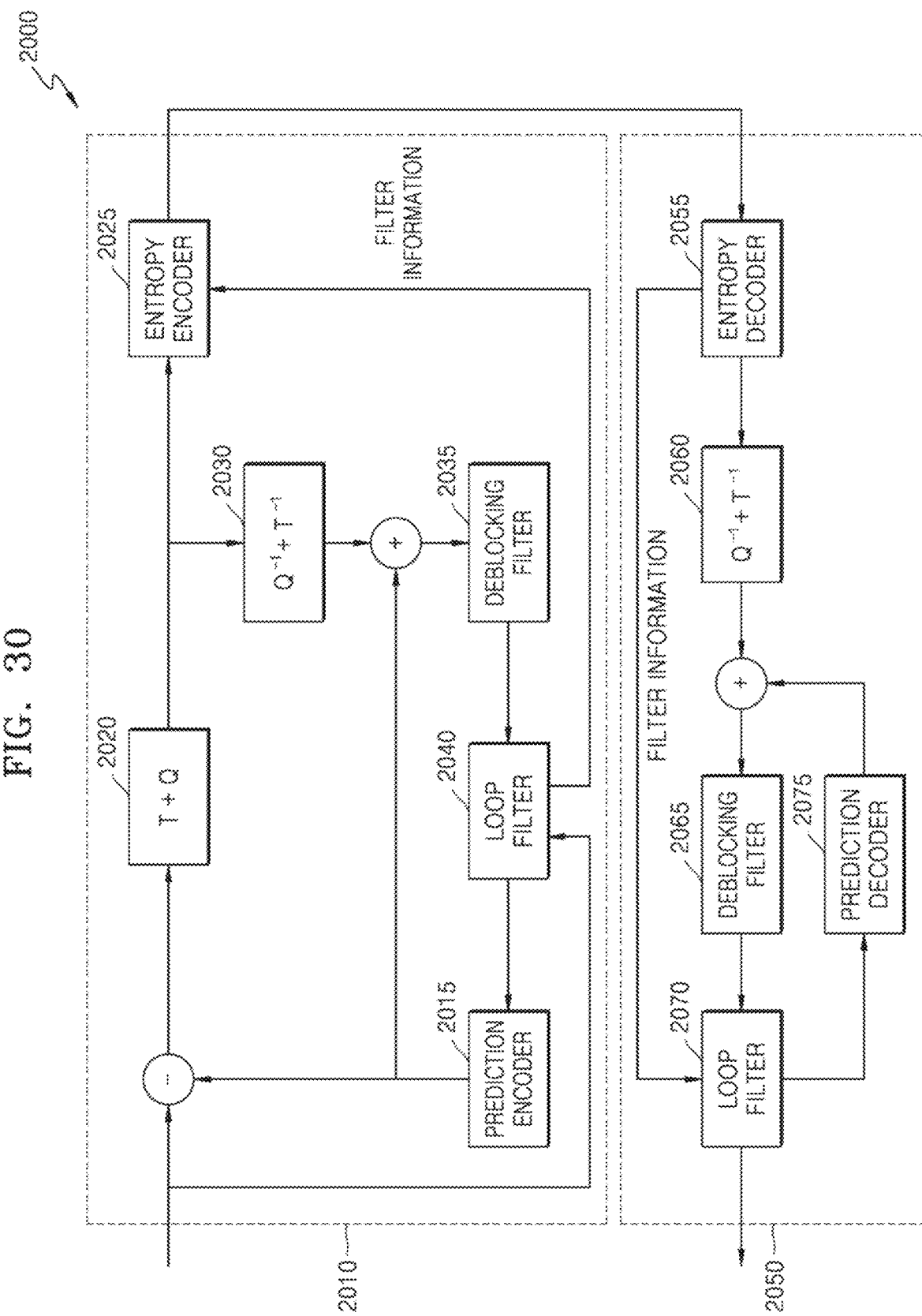
FIG. 30 is a block diagram of a video encoding and decoding system for performing loop filtering.
Figure 32:
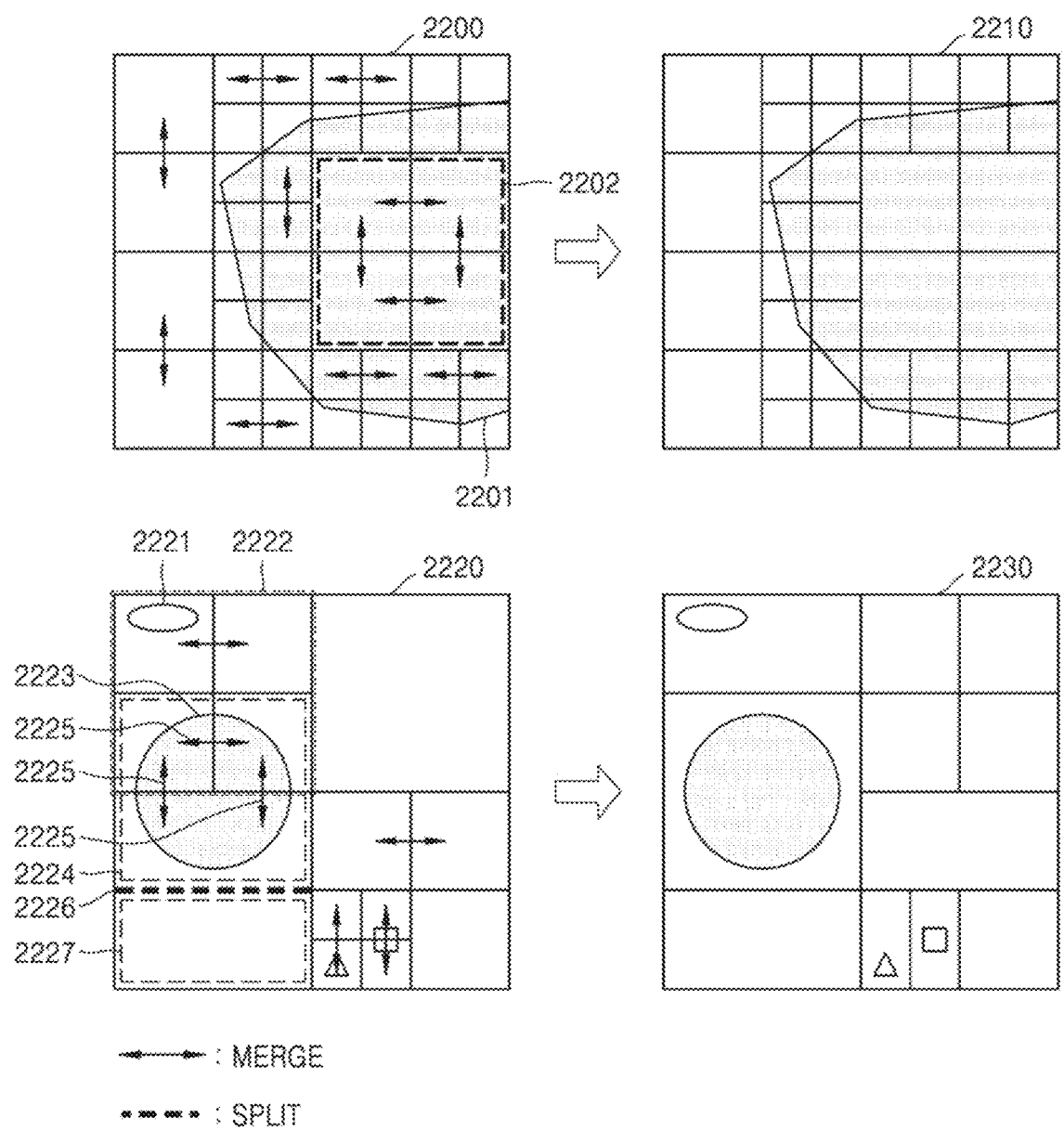
FIG. 32 illustrates a process of performing merging or splitting between coding units determined according to a predetermined encoding method, according to an embodiment.

FIG. 30 is a block diagram of an image encoding and decoding system 2000 for performing loop filtering.

An encoding end 2010 of the image encoding and decoding system 2000 transmits an encoded bitstream of an image, and a decoding end 2050 receives and decodes the bitstream and outputs a reconstruction image. The encoding end 2010 may have a configuration similar to that of a video encoding apparatus 200 which will be described below, and the decoding end 2050 may have a configuration similar to that of the video decoding apparatus 100.

In the encoding end 2010, a prediction encoder 2015 outputs a reference image through inter prediction and intra prediction, and a transformer and quantizer 2020 quantizes residual data between the reference image and a current input image into a quantized transform coefficient and outputs the quantized transform coefficient. An entropy encoder 2025 encodes and transforms the quantized transform coefficient into a bitstream and outputs the bitstream. The quantized transform coefficient is reconstructed as data in a spatial domain by a de-quantizer and inverse converter 2030, and the reconstructed data in the spatial domain is output as a reconstruction image through a deblocking filter 2035 and a loop filter 2040. The reconstruction image may be used as a reference image of a next input image through the prediction encoder 2015.

Encoded image data from among the bitstream received by the decoding end 2050 is reconstructed as residual data in a spatial domain through an entropy decoder 2055 and a de-quantizer and inverse converter 2060. Image data in a spatial domain is formed as the residual data and a reference image output from a prediction decoder 2075 are combined, and a deblocking filter 2065 and a loop filter 2070 may filter the image data in the spatial domain and may output a reconstruction image for a current original image. The reconstruction image may be used as a reference image for a next original image by the prediction decoder 2075.

The loop filter 2040 of the encoding end 2010 performs loop filtering by using filter information input according to a user input or a system setting. The filter information used by the loop filter 2040 is output to the entropy encoder 2025, and is transmitted along with the encoded image data to the decoding end 2050. The loop filter 2070 of the decoding end 2050 may perform loop filtering based on the filter information input from the decoding end 2050.

FIG. 31 illustrates an example of filtering units included in a largest coding unit and filtering performance information of a filtering unit, according to an embodiment.

When filtering units of the loop filter 2040 of the encoding end 2010 and the loop filter 2070 of the decoding end 2050 include data units similar to coding units according to an embodiment described with reference to FIGS. 13 through 15, filter information may include block shape information and split shape information of a data unit for indicating a filtering unit, and loop filtering performance information indicating whether loop filtering is performed on the filtering unit.

Filtering units included in a largest coding unit 2100 according to an embodiment may have the same block shape and split shape as coding units included in the largest coding unit 2100. Also, the filtering units included in the largest coding unit 2100 according to an embodiment may be split based on sizes of the coding units included in the maximum coding units 2100. Referring to FIG. 31, for example, the filtering units may include a filtering unit 2140 having a square shape and a depth of D, filtering units 2132 and 2134 having a non-square shape and a depth of D, filtering units 2112, 2114, 2116, 2152, 2154, and 2164 having a square shape and a depth of D+1, filtering units 2162 and 2166 having a non-square shape and a depth of D+1, and filtering units 2122, 2124, 2126, and 2128 having a square shape and a depth of D+2.

The block shape information, the split shape information (depth), and the loop filtering performance information of the filtering units included in the largest coding unit 2100 may be encoded as shown in Table 3.

TABLE 3

| Depth | Block Shape Information | Loop Filtering Performing Information |
|---|---|---|
| D | 0: SQUARE | 0(2140) |
|  | 1: NS_VER | 0(2132), 1(2134) |
|  | 2: NS_HOR |  |
| D + 1 | 0: SQUARE | 1(2112), 1(2114), 0(2116), 1(2152), 0(2154), 1(2164) |
|  | 1: NS_VER |  |
|  | 2: NS_HOR | 0(2162), 1(2166) |
| D + 2 | 0: SQUARE | 1(2122), 0(2124), 0(2126), 0(2128) |
|  | 1: NS_VER |  |
|  | 2: NS_HOR |  |

A process of determining a plurality of coding units by recursively splitting a coding unit according to block shape information and block split information according to an embodiment is the same as that described with reference to FIG. 23. Loop filtering performance information of filtering units according to an embodiment indicates that loop filtering is performed on the filtering units when a flag value is 1, and indicates that loop filtering is not performed on the filtering units when a flag value is 0. Referring to Table 1, information of data units for determining filtering units to be filtered by the loop filters 2040 and 2070 may all be encoded and transmitted as filter information.

Because coding units configured according to an embodiment are coding units configured to minimize an error with an original image, it is expected to have a high spatial correlation in the coding units. Accordingly, because a filtering unit is determined based on a coding unit according to an embodiment, an operation of determining a filtering unit, separate from determining of a coding unit, may be omitted. Also, accordingly, because a filtering unit is determined based on a coding unit according to an embodiment and thus information for determining a split shape of the filtering unit may be omitted, a transfer bit rate of filter information may be saved.

Although it is described in the above embodiments that a filtering unit is determined based on a coding unit according to an embodiment, a filtering unit may be split based on a coding unit until an arbitrary depth, and thus a shape of the filtering unit may be determined up to only the arbitrary depth.

The determining of a filtering unit described in the above embodiments may be applied not only to loop filtering but also to various embodiments such as deblocking filtering and adaptive loop filtering.

According to an embodiment, the video decoding apparatus 100 may split a current coding unit by using at least one of block shape information and split shape information, and the block shape information may be pre-determined to indicate using only a square shape and the split shape information may be pre-determined to indicate that the current coding unit is not split or split into 4 square coding units. That is, coding units of the current coding unit may always have a square shape according to the block shape information and the current coding unit may not be split or split into 4 square coding units based on the split shape information. The video decoding apparatus 100 may obtain, by using the bitstream obtainer 110, a bitstream generated by using a predetermined encoding method that is pre-determined to only use such block shapes and split shapes, and the video decoding apparatus 100 may use only the pre-determined block shapes and split shapes. In this case, because the video decoding apparatus 100 may solve a compatibility problem with the predetermined encoding method by using a predetermined decoding method similar to the predetermined encoding method. According to an embodiment, when the video decoding apparatus 100 uses the predetermined decoding method using only the pre-determined block shapes and split shapes from among various shapes that may be indicated by the block shape information and the split shape information, the block shape information only indicates a square shape, and thus the video decoding apparatus 100 may not perform a process of obtaining the block shape information from the bitstream. Syntax indicating whether to use the predetermined decoding method may be used, and such syntax may be obtained from the bitstream according to data units having various shapes that may include a plurality of coding units such as sequences, pictures, slice units, and largest coding units. That is, the bitstream obtainer 110 may determine whether syntax indicating the block shape information is to be obtained from the bitstream based on syntax indicating whether the predetermined decoding method is used.

Figure 33:
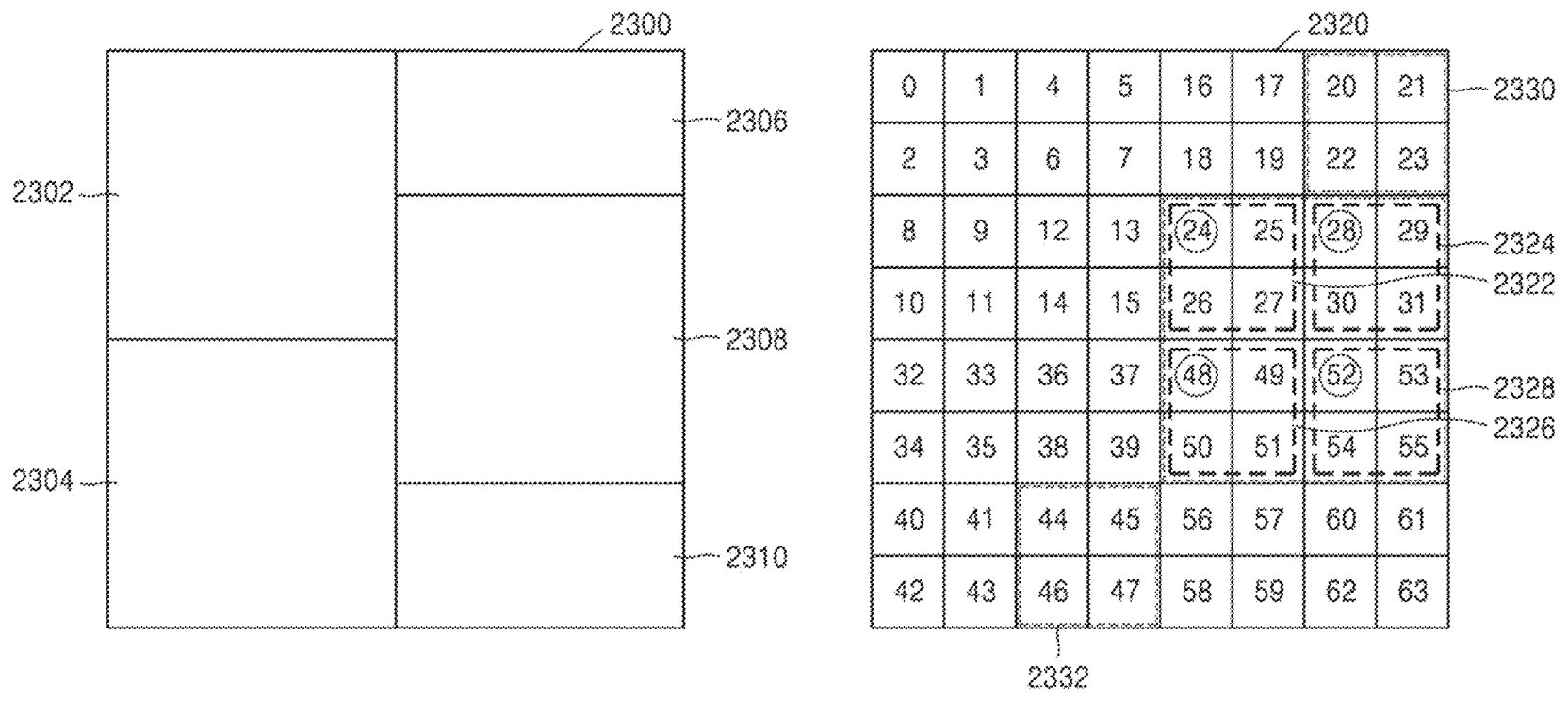

FIG. 33 illustrates an index according to a Z-scan order of a coding unit according to an embodiment.

The video decoding apparatus 100 according to an embodiment may scan lower data units included in an upper data unit according to a Z-scan order. Also, the video decoding apparatus 100 according to an embodiment may sequentially access data according to a Z-scan index in a coding unit included in a processing block or a largest coding unit.

The video decoding apparatus 100 according to an embodiment may split a reference coding unit into at least one coding unit as described with reference to FIGS. 13 and 14. In this case, coding units having a square shape and coding units having a non-square shape may co-exist in the reference coding unit. The video decoding apparatus 100 according to an embodiment may access data according to a Z-scan index included in each coding unit in the reference coding unit. In this case, a method of applying a Z-scan index may vary according to whether a coding unit having a non-square shape exists in the reference coding unit.

According to an embodiment, when a coding unit having a non-square shape does not exist in the reference coding unit, coding units of a lower depth in the reference coding unit may have continuous Z-scan indices. For example, according to an embodiment, a coding unit of an upper depth may include four coding units of a lower depth. Boundaries of the four coding units of the lower depth may be continuous, and the coding units of the lower depth may be scanned in a Z-scan order according to indices indicating the Z-scan order. The indices indicating the Z-scan order according to an embodiment may be set to numbers that increase according to the Z-scan order for the coding units. In this case, deeper coding units of the same depth may be scanned according to the Z-scan order.

According to an embodiment, when at least one coding unit having a non-square shape exists in the reference coding unit, the video decoding apparatus 100 may split each of the coding units in the reference coding unit into sub-blocks, and may scan the split sub-blocks according to the Z-scan order. For example, when a coding unit having a non-square shape in a vertical direction or a horizontal direction exists in the reference coding unit, Z-scan may be performed by using split sub-blocks. Also, for example, when the reference coding unit is split into an odd number of coding units, Z-scan may be performed by using sub-blocks. A sub-block is a coding unit that is no longer split or a coding unit obtained by splitting an arbitrary coding unit, and may have a square shape. For example, four sub-blocks having a square shape may be split from a coding unit having a square shape. Also, for example, two sub-blocks having a square shape may be split from a coding unit having a non-square shape.

Referring to FIG. 33, for example, the video decoding apparatus 100 according to an embodiment may scan coding units 2302, 2304, 2306, 2308, and 2310 of a lower depth in a coding unit 2300 according to a Z-scan order. The coding unit 2300 and the coding units 2302, 2304, 2306, 2308, and 2310 are respectively an upper coding unit and lower coding units. The coding unit 2300 includes the coding units 2306 and 2310 having a non-square shape in a horizontal direction. The coding units 2306 and 2310 having a non-square shape have discontinuous boundaries with the coding units 2302 and 2304 that are adjacent to each other and have a square shape. Also, the coding unit 2308 has a square shape, and is a coding unit at the center when a coding unit having a non-square shape is split into an odd number of coding units. Like the coding units 2306 and 2310 having a non-square shape, the coding unit 2308 has discontinuous boundaries with the coding units 2302 and 2304 that are adjacent to each other and have a square shape. When the coding unit 2300 includes the coding units 2306 and 2310 having a non-square shape or the coding unit 2308 located at the center when a coding unit having a non-square shape is split into an odd number of coding units, because adjacent boundaries between coding units are discontinuous, continuous Z-scan indices may not be set. Accordingly, the video decoding apparatus 100 may continuously set Z-scan indices by splitting coding units into sub-blocks. Also, the video decoding apparatus 100 may perform continuous Z-scan on the coding units 2306 and 2310 having a non-square shape or the coding unit 2308 located at the center of an odd number of coding units having a non-square shape.

A coding unit 2320 of FIG. 33 is obtained by splitting the coding units 2302, 2304, 2306, 2308, and 2310 in the coding unit 2300 into sub-blocks. Because a Z-scan index may be set for each of the sub-blocks and adjacent boundaries between the sub-blocks are continuous, the sub-blocks may be scanned according to a Z-scan order. For example, in a decoding apparatus according to an embodiment, the coding unit 2308 may be split into sub-blocks 2322, 2324, 2326 and 2328. In this case, the sub-blocks 2322 and 2324 may be scanned after data processing is performed on a sub-block 2330, and the sub-blocks 2326 and 2328 may be scanned after data processing is performed on a sub-block 2332. Also, the sub-blocks may be scanned according to the Z-scan order.

In the above embodiments, data units are scanned according to a Z-scan order for data storage, data loading, and data accessing.

Also, in the above embodiments, although data units may be scanned according to a Z-scan order, a scan order of data units may be one of various orders such as a raster scan order, an N-scan order, an up-right diagonal scan order, a horizontal scan order, and a vertical scan order, and should not be limited to the Z-scan order.

Also, in the above embodiments, although coding units in a reference coding unit are scanned, the present disclosure is not limited thereto and a target to be scanned may be an arbitrary block in a processing block or a largest coding unit.

Also, in the above embodiments, although a block is split into sub-blocks and scanning is performed according to a Z-scan order only when at least one block having a non-square shape exists, a block may be split into sub-blocks and scanning may be performed according to a Z-scan order even when a block having a non-square shape does not exist for a simplified embodiment.

The video decoding apparatus 100 according to an embodiment may generate prediction data by performing inter prediction or intra prediction on a coding unit, may generate residual data by performing inverse transformation on a transform unit included in a current coding unit, and may reconstruct the current coding unit by using the generated prediction data and the residual data.

A prediction mode of a coding unit according to an embodiment may be at least one of an intra mode, an inter mode, and a skip mode. According to an embodiment, a prediction mode may be independently selected according to coding units.

When a coding unit having a 2N×2N shape is split into two coding units having a 2N×N shape or a N×2N shape according to an embodiment, inter mode prediction and intra mode prediction may be separately performed on each coding unit. Also, a skip mode may be applied to the coding units having the 2N×N or N×2N shape according to an embodiment.

The video decoding apparatus 100 according to an embodiment may allow performing bi-prediction in a skip mode of a coding unit having a 8×4 or 4×8 shape. Because only skip mode information about a coding unit is received in a skip mode, the use of residual data for the coding unit is omitted. Accordingly, in this case, an overhead of de-quantization and inverse transformation may be reduced. Instead, the video decoding apparatus 100 according to an embodiment may allow performing bi-prediction on a coding unit to which a skip mode is applied, thereby improving decoding efficiency. Also, the video decoding apparatus 100 according to an embodiment may set an interpolation tap number to a relatively small value during motion compensation while allowing performing bi-prediction on a coding unit having a 8×4 or 4×8 shape, thereby efficiently using a memory bandwidth. For example, an interpolation filter having a tap number less than 8 (e.g., a 2-tap interpolation filter), instead of an 8-tap interpolation filter, may be used.

Also, the video decoding apparatus 100 according to an embodiment may signal intra or inter prediction information about each region included in a current coding unit by splitting the region into a pre-set shape (e.g., diagonal-based split).

The video decoding apparatus 100 according to an embodiment may obtain a prediction sample of a current coding unit using an intra mode by using adjacent samples of the current coding unit. In this case, intra prediction is performed by using adjacent samples that are pre-reconstructed, and the samples are referred to as reference samples.

Figure 34:
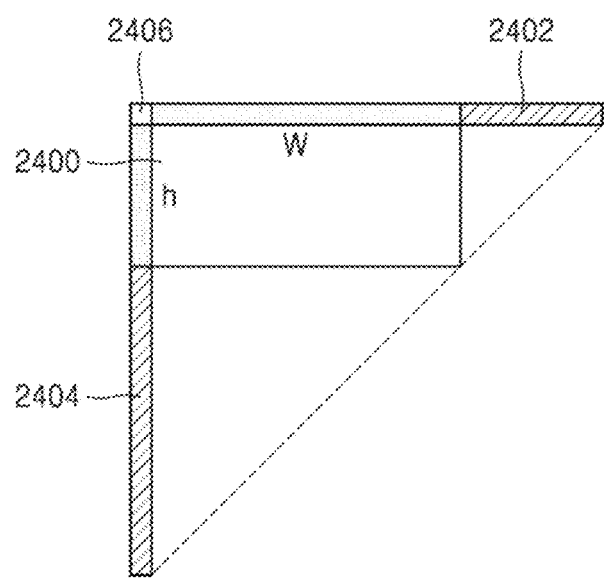
FIG. 34 is a diagram of a reference sample for intra prediction of a coding unit, according to an embodiment.

FIG. 34 is a diagram of a reference sample for intra prediction of a coding unit, according to an embodiment. Referring to FIG. 34, for a coding unit 2400 where a block shape is a non-square shape, a length in a horizontal direction is w, and a length in a vertical length is h, w+h upper reference samples 2402, w+h left reference samples 2404, and one upper left reference sample 2406 are required, that is, the total number of 2(w+h)+1 reference samples are required. In order to prepare a reference sample, padding may be performed on a part where the reference sample does not exist, and a reference sample filtering process may be performed for each prediction mode to reduce a quantization error included in a reconstructed reference sample.

Although the number of reference samples when a block shape of a current coding unit is a non-square shape has been described in the above embodiments, the number of reference samples is equally applied even when a current coding unit is a rectangular shape.

The above various embodiments describe an operation related to an image decoding method performed by the video decoding apparatus 100. An operation of the video encoding apparatus 200 for performing an image encoding method corresponding to a reverse order process of the image decoding method will be described through various embodiments.

Figure 12:
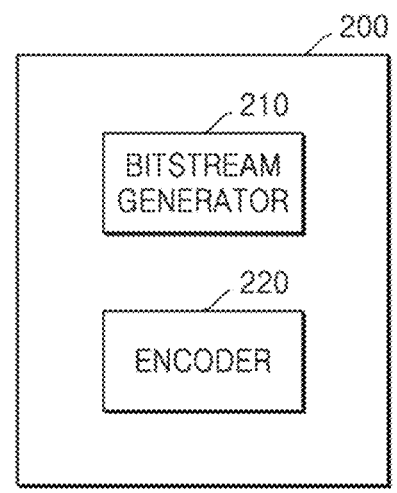
FIG. 12 is a block diagram of a video encoding apparatus for encoding an image based on at least one from among block shape information and split shape information, according to an embodiment.

FIG. 12 is a block diagram of the video encoding apparatus 200 for encoding an image based on at least one from among block shape information and split shape information, according to an embodiment.

The video encoding apparatus 200 may include an encoder 220 and a bitstream generator 210. The encoder 220 may receive an input image and may encode the input image. The encoder 220 may encode the input image and may obtain at least one syntax element. The syntax element may include at least one from among skip flag, prediction mode, motion vector difference, motion vector prediction method (or index), transform quantized coefficient, coded block pattern, coded block flag, intra prediction mode, direct flag, merge flag, delta QP, reference index, prediction direction, and transform index. The encoder 220 may determine a context model based on block shape information including at least one from among a ratio or a size of a shape, a direction, a width, and a height of a coding unit.

The bitstream generator 210 may generate a bitstream based on the encoded input image. For example, the bitstream generator 210 may generate the bitstream by entropy encoding the syntax element based on the context model. Also, the video encoding apparatus 200 may transmit the bitstream to the video decoding apparatus 100.

According to an embodiment, the encoder 220 of the video encoding apparatus 200 may determine a shape of a coding unit. For example, the coding unit may have a square shape or a non-square shape, and information indicating the shape may be included in the block shape information.

According to an embodiment, the encoder 220 may determine which shape the coding unit is to be split into. The encoder 220 may determine a shape of at least one coding unit included in the coding unit, and the bitstream generator 210 may generate the bitstream including split shape information including information about the shape of the coding unit.

According to an embodiment, the encoder 220 may determine whether the coding unit is split or not split. When the encoder determines that only one coding unit is included in the coding unit or the coding unit is not split, the bitstream generator 210 may generate the bitstream including the split shape information indicating that the coding unit is not split. Also, the encoder 220 may split the coding unit into a plurality of coding units, and the bitstream generator 210 may generate the bitstream including the split shape information indicating that the coding unit is split into the plurality of coding units.

According to an embodiment, information indicating the number of coding units into which the coding unit is to be split or a direction in which the coding unit is to be split may be included in the split shape information. For example, the split shape information may indicate that the coding unit is split in at least one direction from among a vertical direction and a horizontal direction or is not split.

The video encoding apparatus 200 determines information about a split shape mode based on the split shape mode of the coding unit. The video encoding apparatus 200 determines the context model based on at least one from among the ratio or the size of the shape, the direction, the width, and the height of the coding unit. The video encoding apparatus 200 generates the information about the split shape mode for splitting the coding unit based on the context model as the bitstream.

In order to determine the context model, the video encoding apparatus 200 may obtain an arrangement for corresponding at least one from among the ratio or the size of the shape, the direction, the width, and the height of the coding unit to an index for the context model. The video encoding apparatus 200 may obtain the index for the context model based on at least one from among the ratio or the size of the shape, the direction, the width, and the height of the coding unit in the arrangement. The video encoding apparatus 200 may determine the context model based on the index for the context model.

In order to determine the context model, the video encoding apparatus 200 may determine the context model further based on block shape information including at least one from among a ratio or a size of a shape, a direction, a width, and a height of a neighboring coding unit adjacent to the coding unit. Also, the neighboring coding unit may include at least one from among coding units located at a left lower side, a left side, a left upper side, an upper side, a right upper side, a right side, or a right lower side of the coding unit.

Also, in order to determine the context model, the video encoding apparatus 200 may compare a length of a width of an upper neighboring coding unit with a length of the width of the coding unit. Also, the video encoding apparatus 200 may compare a length of a height of left and right neighboring coding units with a length of the height of the coding unit. Also, the video encoding apparatus 200 may determine the context model based on comparison results.

An operation of the video encoding apparatus 200 is similar to an operation of the video decoding apparatus 100 described with reference to FIGS. 13 through 34, and thus a detailed explanation thereof is not provided here.

The embodiments may be implemented as a computer-executable program, and the program may be stored in a medium.

The medium may continuously store the computer-executable program, or may temporarily store the computer-executable program to execute or download the computer-executable program. Also, the medium may be any of various recording means or storage means including a single hardware or a combination of a plurality of hardware, and may be distributed in a network without being limited to a medium directly connected to a computer system. The medium may be configured to store program instructions, and examples of the medium may include a magnetic medium such as a hard disk, a floppy disk, or a magnetic tape, an optical recording medium such as a compact disc read-only memory (CD-ROM) or a digital versatile disc (DVD), a magneto-optical medium such as a floptical disk, a ROM, a random-access memory (RAM), and a flash memory. Also, other examples of the medium may include a recording medium and a storage medium managed by an application store that distributes applications or a site or a server that supplies or distributes various other software.

While the disclosure has been particularly shown and described with reference to embodiments thereof, it will be understood by one of ordinary skill in the art that various changes in form and details may be made therein without departing from the spirit and scope of the disclosure as defined by the appended claims.

The invention claimed is:

1. An apparatus of decoding a motion vector, the apparatus comprising:
   an obtainer configured to obtain, from a bitstream, information indicating a motion vector resolution of a current block among a plurality of motion vector resolutions; and
   a prediction decoder configured to:
      when information about a previously decoded block indicates first information, determine locations, including a first location, of a plurality of candidate blocks corresponding to the plurality of motion vector resolutions based on the first information, wherein the locations of the plurality of candidate blocks are different from each other;
      when the information about the previously decoded block indicates second information, determine locations, including a second location, of a plurality of candidate blocks corresponding to the plurality of motion vector resolutions based on the second information, wherein the second location is different from the first location;
      determine whether a motion vector of one candidate block corresponding to the motion vector resolution of the current block among the plurality of candidate blocks is available;
      when the motion vector of the one candidate block is available, obtain a motion vector predictor of the current block using the motion vector of the one candidate block;
      upscale a residual motion vector using the information indicating the motion vector resolution of the current block; and
      obtain a motion vector of the current block by using the motion vector predictor and the upscaled residual motion vector.

2. A method of encoding a motion vector, the method comprising:
   determining a motion vector resolution of a current block among a plurality of motion vector resolutions;
   when information about a previously encoded block is generated to indicate first information, determining locations, including a first location, of a plurality of candidate blocks corresponding to the plurality of motion vector resolutions based on the first information, wherein the locations of the plurality of candidate blocks are different from each other;
   when the information about the previously encoded block is generated to indicate second information, determining locations, including a second location, of a plurality of candidate blocks corresponding to the plurality of motion vector resolutions based on the second information, wherein the second location is different from the first location;
   determining whether a motion vector of one candidate block corresponding to the motion vector resolution of the current block among the plurality of candidate blocks is available;
   when the motion vector of the one candidate block is available, obtaining a motion vector predictor of the current block using the motion vector of the one candidate block;
   obtaining a residual motion vector of the current block by using the motion vector predictor and a motion vector of the current block;
   downscaling the residual motion vector by using information indicating the motion vector resolution of the current block; and
   generating a bitstream comprising the information indicating the motion vector resolution of the current block, and information related to the downscaled residual motion vector.

3. A method for transmitting a bitstream generated by an encoding method of a motion vector,
   wherein the method comprises transmitting the bitstream, and
   wherein the encoding method comprises:
      determining a motion vector resolution of a current block among a plurality of motion vector resolutions;
      when information about a previously encoded block is generated to indicate first information, determining locations, including a first location, of a plurality of candidate blocks corresponding to the plurality of motion vector resolutions based on the first information, wherein the locations of the plurality of candidate blocks are different from each other;

when the information about the previously encoded block is generated to indicate second information, determining locations, including a second location, of a plurality of candidate blocks corresponding to the plurality of motion vector resolutions based on the second information, wherein the second location is different from the first location;

determining whether a motion vector of one candidate block corresponding to the motion vector resolution of the current block among the plurality of candidate blocks is available;

when the motion vector of the one candidate block is available, obtaining a motion vector predictor of the current block using the motion vector of the one candidate block;

obtaining a residual motion vector of the current block by using the motion vector predictor and a motion vector of the current block;

downscaling the residual motion vector by using information indicating the motion vector resolution of the current block; and generating the bitstream comprising the information indicating the motion vector resolution of the current block, and information related to the downscaled residual motion vector.

\* \* \* \* \*